United States Patent [19]
Faris

[11] Patent Number: 6,002,518
[45] Date of Patent: Dec. 14, 1999

[54] PHASE-RETARDATION BASED SYSTEM FOR STEREOSCOPIC VIEWING MICROPOLARIZED SPATIALLY-MULTIPLEXED IMAGES SUBSTANTIALLY FREE OF VISUAL-CHANNEL CROSS-TALK AND ASYMMETRIC IMAGE DISTORTION

[75] Inventor: Sadeg M. Faris, Pleasantville, N.Y.

[73] Assignee: Reveo, Inc., Elmsford, N.Y.

[21] Appl. No.: 09/042,970

[22] Filed: Mar. 17, 1998

Related U.S. Application Data

[63] Continuation of application No. 08/614,569, Mar. 13, 1996, abandoned, which is a continuation-in-part of application No. 08/563,520, Nov. 28, 1995, Pat. No. 5,680,233, and application No. 08/339,986, Nov. 14, 1994, Pat. No. 5,502,481, and application No. 08/322,219, Oct. 13, 1994, Pat. No. 5,801,793, and application No. 08/230,779, Apr. 21, 1994, Pat. No. 5,828,427, and application No. 08/126,077, Sep. 23, 1993, Pat. No. 5,537,144, which is a continuation of application No. 08/536,190, Jun. 11, 1990, abandoned, and application No. 08/527,094, Sep. 12, 1995, Pat. No. 5,844,717, which is a continuation of application No. 08/269,202, Jun. 30, 1994, abandoned, which is a continuation of application No. 07/536,419, Jun. 11, 1990, Pat. No. 5,327,285, and application No. 07/976,518, Nov. 16, 1992, Pat. No. 5,553,203, which is a continuation of application No. 07/587,664, Sep. 26, 1990, Pat. No. 5,165,013.

[51] Int. Cl.$^6$ .............. G02B 27/26; G02B 5/30; G02F 1/01
[52] U.S. Cl. .............. 359/465; 359/497; 345/32; 348/58; 348/752; 348/762
[58] Field of Search .................... 359/465, 494, 359/497; 348/58, 57, 752, 762, 767; 345/32, 88, 90

[56] References Cited

U.S. PATENT DOCUMENTS

| | | | |
|---|---|---|---|
| 4,072,967 | 2/1978 | Dudley | 396/432 |
| 4,630,097 | 12/1986 | Marks | 348/58 |
| 4,719,507 | 1/1988 | Bos | 359/465 |
| 5,050,961 | 9/1991 | Venolia | 359/465 |

*Primary Examiner*—Jon Henry
*Attorney, Agent, or Firm*—Thomas J. Perkowski, Esq., P.C.

[57] ABSTRACT

A system for producing and displaying spatially-multiplexed images of three-dimensional imagery for use in stereoscopic viewing thereof substantially free of visual-channel cross-talk and stereoscopic asymmetric distortion. The system includes a display device for displaying micropolarized spatially-multiplexed images using a phase-retarding micropolarization structure. The micropolarization structure has phase-retarding characteristics which introduce phase-retardation error to light associated with the micropolarized spatially-multiplexed image at a particular wavelengths in the visible band, and create visual-channel cross-talk. The system also includes a viewing device for viewing the micropolarized spatially-multiplexed images using a phase-retarding polarizer having phase-retarding characteristics which substantially eliminate the phase-retardation error introduced by micropolarization structure during image display, and thus the visual-channel cross-talk and stereoscopic asymmetric distortion.

32 Claims, 33 Drawing Sheets

ILLUSTRATES THAT NO CROSS-TALK COMPONENTS ARE PRODUCED
FROM RIGHT IMAGE PIXEL STRUCTURES IN SMI DISPLAY DEVICE

ILLUSTRATES THAT THERE ARE CROSS-TALK COMPONENTS ARE PRODUCED
FROM LEFT IMAGE PIXEL STRUCTURES IN SMI DISPLAY DEVICE.

PHASE-CORRECTIVE CHARACTERISTICS OF LEFT EYE POLARIZING FILTER

PHASE-CORRECTIVE CHARACTERISTICS OF RIGHT EYE POLARIZING FILTER

*ELIMINATION OF COLOR INTENSITY OF CROSS-TALK COMPONENTS VIEWED BY RIGHT-EYE OF VIEWER WEARING SPECTACLES OF FIG. 3*

*COLOR INTENSITY COMPENSATION VIEWED BY RIGHT-EYE OF VIEWER WEARING SPECTACLES OF FIG. 3*

LEFT/RIGHT PIXEL STRUCTURE OF SMI-μPOL PANEL

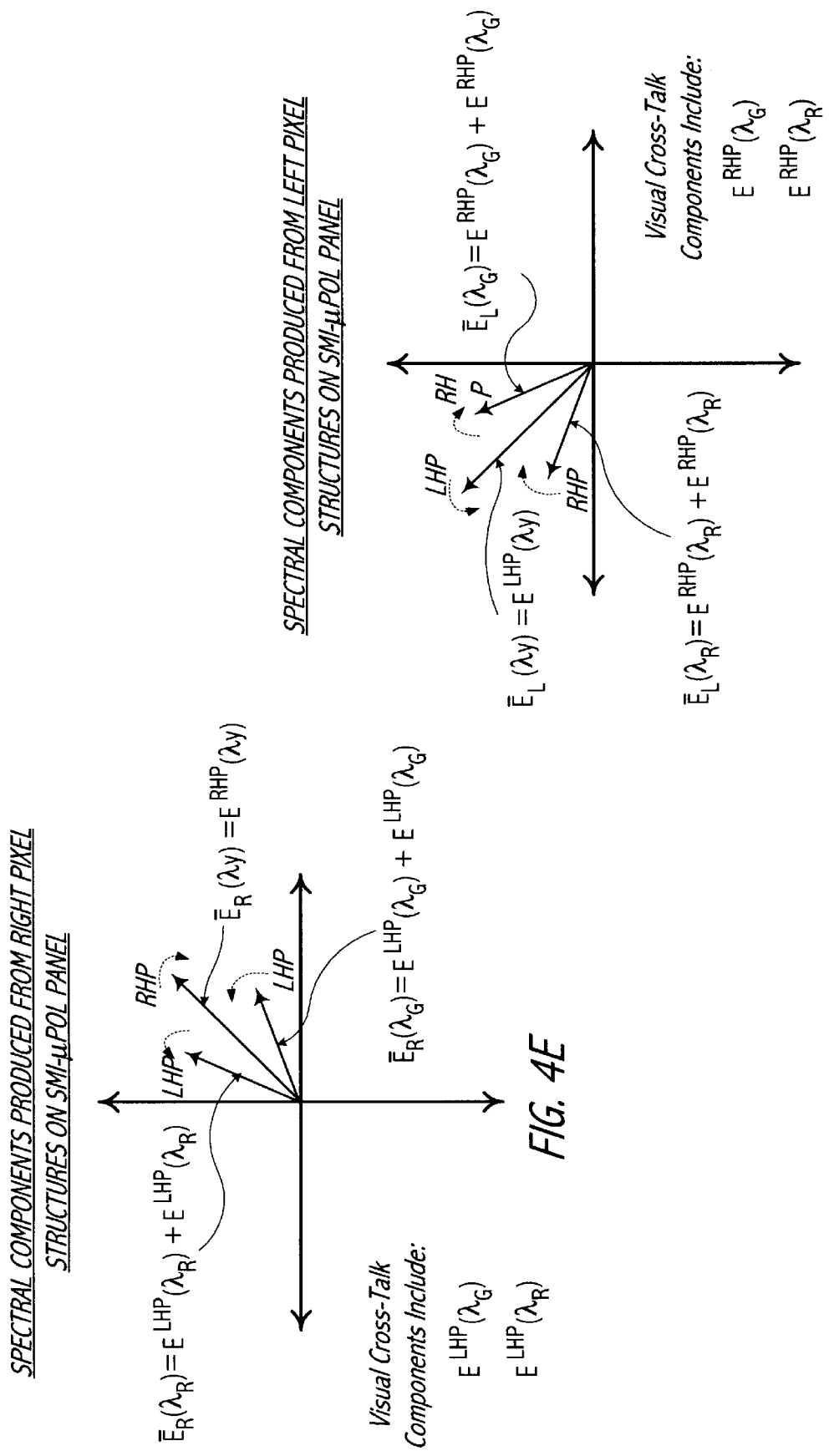

LEFT/RIGHT PIXEL STRUCTURE OF SMI-μPOL PANEL

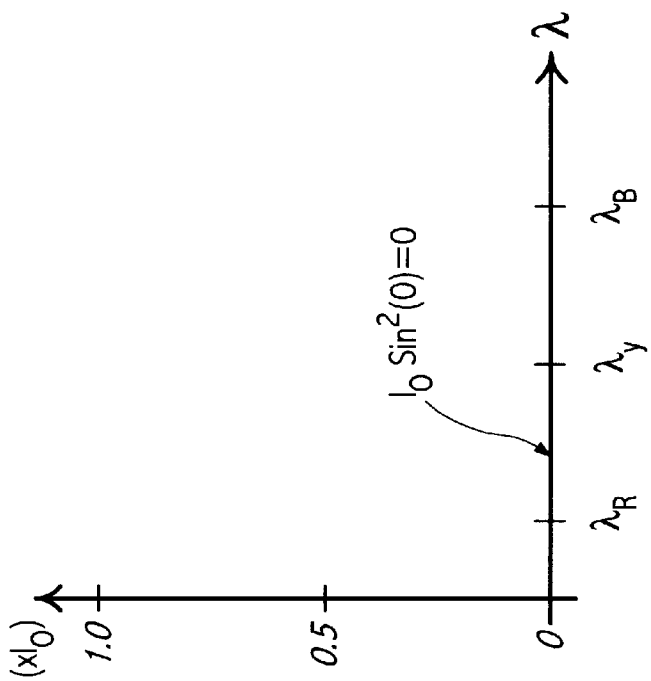
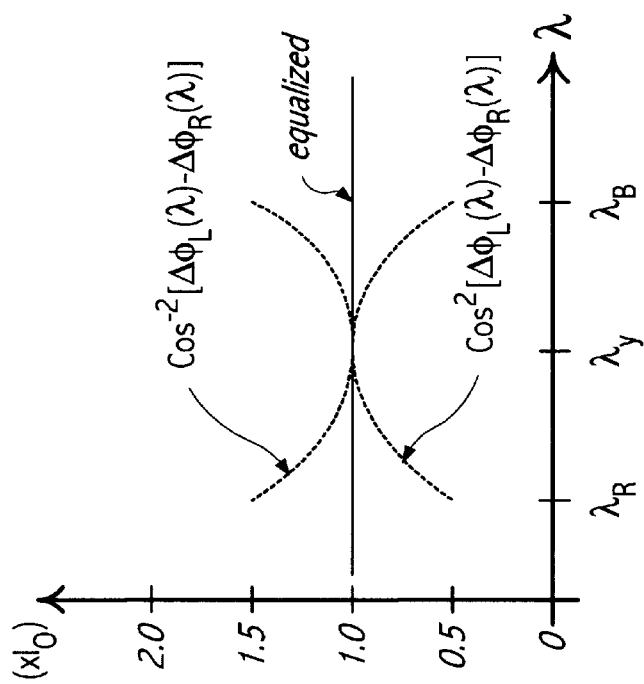

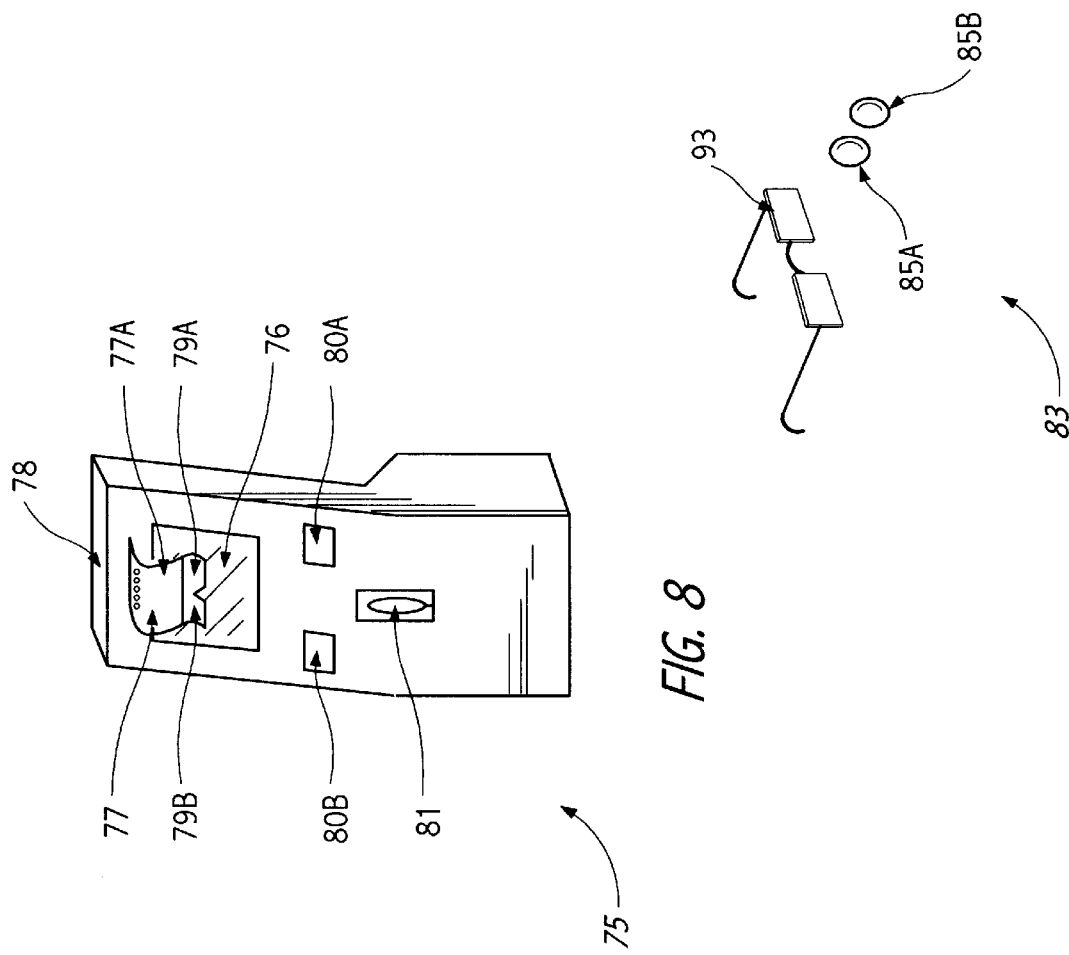

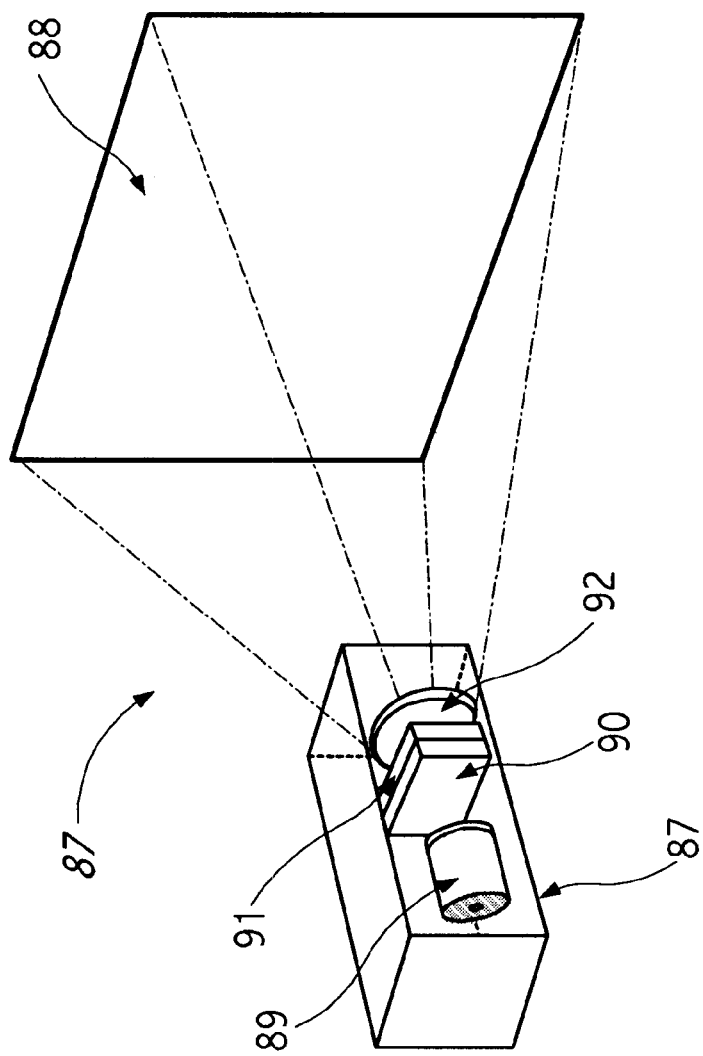
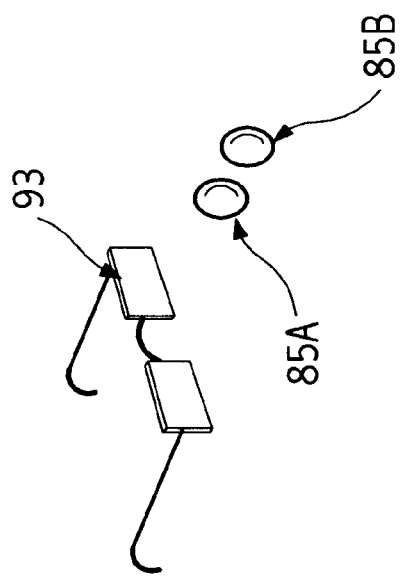
FIG. 10

PHASE-RETARDATION BASED SYSTEM FOR STEREOSCOPIC VIEWING MICROPOLARIZED SPATIALLY-MULTIPLEXED IMAGES SUBSTANTIALLY FREE OF VISUAL-CHANNEL CROSS-TALK AND ASYMMETRIC IMAGE DISTORTION

RELATED CASES

This Application is a Continuation of application Ser. No. 08/614,569, filed Mar. 13, 1996, now abandoned, which is a Continuation-in-Part of: Application Ser. No. 08/563,520 entitled "IMAGE DISPLAY SYSTEMS HAVING DIRECT AND PROJECTION VIEWING MODES" filed Nov. 28, 1995, now U.S. Pat. No. 5,680,233; application Ser. No. 08/339,986 entitled "DESKTOP-BASED PROJECTION DISPLAY SYSTEM FOR STEREOSCOPIC VIEWING OF DISPLAYED IMAGERY OVER A WIDE FIELD OF VIEW (as amended)" filed Nov. 14, 1994, now U.S. Pat. No. 5,502,481; application Ser. No. 08/322,219 entitled "BACK-LIGHTING CONSTRUCTION FOR USE IN COMPUTER-BASED DISPLAY SYSTEMS HAVING DIRECT AND PROJECTION VIEWING MODES OF OPERATION" filed Oct. 13, 1994, now U.S. Pat. No. 5,801,793; application Ser. No. 08/230,779 entitled "ELECTRO-OPTICAL BACKLIGHTING PANEL FOR USE IN COMPUTER-BASED DISPLAY SYSTEMS AND PORTABLE LIGHT PROJECTION DEVICE FOR USE THEREWITH", filed Apr. 21, 1994, now U.S. Pat. No. 5,828,427; application Ser. No. 08/126,077 entitled "METHOD AND APPARATUS FOR RECORDING AND DISPLAYING SPATIALLY-MULTIPLEXED IMAGES OF 3-D OBJECTS FOR STEREOSCOPIC VIEWING THEREOF" filed Sep. 23, 1993, now U.S. Pat. No. 5,537,144, which is a Continuation of application Ser. No. 07/536,190 filed Jun. 11, 1990, now abandoned; application Ser. No. 08/527,094 entitled "METHOD AND SYSTEM FOR PRODUCING MICROPOLARIZATION MATERIAL PANELS FOR USE IN STEREOSCOPIC VIEWING OF 3-D OBJECTS REPRESENTED IN SPATIALLY MULTI-PLEXED IMAGES" filed Sep. 12, 1995, now U.S. Pat. No. 5,844,717, which is a Continuation of application Ser. No. 08/269,202 filed Jun. 30, 1994, now abandoned, which is Continuation of application Ser. No. 07/536,419 filed on Jun. 11, 1990, now U.S. Pat. No. 5,327,285; and application Ser. No. 07/976,518 entitled "METHOD AND APPARATUS FOR PRODUCING AND RECORDING SPATIALLY-MULTIPLEXED IMAGES FOR USE IN 3-D STEREOSCOPIC VIEWING THEREOF" filed Nov. 16, 1992, now U.S. Pat. No. 5,553,203, which is a Continuation of application Ser. No. 07/587,664 filed Sep. 26, 1990, now U.S. Pat. No. 5,165,013. These co-pending Applications are commonly owned by Reveo, Inc. of Hawthorne, N.Y., and each such Application is hereby incorporated herein by reference in its entirety, as if fully set forth herein.

BACKGROUND OF THE INVENTION

1. Field of the Invention

The present invention relates to a method and apparatus for producing and displaying spatially-multiplexed composite images of three-dimensional imagery for use in stereoscopic viewing thereof substantially free of visual-channel cross-talk, stereoscopic asymmetric distortion, and color-intensity distortion.

2. Brief Description of the Prior Art

The use of stereoscopic imaging in modern times has gained increasing popularity. The reason for this trend in technological innovation is quite clear. At birth, each human being is endowed with the power of stereoscopic vision, and it is this power alone that enables human beings to view the world and all its inhabitants in three dimensions with full depth perception.

Presently, there exist a number of known techniques for recording and displaying stereoscopic images of three dimensional (3-D) objects and scenery, whether of real or synthetic nature. In the art of stereoscopic video imaging, in particular, two principally different techniques are presently being used to record and display stereoscopic images. The first technique is commonly referred to as "time-multiplexed" or "field-sequential" stereo video, whereas the second technique is commonly referred to as "spatially multiplexed" stereo video.

In general, each of these stereo-imaging techniques involve image recording (i.e. generation) and image display processes. During the image generation process, left and right perspective images (or sequences of perspective images) of 3-D scenery are produced and subsequently recorded on a suitable recording medium. Preferably, the recorded left and right perspective images are produced (e.g. recorded, synthesized or otherwise captured) as if actually viewed with the inter-pupil distance of a human observer, or a stereoscopic camera with a desired viewing perspective. Then, during the image display process, the visible light associated with the left and right perspective images is visually presented to the left and right eyes of viewers, respectively, while minimizing the amount of visible light from the left and right perspective images that impinge upon the right and left eyes of the viewer, respectively. Failure to satisfy this condition during the display process results in the production of "visual-channel cross-talk," a phenomena which degrades 3-D depth perception and causes unbearable eye and brain fatigue during viewing. Inasmuch as the left and right perspective images of the 3-D scenery are viewed substantially by the left and right eyes of the viewer, respectively, a stereoscopic image of the 3-D scenery is perceived, complete with full spatial and depth information of the actual 3-D scenery, whether of real or synthetic nature.

The differences between the two above-described techniques reside primarily in the manner in which left and right perspective images are "channeled" to the left and right eyes of the viewer in order to preserve stereoscopy. These techniques will be briefly described below.

In 3-D video display systems based upon "time-multiplexing" principles, the left and right perspective images of 3-D scenery are displayed to viewers during different display periods (i.e. left and right perspective image display periods). To ensure that only left perspective images of the 3-D scenery are presented to the left eyes of viewers, the right eye of each viewer is not allowed to view the pixels of the left perspective image during the left perspective image display period.

Similarly, to ensure that only right perspective images of the 3-D scenery are presented to the right eyes of viewers, the left eye of each viewer is not allowed to view the pixels of the right perspective image during the right perspective image display period. In the contemporary period, this perspective image "blocking" or selective viewing process is achieved using a pair of liquid crystal light valves(LCLV) as the lenses in special eye wear (e.g. goggles ) worn by each viewer using a 3-D image viewing system based on such principles. Typically, a controller is required in order to drive the left LCLV lens during each left perspective image display period, and drive the right LCLV lens during each right perspective image display period.

In 3-D video display systems based upon "spatial-multiplexing" principles, left and right perspective images of 3-D scenery are spatially filtered using complementary filtering functions and thereafter the spatially-filtered perspectives images are combined during the image generation process to produce a composite spatially multiplexed image (SMI). Then during the image display process, the visible light associated with the left and right perspective image components of the composite image are simultaneously displayed, but with spatially different "polarizations" imparted thereto using a micropolarization panel of the type described in Applicant's U.S. Pat. No. 5,327,285, and copending application Ser. No. 08/126,077, both incorporated herein by reference in their entirety. To ensure that only left perspective images of the 3-D scenery are presented to the left eyes of viewers, the right eye of each viewer must not be allowed to view the pixels of left perspective images. Similarly, to ensure that only the right perspective images of the 3-D scenery are presented to the right eyes of viewers, the left eye of each viewer must not be allowed to view the pixels of right perspective images. Typically, this perspective image "blocking" or selective viewing process is achieved using a pair of inexpensive, spatially different polarizing lenses mounted in eye wear (e.g. spectacles) worn by each viewer using the 3-D video display system based on such principles of operation.

While each of these above-described 3-D image display techniques may be used to display 3-D color or gray-scale images, systems based on such techniques are not without shortcomings and drawbacks.

In particular, 3-D image display systems based upon "time-multiplexing" principles are notoriously plagued by "image flicker" problems. While 3-D video display systems based upon "spatial-multiplexing"principles are inherently free from the "image flicker" problem associated with time-multiplexed 3-D display systems, spatial-multiplexing 3-D display systems require the use of carefully constructed "micropolarization panels" mounted onto display surfaces (e.g. flat LCD panels, LCD projectors, etc.) from which the polarized light of spatially-multiplexed images emanates towards the eyes of the viewers.

While U.S. Pat. No. 5,327,285 and application Ser. No. 08/126,077 teach how to make and use SMI display systems capable of stereoscopic viewing of 3-D objects with image quality and resolution, Applicant hereof has discovered that when using phase-retarding micropolarization panels (i.e. micro-retardation arrays) as taught therein, a small yet significant amount of visual-channel cross-talk is inherently produced during the stereoscopic viewing process. The source of such visual channel cross-talk has been traced to the phase-retarding pattern(s) embodied within the micropolarization panel of such SMI display system. The phase retardation required to achieve either the P1 or P2 polarization state at each pixel location along the micropolarization panel is a strong function of wavelength of the illuminating backlight which, for example, in color LCD panels, varies significantly over each pixel location due to the RGB subpixel filters employed therein. Thus, when using phase-retarding micropolarization panels in prior art SMI display systems, it has been impossible to impart only a P2 polarization state to light rays emanating from left image pixels displayed along the LCD panel, and only a P1 polarization state to light rays emanating from right perspective image pixels displayed therealong. As a result, visual channel cross-talk introduced by the less than ideal phase characteristics of phase-retarding micropolarization panels results in the viewing (i.e. perception) of "double-images" slightly shifted in space, rather than spatially cohering as a unified stereoscopic image providing full 3-D depth sensation in the human vision system of the viewer.

In addition to visual-channel cross-talk, such SMI display systems also suffer from "asymmetric distortion" created during stereoscopic viewing of polarized SMIs produced from phase-retarding micropolarization panels mounted upon the display surface of SMI display structures. The cause of this asymmetric distortion is related to the fact that only one eye of a viewer of a displayed SMI perceives through passive polarizing eyeglasses, a perspective image whose color has been distorted by virtue of the wavelength-dependent phase retardation which the spectral components of the perspective image undergo while passing through the micropolarization panel.

Moreover, the chromatic distortion of SMIs caused by the wavelength-dependent phase-retardation errors introduced by the imperfect retardation characteristics associated with such micropolarization panels degrades the color fidelity of 3-D imagery perceived by viewers using such stereoscopic display systems.

Collectively, the visual channel cross-talk, asymmetric distortion and chromatic distortion associated with prior art phase-retarding micropolarization display panels inherently degrades the degree of stereo separation achievable between the polarization-encoded visual channels of such stereoscopic display systems, and thus the overall stereoscopic viewing experience achievable therewith.

Thus, there is a great need in the art for an improved system and method for stereoscopic viewing 3-D objects represented in either grey-scaled or color spatially-multiplexed images, while avoiding the shortcomings and drawbacks of prior art apparatus and methodologies.

OBJECTS OF PRESENT INVENTION

Accordingly, it is a primary object of the present invention to provide a novel method and apparatus for stereoscopic viewing of 3-D objects and scenery represented in spatially-multiplexed images (SMIs), while overcoming the shortcomings and drawbacks associated with prior art apparatus and methodologies.

A further object of the present invention is to provide a method and system for stereoscopic viewing of real or synthetic 3-D scenery represented in SMIs displayed through a retardation-based micropolarization, in such a manner that visual-channel cross-talk (dependent on phase-retarding error) and asymmetric image distortion are substantially avoided.

A further object of the present invention is to provide a method and system for stereoscopic viewing of real or synthetic 3-D scenery represented in SMIs that can be produced from any one of a diverse array of devices, including computer systems, camera systems, laser-disc playback units, video-tape recording and playback units, color image scanners, television signal receivers and the like.

A further object of the present invention is to provide a novel electrically-passive viewing device for stereoscopic viewing 3-D images produced from an SMI-based stereoscopic display system employing a retardation based micropolarization panel laminated upon an SMI display structure, while avoiding the deleterious effects of phase-retardation error dependent visual-channel cross-talk and asymmetric image distortion.

A further object of the present invention is to embody such a stereoscopic 3-D viewing system within desktop, laptop, and notebook computer systems in order to provide stereoscopic 3-D color display capabilities to users thereof without the deleterious effects of visual-channel cross-talk associated with the use of retardation-based micropolarization panels during SMI display processes.

An even further object of the present invention is to provide an electro-optical display system capable of displaying color SMIs of 3-D scenery to allow stereoscopic 3-D viewing thereof while wearing a pair of electrically-passive stereoscopic viewing spectacles embodying phase-retardation error corrective optics.

A further object of the present invention is to provide a stereoscopic 3-D viewing system and method, in which stereoscopic viewing of 3-D scenery without phase-error dependent cross-talk is achieved while wearing a pair of stereoscopic viewing spectacles embodying phase-error corrective optics.

A further object of the present invention is to provide an improved portable computer-based system having both direct and projection viewing modes for supporting the stereoscopic viewing of 3-D objects represented in displayed SMIs, without the undesirable effects of phase-retardation error dependent visual channel cross-talk and asymmetric image distortion.

A further object of the present invention is to provide such a stereoscopic 3-D viewing system for embodiment within a portable computer-based system having both direct and projection viewing modes.

A further object of the present invention is to provide a portable computer-based system, in which spatially-multiplexed images of 3-D objects are projected through an LCD and retardation-based micropolarization panel assembly so that the 3-D objects represented therein are perceived with stereoscopic depth-sensation, free of phase-retardation error dependent visual channel cross-talk and asymmetric image distortion when the displayed SMIs are viewed through stereoscopic viewing spectacles having phase-error corrective characteristics.

A further object of the present invention is to provide such a computer-based system in the form of either a palmtop, laptop or notebook computer, personal digital assistant or personal communicator.

A further object of the present invention is to provide a novel method of viewing micropolarized SMIs produced from either a direct-view or projection-type image display system.

A further object of the present invention is to provide a novel method of viewing SMIs expressed in a hard-copy medium (e.g. transparent or opaque film, or papr) having a retardation-based micropolarization panel laminated thereover with the phase-retarding elements thereof in spatial registeration with the left and right perspective image pixels of the SMI display structure.

A further object of the present invention is to provide a novel method of and apparatus for SMI-based stereoscopic viewing of 3-D objects for use in virtual reality (VR) viewing environments realized upon computer workstations, computer playstations, as well as throughout the client-server computers of the Internet information structure.

A further object of the present invention is to provide a novel pair of stereoscopic viewing glasses for use with SMI display systems employing retardation-based micropolarization panels during SMI display processes.

Other objects of the present invention will become apparent hereinafter and in the Claims to Invention.

SUMMARY OF THE PRESENT INVENTION

In accordance with one of the broader aspects of the present invention, a novel stereoscopic viewing system is provided based on the display of spatially-multiplexed images through retardation-based micropolarization panels.

In general, the stereoscopic viewing system of the present invention comprises an SMI display subsystem and a SMI viewing subsystem. The function of the SMI display subsystem is to display spatially-multiplexed images (SMIs) through a retardation-based micropolarization panel to encode left and right perspective images over left and right visual channels with a determinable amount of visual channel cross-talk. The function of the SMI viewing subsystem is to decode the polarization-encoded visual channels of the system and thus allowing stereoscopic viewing of 3-D imagery while eliminating visual-channel cross-talk introduced into the system during the display process a result of the phase-error characteristics of the SMI display subsystem.

In general, the SMI display subsystem comprises a SMI display structure for displaying SMIs, and a retardation-based micropolarization panel for micropolarizing the left and right pixels thereof. The SMI display structure may be realized in the form of photograph, print, liquid crystal display (LCD) device, electroluminescent display device, LCD projection panel, projection display screen, CRT display device, or other device having an image formation surface upon which the pixels of an SMI are formed sequentially or simultaneously, temporarily or permanently in a manner sensible to the human vision system.

The retardation-based micropolarization panel can be realized as the spatial combination of a first and second phase retardation patterns comprising phase retardation elements or structures, periodically alternating over the spatial extent of the SMI being displayed from the SMI display device. In a first illustrative embodiment of the micropolarization panel, the first phase retardation pattern comprises a first plurality of phase retardation cells or elements which impart $\pi$-radian phase retardation to the left perspective image pixels being displayed by the SMI display device, whereas the second phase retardation pattern comprises a second plurality of phase retardation cells or elements which impart 0-radian phase retardation to the right perspective image pixels being displayed by the SMI display device. In a second illustrative embodiment of the micropolarization panel, the first phase retardation pattern comprises a first plurality of phase retardation cells or elements which impart $\pi/2$-radian phase retardation to the left perspective image pixels being displayed by the SMI display device, whereas the second phase retardation pattern comprises a second plurality of phase retardation cells or elements which impart $-\pi/2$-radian phase retardation to the right perspective image pixels being displayed by the SMI display device. In a third illustrative embodiment of the micropolarization panel, the first phase retardation pattern comprises a first plurality of phase retardation cells or elements which impart $+\pi/2$-radian phase retardation to the left perspective image pixels being displayed by the SMI display device, whereas the second phase retardation pattern comprises a second plurality of phase retardation cells or elements which impart $3\pi/2$-radian phase retardation to the right perspective image pixels being displayed by the SMI display device.

In general, the SMI display viewing subsystem hereof is a phase-error corrective viewing device which can be realized in any one of a number of possible forms, including eyeglasses, contact lenses, head-mounted goggles, head-mounted viewing visor, a viewing visor supported upon a free-standing kiosk, or any other device supportable before the eyes of a viewer. In the illustrative embodiment, the SMI display viewing subsystem is realized as an electrically-passive viewing device comprising a pair of light polarizing viewing elements and one or more optical filters having phase-error and color-intensity correction characteristics.

During the SMI display process, one or more micropolarized SMIs are displayed sequentially from a micropolarization-based display structure while the light rays associated therewith are viewed through the phase-error corrective viewing device of the present invention, so that the 3-D objects represented in the displayed SMIs are perceived with 3-D depth perception without the deleterious effects of phase-retardation error dependent visual channel cross-talk, asymmetric image distortion, or chromatic image (i.e. color-intensity) distortion associated with the phase-retardation error characteristics of the SMI display subsystem.

The stereoscopic 3-D viewing system of the present invention can be used in diverse applications where high quality stereoscopic 3-D viewing is desired or required. Such fields of utility include, but are not limited to: stereoscopic 3-D printing applications: desktop virtual reality (VR) workstations or playstations; stereoscopic 3-D browsers and Internet servers supporting 3-D stereoscopic viewing of virtual reality environments; real-time stereoscopic viewing of real 3-D environments, including medical diagnostic and therapeutic techniques employing stereoscopic 3-D imaging; and the like.

The numerous advantages derived using the present invention will become apparent hereinafter.

BRIEF DESCRIPTION OF THE DRAWINGS

For a more complete understanding of the present invention, the Detailed Description of the Illustrative Embodiments of the Present Invention is to be read in conjunction with the following drawings, wherein:

FIG. 4E is a schematic representation showing the electric field vectors repesentative of the various spectral components in the visible-band produced from the right perspective image pixel structures (i.e., phase retardation cells) along the SMI display device of FIG. 4, while being imparted with both the left-hand circular polarization (LHP) state and right-hand circular polarization (RHP) state, thus causing phase-error dependent cross-talk to be introduced into the right visual-channel of the SMI display system;

FIG. 4F is a schematic representation showing the electric field vectors repesentative of the various spectral components in the visible-band produced from the left perspective image pixel structures (i.e., phase retardation cells) along the SMI display device of FIG. 4, while being imparted with both circular polarization states LHP and RHP, thus causing phase-error dependent cross-talk to be introduced into the left visual-channel of the SMI display system;

FIG. 7C is a schematic representation illustrating how the color intensity compensation filter disposed before the left-eye polarizing filter in the phase-corrective stereoscopic viewing glasses of FIG. 7 equalizes the color intensity distortion created by the non-zero phase-error characteristics associated with left perspective image pixel structures (i.e. $\Delta\phi_L(\lambda)$) in the SMI display panel of FIG. 6, and the non-zero phase-error characteristics (i.e. $-\Delta\phi_R(\lambda)$) of the phase-error correcting filter before the left-eye polarizing filter;

FIG. 7D is a schematic representation illustrating how the phase-error correcting filter (i.e. $-\Delta\phi_R(\lambda)$) disposed before the left-eye polarizing filter in the phase-corrective stereoscopic viewing glasses of FIG. 7 equalizes the color intensity distortion created by the non-zero phase-error characteristics associated with the right perspective image pixel structures (i.e. $\Delta\phi_R(\lambda)$) in the SMI display panel of FIG. 6;

FIG. 8 is a shematic diagram of an alternative embodiment of the stereoscopic viewing system of the present invention, realized in the form of a multi-media kiosk having a LCD-based SMI display panel for displaying micropolarized SMIs of 3-D objects, and a phase-error corrective viewing visor supported therefrom through which viewers can stereoscopically view the 3-D objects with high resolution, stereo-separation and color fidelity;

FIG. 9 is a shematic diagram of another alternative embodiment of the stereoscopic viewing subsystem of the present invention realized in the form of a computer graphics workstation having an LCD-based SMI display panel for displaying micropolarized SMIs of 3-D objects, and a pair of phase-error corrective contact lenses of the soft-type through which viewers can stereoscopically view the 3-D objects with high resolution, stereo-separation and color fidelity; and FIG. 10 is a schematic representation of yet another alternative embodiment of the stereoscopic viewing subsystem of the present invention realized in the form a stereoscopic 3-D image display system having an LCD-based SMI projector for projecting micropolarized SMIs of 3-D objects onto a polarization-preserving viewing screen, and a pair of phase-error corrective viewing glasses, through which viewers can stereoscopically view the 3-D objects with high resolution, stereo-separation and color fidelity.

DETAILED DESCRIPTION OF THE ILLUSTRATIVE EMBODIMENTS OF THE PRESENT INVENTION

In general, the system and method of the present invention permits viewers to stereoscopically view 3-D objects with the perception of full depth and three dimensionality. As used hereinafter and in the Claims to Invention appended hereto, the term "3-D imagery", "3-D scenery", and "3-D object" shall be understood to include any form of imagery, real or synthetic, concrete or abstract, having structural, graphical or ornamental features representable within three or more dimensions, which may include, but certainly is not limited to, three-dimensional physical space in which the spatial dimensionality of objects are conventionally represented.

Also, as used hereinafter and in the Claims to Invention, the term "spatially-multiplexed" and "spatially-multiplexing" shall be understood to mean the process whereby two (or more) color or grey-scale perspective images of either real or synthetic 3-D scenery are spatially filtered using complement functions to produce spatially filtered perspective images, and then the spatially filtered perspective images are combined to produce a single composite image containing pixels of both the left and right perspective images. The composite image resulting from this process shall be referred to hereinafter and in the Claims to Invention as a "spatially multiplexed image (SMI)". In general, color or grey-scale SMIs can be produced using a color SMI producing camera system as disclosed in copending application Ser. No. 08/126,077 or a color SMI producing computer system of the type produced in copending application Ser. No. 07/976,518 both of which are incorporated herein by reference.

Figure 1:
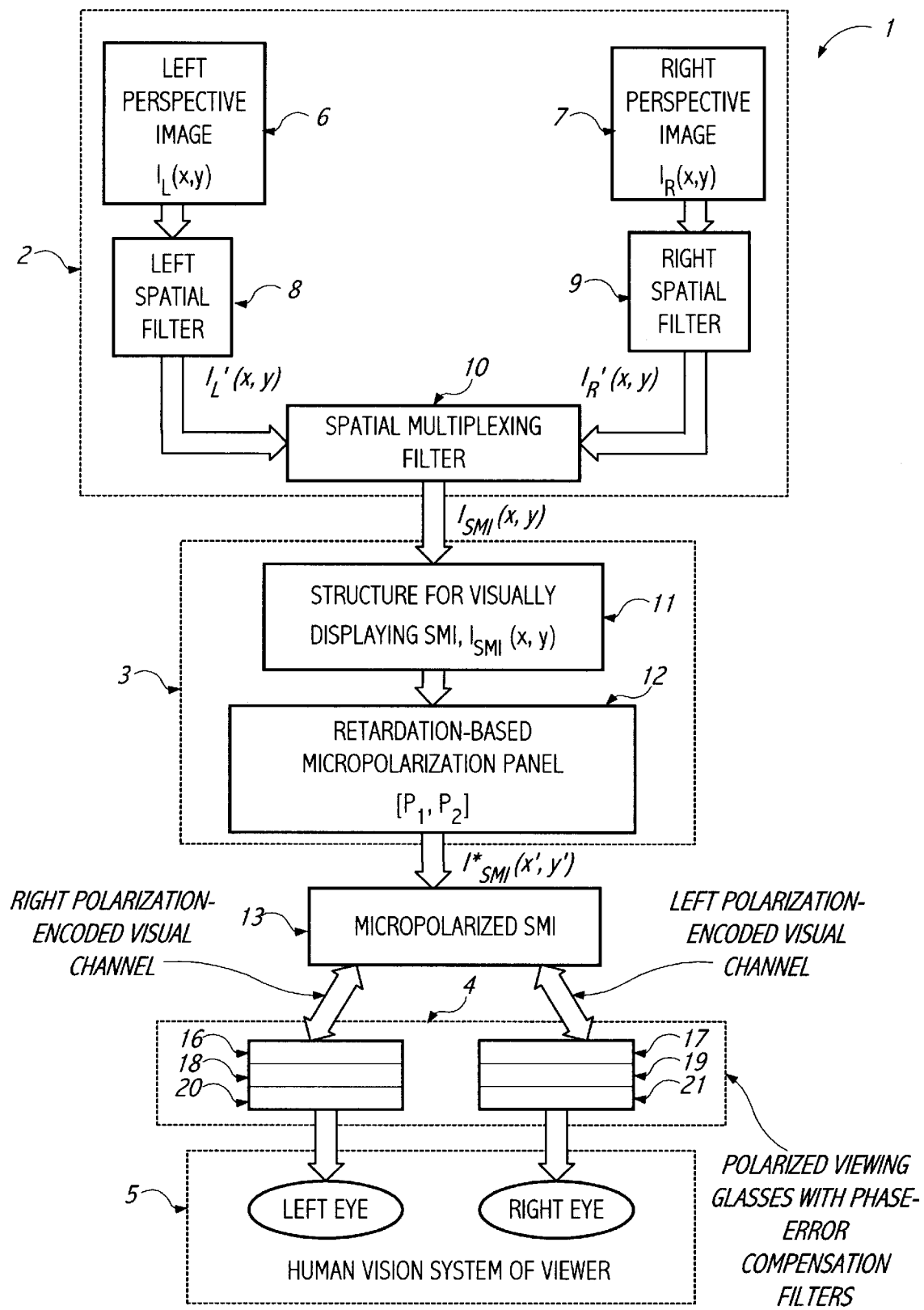
FIG. 1 is a block schematic diagram of apparatus for producing and displaying spatially-multiplexed color images (SMIs) of 3-D scenery for use in the stereoscopic viewing the same using the phase-error corrective viewing glasses of the present invention.

In FIG. 1, a generic stereoscopic 3-D viewing system 1 is schematically represented. The function of this system is to produce and display color SMIs of 3-D scenery and to enable stereoscopic viewing thereof through the phase-error correcting polarized viewing device of the present invention. As shown, the generic system comprises a number of subsystems, namely: a first subsystem 2 for producing spatially-multiplexed color images of either real or synthetic 3-D scenery from pairs of left and right perspective color images thereof; a second subsystem 3 for displaying micropolarized color or grey-scale SMIs using retardation-based micropolarization panels; and a third subsystem 4, which allows the human vision system 5 of the viewer to view displayed micropolarized SMIs in a manner which corrects for wavelength-dependent phase-errors introduced by the SMI display subsystem during the SMI display process. Each of these subsystems will be described in greater detail below.

As shown in FIG. 1, SMI producing subsystem 2 of the generalized embodiment comprises a number of subcomponents, namely: a means 6 and 7 for producing left and right perspective images $I_L(x,y)$ and $I_R(x,y)$, respectively, in either pixel data (i.e. color code) format, optical image format, or the like; a means 8 and 9 for spatial filtering (i.e. modulating) the left and right perspective images $I_L(x,y)$ and $I_R(x,y)$, respectively, to produce left and right spatially-modulated (i.e. filtered) images $I_L'(x,y)$ and $I_R'(X,y)$, respectively, where the spatial modulation functions performed by these filters are logical complements of each other; and a means 10 for spatially-multiplexing (i.e. spatially-combining) the pixel elements of the spatially-modulated images $I_L'(x,y)$ and $I_R'(x,y)$ in order to produce a spatially-multiplexed image $I_{SMI}(x,y)$ thereof. Typically, the spatially-multiplexed image $I_{SMI}(x,y)$ is buffered in a memory device before it is micropolarized and visually presented to the human vision system of the viewer by way of a SMI display subsystem 3. In general, the SMI production process discribed above can be carried out using a programmed image-processing computer system of the type disclosed in copending application Ser. No. 08/269,202 or an electro-optical camera system of the type disclosed in copending application Ser. No. 08/126,077, incorporated herein by reference. SMIs produced in any of the ways described above can then be recorded in a suitable information storage media (e.g. optical storage media, magnetic storage media and the like), and thereafter accessed for display. Thus SMIs can be produced from laser-disc playback units, or video-tape recording and playback units. In addition, SMIs may also be produced from color image scanners, as well as television signal receivers for display and viewing in accordance with the principles of the present invention.

As shown in FIG. 1, the generic SMI display subsystem 3 comprises: a structure 11 for displaying (i.e. visually presenting) color or grey-scaled SMIs; and a phase-retarding micropolarization panel 12 for encoding left and right perspective image pixels over left and right visual channels using orthogonally different polarization states P1 and P2, respectively. In general, the SMI display structure 11 may be realized in the form of a photograph, a Xerox® copy, an offset print, a photolithograph, a liquid crystal display (LCD) device, or electro-optical (e.g. video or single-frame) display device such as a LCD projection panel, an electroluminescent display device, a plasma display panel, a projection display screen, a CRT display device, or virtually any other device having a display surface upon the pixels of an SMI are formed sequentially or simultaneously, temporarily or permanently. The only requirement of the SMI display structure hereof is that all light rays emanating from the pixel elements thereof be polarized with a reference polarization state, indicated herein as P1. In general, reference polarization state P1 may be a linear polarization state (e.g. LP1 or LP2) or circular polarization state (e.g. RHP or LHP) depending upon the particular type of phase-retarding micropolarization panel employed in the particular embodiment of the SMI display system at hand. In the illustrative embodiments disclosed herein, reference polarization state is selected to be a linear polarization state.

In general, the phase-retarding micropolarization panel 12 is realized as first and second complementary patterns of phase-retarding elements or cells having alternating phase-retardation states (i.e. values). The first pattern of phase-retarding cells are arranged in spatial registration with the left perspective image pixels of the displayed SMI so as to impart a first amount of phase retardation sufficient to cause light rays emanating therefrom to have a first polarization state P1. The second pattern of phase-retarding cells are arranged in spatial registration with the right perspective image pixels of the displayed SMI so as to impart a second amount of phase retardation sufficient to cause the light rays emanating therefrom to have a second polarization state P2, orthogonal to the first polarization state P1. In general, the first and second patterns of phase retardation cells can be in the form of periodic arrays of alternating phase-retarding cells (i.e. phase-retarding arrays), realizable as a checkerboard pattern, as an alternating raster pattern, or as a concentric circle pattern. In fact, these retardation patterns can be virtually any set of arbitrary patterns provided that the first pattern of phase retardation cells is the logical (i.e. spatial) complement of the second pattern of phase retardation cells, and are similar to the spatially-defined pattern of the left and right spatial filters used during the SMI production process, described in copending application Ser. No. 07/976,518, supra.

In general, the phase-retarding micropolarization panel may impart any one of several possible different combinations of phase retardation to the light rays emanting from the left and right perspective image pixels of displayed SMIs so that light rays are produced therefrom with polarization states P1 and P2. In the illustrative embodiments of the present invention to be described hereinafter, three different phase retardation combinations are employed in the construction of the micropolarization panel. In each illustrative embodiment, the micropolarization panel is directly affixed to a SMI display structure which, together with pixel driving circuitry and the like, forms a complete SMI display subsystem for use as a stand-alone unit or embodiment within another system requiring stereoscopic 3-D viewing capabilities.

Depending on the nature of the SMI display structure employed with the micropolarization panel, the light emanating therefrom (i.e. through emission, transmission or reflection processes) may be polarized or unpolarized. This fact, in effect, constrains the different phase retardation combinations which may be used with the micropolarization panel so that light rays emanting from left perspective image pixels are imparted with the P1 polarization state, while light rays emanating from right perspective image pixels are imparted with the P2 polarization state. In general, SMI display structures can be classified as one of two types, depending on the polarization characteristics of light reflected, transmitted or otherwise emitted from the SMI display surface.

In the first class of SMI display structures, light rays emitted from the left and right pixels of displayed SMIs are unpolarized. Examples of such SMI display structures include the following display mediums: photographic film and prints made using conventional dyes and pigments, which reflect (i.e. produce) unpolarized light rays when illuminated from either a polarized or unpolarized a light source; Xerox copies made using conventional toner material which typically reflects (i.e. produces) unpolarized light rays when illuminated from either a polarized or unpolarized a light source; and electro-optical display structures, such as plasma display panels, CRT display surfaces, electroluminescent display panels, and cholesteric, smectic and nematic LCD panels, which emit unpolarized light rays when illuminated from either a polarized or unpolarized light source. For this class of SMI display structures, the micropolarization panel requires (i) an unpatterned polarization panel (i.e. layer) having a linear reference polarization state LP1, and (ii) first and second phase retardation patterns having one of the possible pairs of desired (i.e. ideal) phase-retarding characteristics.

In the second class of SMI display structures, light rays emitted from the left and right pixels of displayed SMIs are imparted with a linear polarization state, e.g. LP1. Examples of such SMI display structures include: nematic, twisted nematic and super-twisted nematic LCD panels, which inherently transmit polarized light rays from both left and right pixels of displayed SMIs. Thus when using this class of SMI display panel, the micropolarization panel of the SMI display subsystem comprises first and second phase retardation patterns provided with one of the possible pairs of phase-error retardation characteristics, and does not include the unpatterned polarization panel required for the first class of SMI display structure described above.

During a SMI display process, the human vision system of each viewer is enbled to view micropolarized SMIs displayed by the SMI display subsystem. These SMIs can be viewied directly in the case when a SMI is embodied in a hard-copy SMI print or displayed from a LCD panel. Alternatively, SMIs can be viewed indirectly in the case when SMIs are being displayed onto a projection screen using an LCD-based image projector adapted with a phase-retarding micropolarization panel. In either case, the 3-D objects represented in the displayed SMIs can be viewed stereoscopically by allowing the polarized light rays from such displayed images to pass through the SMI viewing subsystem of the present invention before falling incident upon the eyes of the viewer.

In general, the SMI viewing subsystem of the present invention comprises: a pair of light polarizing filters 16 and 17 for the left and right eyes of the viewer; a pair of phase-error correcting filters 18 and 19 for placed before the left and right polarizing filters 20 and 21, respectively, for phase retarding light rays passing therethrough, while correcting phase-retardation errors introduced during SMI display and imparting orthogonal polarization states P1 and P2 thereto, respectively, during SMI display; and a pair of color-intensity correction filters 20 and 21 placed after the left and right polarizing filters, respectively. Collectively, light polarizing filters 16 and 17 and the phase-retardation error correcting filters 18 and 19 cooperate to decode the polarization-encoded visual channels of the system, while eliminating wavelength-dependent phase-retardation error and the problems attendant therewith (i.e. visual channel cross-talk and asymetric image distoration) while color-intensity correction filters correct for color intensity distortion introduced by retardation based micropolarization panel. As will be described in greater detail hereinafter, the light polarizing filters 16 and 17 will differ depending on the particular embodiment of micropolarization panel employed in the SMI display subsystem.

In general, the phase-corrective viewing device of the present invention can be realized in various forms, including eyeglasses, soft-contact lenses, head-mounted goggles, a viewing-visor supported upon a free-standing kiosk, or any other device supportable before the eyes of a human viewer or left and right perspective cameras of a computer-based stereoscopic vision system. However, for purposes of illustration, the SMI viewing subsystem in each of the stereoscopic 3-D viewing systems of the present invention to be described hereinbelow, comprises a pair of polarized viewing glasses having phase-retardation and color-intensity error correcting filter characteristics which allow for stereoscopic viewing of 3-D objects, substantially free of visual channel cross-talk, asymetric image distortion, and color-intensity (i.e. chromatic) image distortion chararacteristic of prior art SMI display systems and methodologies.

THE STEREOSCOPIC VIEWING SYSTEM OF THE FIRST ILLUSTRATIVE EMBODIMENT COMPRISING A MICROPOLARIZATION PANEL WITH {π, 0} RADIAN PHASE RETARDING ARRAYS AND STEREOSCOPIC VIEWING EYE-GLASSES WITH PHASE-RETARDATION ERROR CORRECTING TRANSMISSION CHARACTERISTICS

Figure 2:
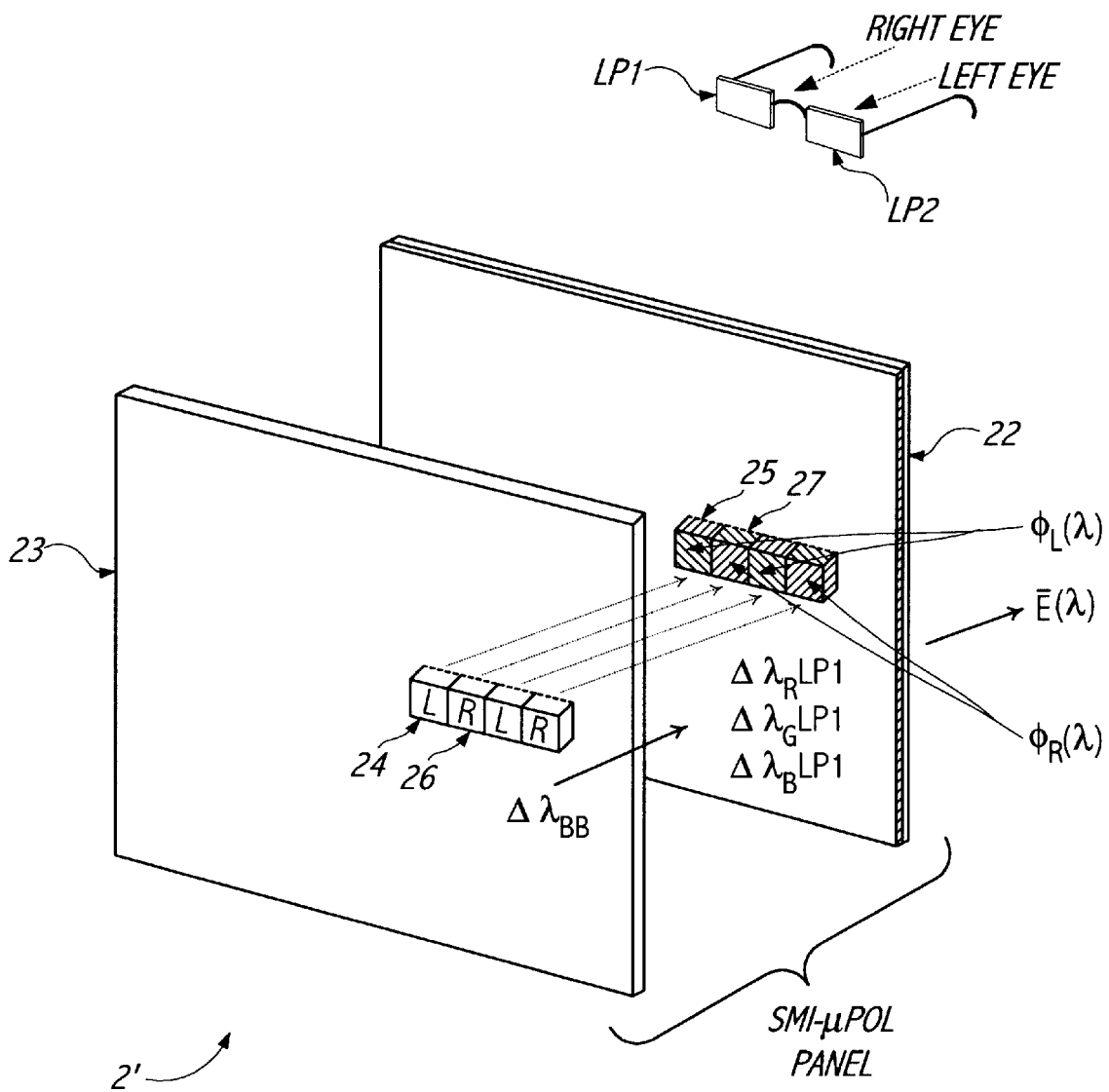
FIG. 2 is a partially exploded schematic diagram of a first illustrative embodiment of the SMI display device of the present invention comprising a phase-retarding micropolarization panel affixed to a SMI display structure, and a pair of conventional linearly-polarizing viewing glasses for demultiplexing micropolarized SMIs displayed therefrom during stereoscopic viewing, wherein each left perspective image pixel of the SMI display structure is in spatial registration with a phase-retarding cell in the micropolarization panel so that the right perspective image pixels of the SMI display panel are encoded with the linear polarization state LP1 while the left perspective image pixels are encoded with the linear polarization state LP2.
Figure 2A:
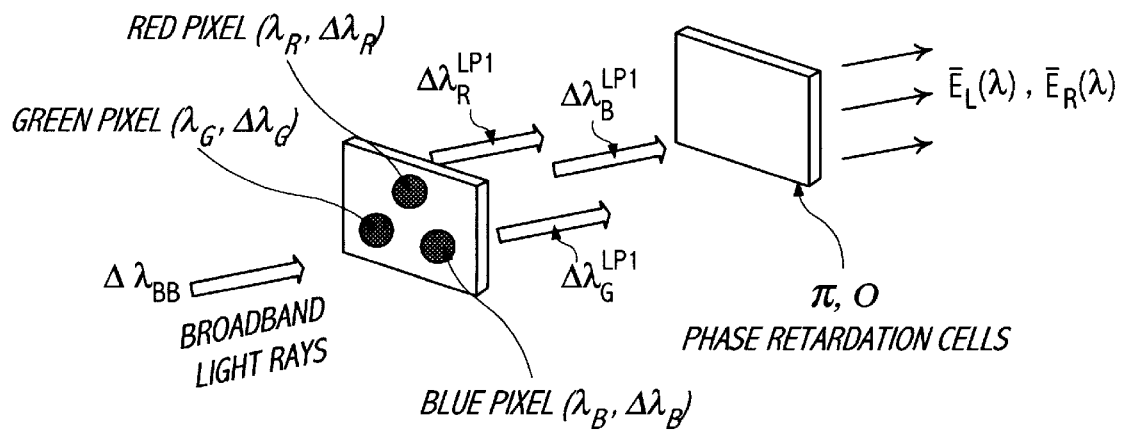
FIG. 2A is a schematic diagram illustrating the high-level structure of an image pixel (i.e. left or right) in the SMI display device of FIG. 2, illustrating that RGB spectral components of the pixel are phase retarded by an amount dependent on the wavelength of the spectral components being transmitted through the phase-retarding cell in spatial registration with the left and right perspective image pixels.
Figure 2B:
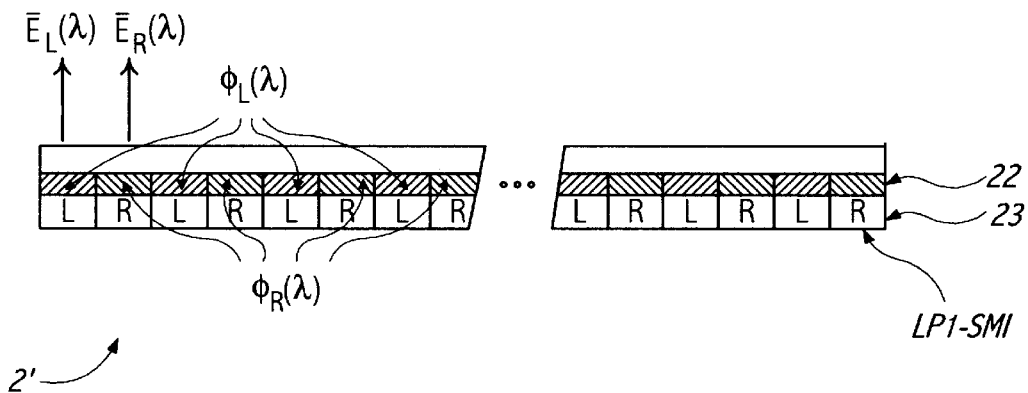
FIG. 2B is a partially fragmented, cross-sectional view of the SMI display device of FIG. 2, showing in greater detail the substructure of the SMI display structure and the micropolarization panel thereof.
Figure 2C:
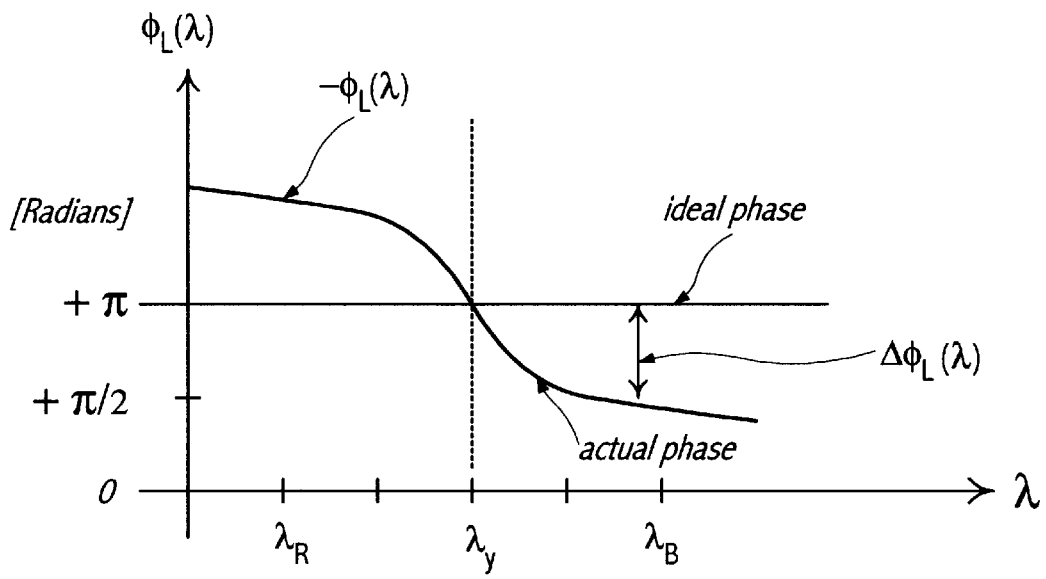
FIG. 2C is a graphical representation showing (i) the ideal amount of phase retardation imparted by the micropolarization panel of the exemplary SMI display device of FIG. 2 to each wavelength of illumination from each left perspective image pixel location along the SMI display surface (e.g. LCD panel) thereof, (ii) the actual amount of phase retardation imparted by the micropolarization panel to each wavelength of illumination from each left perspective image pixel location along the SMI display surface, and (iii) the amount of phase-error imparted by the micropolarization panel to each wavelength of illumination from each left perspective image pixel location along the SMI display surface.
Figure 2D:
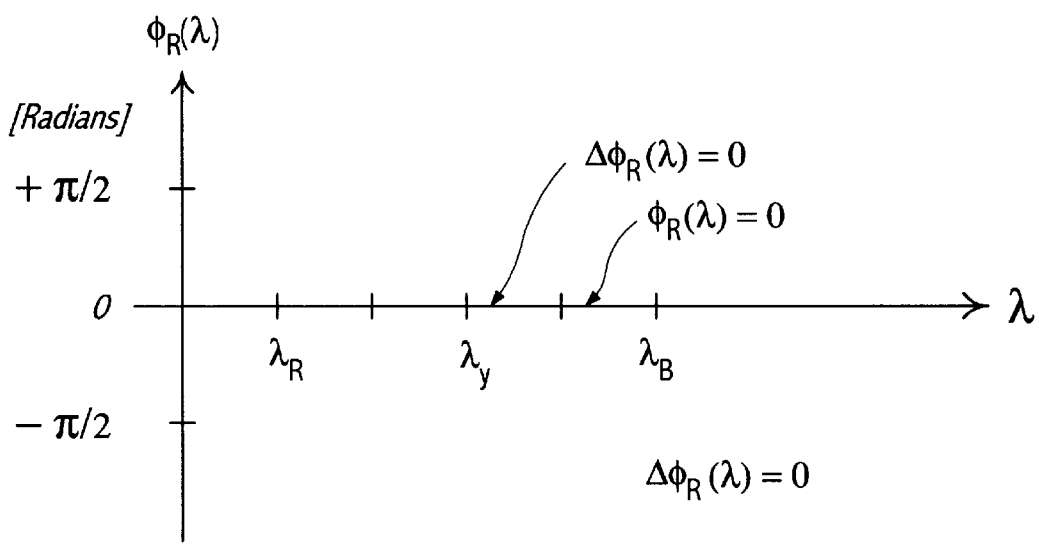
FIG. 2D is a graphical representation showing (i) the ideal amount of phase retardation imparted by the micropolarization panel of the exemplary SMI display device of FIG. 2 to each wavelength of illumination from each right pixel location along the SMI display surface thereof, (ii) the actual amount of phase retardation imparted by the micropolarization panel to each wavelength of illumination from each right perspective image pixel location along the SMI display surface, and (iii) the amount of phase-error imparted by the micropolarization panel to each wavelength of illumination from each right perspective image pixel location along the SMI display surface.
Figure 2E:
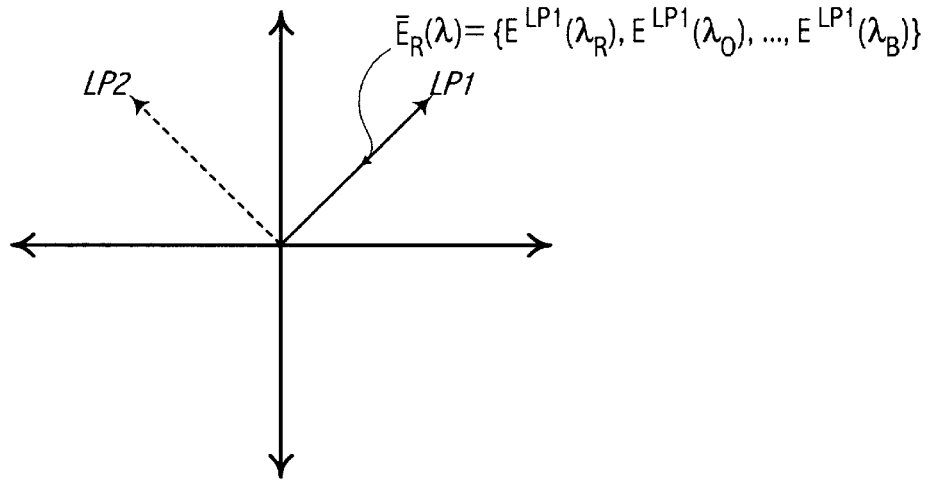
FIG. 2E is a schematic representation showing the electric field vectors representative of the various spectral components in the visible-band produced from the right perspective image pixel structures of the SMI display device of FIG. 2, while being imparted solely with the linear polarization state LP1 and thus avoiding the introduction of phase-error dependent cross-talk into the left visual-channel of the SMI display system.
Figure 2F:
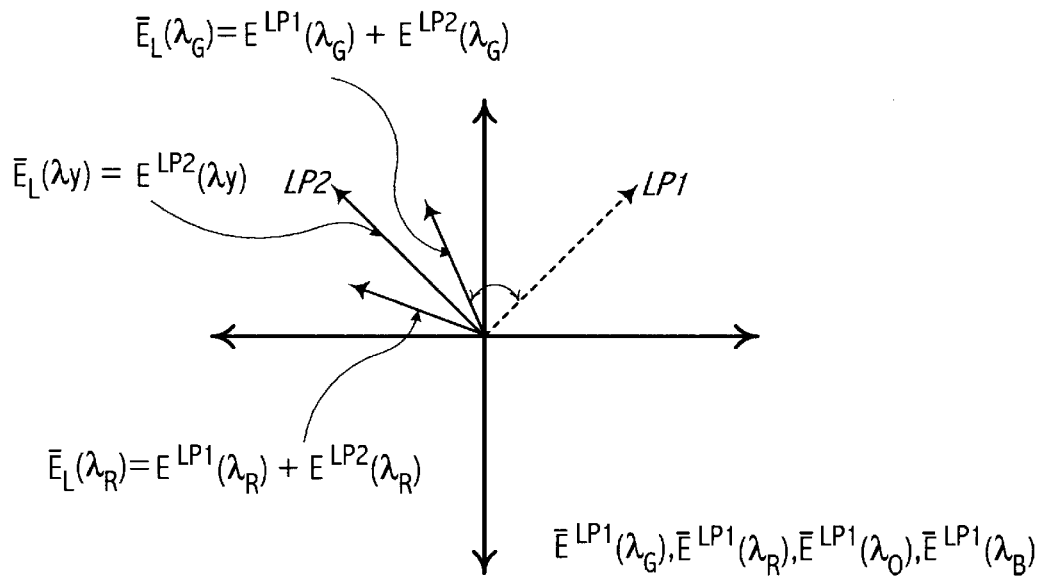
FIG. 2F is a schematic representation showing the electric field vectors repesentative of the various spectral components in the visible-band produced from the left pixel structures (e.g., phase retardation cells) along the SMI display device of FIG. 2, while being imparted with both linear polarization states LP1 and LP2, and thus causing phase-error dependent cross-talk to be introduced into the left visual-channel of the SMI display system.
Figure 2G:
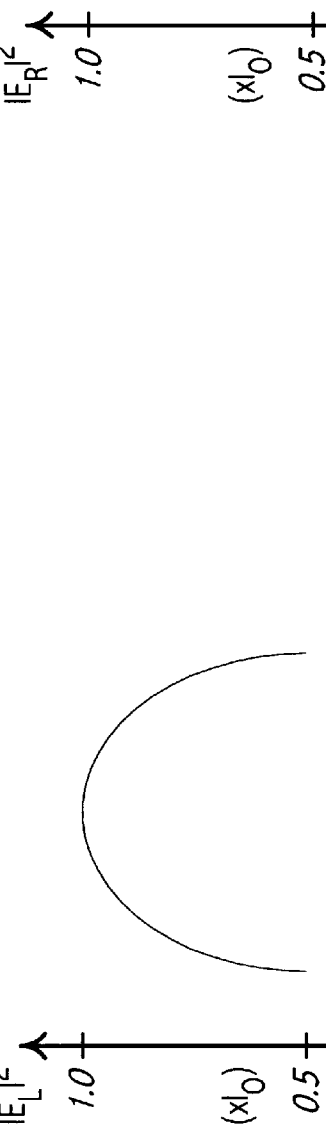
FIG. 2G is a schematic representation illustrating the presence of color intensity distortion in the left visual channel of the system of FIG. 2, perceptible by the left eye of a viewer wearing conventional linearly polarizing viewing glasses, as a result of the non-zero phase-error characteristics associated with left perspective image pixel structures (i.e. $\Delta\phi_L(\lambda)$ ) in the SMI display panel thereof.
Figure 2H:
FIG. 2H is a schematic representation illustrating the absence of color intensity distortion in the left visual channel of the system of FIG. 2, imperceptible by the left eye of a viewer wearing conventional linear polarizing viewing glasses, as a result of the zero phase-error characteristics associated with right perspective image pixel structures (i.e. $\Delta\phi_R(\lambda)=0$) in the SMI display panel thereof.

In the first illustrative embodiment of the stereoscopic viewing system hereof, the SMI display subsystem 2' comprises a phase-retarding micropolarization panel 22 laminated onto a SMI display structure 23, as shown in FIGS. 2 through 2H. As best illustrated in FIGS. 2 through 2B, the light rays emanating from the left and right perspective image pixels of the displayed SMI are designed to have first and second linear polarization states LP1 and LP2 which are orthogonal to each other. In this illustrative embodiment, polarization state LP1 is a first linear polarization state, whereas polarization state LP2 is a second linear polarization state orthogonal to the first linear polarization state. The first linear polarization state LP1 serves as a reference throughout the system. For purposes of illustration only, SMI display structure 23 is assumed to be from class II described above, and thus inherently produces LP1 polarized light rays from both left and right pixel of SMIs displayed therefrom. As shown, a phase retardation cell or element 24 is in registration with each left perspective image pixel 25 of the SMI displayed from its SMI display structure 23, and introduces π radian phase retardation to the light rays thereof and thus functions as a half-wave retarder, whereas the phase retardation cell or element 26 in registration with each right perspective image pixel 27 of the displayed SMI introduces 0-radian phase retardation to the light rays thereof and thus functions as a zero-wave retarder. Notably, the linear polarization direction LP1 is the reference direction of the system and is arranged at 45 degrees with respect to th ordinary and extraordinary optical axes (i.e. $n_o$ and $n_e$) of each π-radian phase retardation element associated with the left perspective image pixel structures of the micropolarization panel. As shown, this particular phase retardation panel construction can be used in connection with any one of numerous types of available SMI display structures described above to produce a subsystem for displaying micropolarized SMIs for stereoscopic viewing with the polarizing eyeglasses of the first illustrative embodiment shown in FIG. 3 through 3D.

The function of the retardation-based micropolarization panel 2' is to polarization-encode with a single linear polarization state (e.g. LP1), all of the energy of each left perspective image pixel from a displayed SMI, while all of the energy of each right perspective image pixel from the displayed SMI is polarization-encoded with its orthogonal linear polarization state (e.g. LP2). In this way, all of the photonic energy associated with the left perspective image pixels of the displayed SMI is polarization encoded along the left visual channel of the stereoscopic viewing system, while all of the photonic energy associated with the right perspective image pixels of the displayed SMI is polarization encoded along the right visual channel of the system. Without the occurrence of cross-talk between the visual channels of the system, from whatever source derived, perfect stereoscopic viewing would, in theory, be possible. However, Applicant has discovered that in practice, this is not possible when using retardation-based micropolarization panels, as the phase-retarding characteristics thereof are strongly dependent on the wavelength of spectral components of displayed spatially-multiplexed imagery. Thus while ideally one would like each $\pi$ phase retardation cell in micropolarization panel of FIGS. 2 and 2B to impart exactly a $\pi$-radian phase retardation to the electric field (i.e. E-field) of incident wavefronts (i.e. light rays) at all wavelengths of visible light, this desired result is simply not possible when using a birefringent (i.e. anisotropic) medium, such as poly vinyl alcohol, polycarbonate or liquid crystal polymeric films, to realize a micropolarization panel which employs phase retardation principles as described hereinabove. The consequences of this phenomena on the stereoscopic display process can be understood by reference to FIGS. 2A, 2E and 2F.

As shown in FIG. 2A, light rays (i.e. wavefronts) emanating from the SMI display structure contains a broad band of spectral components $\{\lambda_R, \ldots, \lambda_O, \ldots, \lambda_Y, \ldots \lambda_P, \ldots, \lambda_B, \ldots, \lambda_V\}$ which emanate from each pixel in the SMI display structure. The E-field components associated with the band of spectral components emanating from each left perspective image pixel in a displayed SMI are transmitted through its registered $\pi$-phase retardation cell. Similarly, as shown in FIG. 2A, the E-field components associated with the band of spectral components emanating from each right perspective image pixel in the SMI are transmitted through its registered 0-phase retardation cell. The actual phase retardation characteristics of each $\pi$-phase retardation cell in an exemplary microretardation array are 25 shown in the plot of FIG. 2C, whereas the actual phase retardation characteristics of each 0-radian phase retardation cell in the exemplary microretardation array are shown in FIG. 2D. As the phase retardation characteristics of each 0-phase retardation cell are substantially zero over all wavelengths in the visible band $\Delta\lambda$ of its associated pixel element, all of the spectral components in each of the three spectral component groups will be transmitted therethrough without undergoing phase retardation. However, as the phase retardation characteristics of each $\pi$-phase retardation cell are not constant over all wavelengths in the visible band of its associated pixel element, many, if not nearly all of the spectral components in each of the three spectral component groups will be retarded a different amount of phase from the ideal (i.e. desired) $\pi$-radian retardation. If not corrected or compensated for, this error in phase retardation across the operating band of each left pixel phase retardation cell in the micropolarization panel, indicated as $\Delta\phi_L(\lambda)$, will have a profound effect upon the stereoscopic viewing process in both color and gray-scale SMI display applications.

The phase-error characteristics associated with the SMI display panel of FIG. 2 adversely influence the stereoscopic viewing process in a number of significant ways. An understanding of the problems presented by such phase-error characteristics can be best illustrated by analyzing (1) the E-field components produced from both the left and right pixel structures of the SMI display subsystem of FIG. 2, and then (2) the color intensity distortion perceived by both the left and right eyes of a viewer wearing conventional polarizing eyeglasses designed therefor, by virtue of the phase-error characteristics of the left and right pixel structures of the SMI display subsystem of FIG. 2.

As shown in FIG. 2E, the spectral components produced from right perspective image pixels in the SMI display structure are represented by their electric field vector representation, generally expressed as $E_R(\lambda)$. As shown, the spectral components at each of the major spectral groups (e.g. $\Delta\lambda_R, \ldots, \Delta\lambda_O, \ldots, \Delta\lambda_G, \ldots, \Delta\lambda_P, \ldots, \Delta\lambda_V$) associated with the right perspective image pixels are imparted (i.e. encoded) with only the LP1 linear polarization state as they emanate from the surface of the micropolarization panel. Thus, the right perspective image pixels of SMIs displayed from the SMI display subsystem of the first illustrative embodiment are free of E-field components capable of producing cross-talk in the left visual channel. As shown FIG. 2F, the spectral components produced from left perspective image pixels in the SMI display structure are represented by their electric field vector representation, generally expressed as $E_L(\lambda)$. As shown, the spectral components at each at each of the major spectral groups (e.g. $\Delta\lambda_R, \ldots, \Delta\lambda_O, \ldots, \Delta\lambda_G, \ldots, \Delta\lambda_P, \ldots, \Delta\lambda_V$) associated with left perspective image pixels are not imparted with only the linear polarization state LP1, but rather a portion of the intensity of the E-field components of these spectral components is imparted (i.e. encoded) with the linear polarization state LP2, while the balance of the intensity of the E-field components of these spectral components is imparted with the linear polarization state LP1. In other words, not all of the E-field intensity associated with the spectral components of displayed left perspective image pixels is encoded with the linear polarization state LP2, but rather a percentage of the E-field intensity is encoded with the LP1 polarization state. By virtue of this cross-polarization phenomena, caused by the introduction of wavelength-dependent phase-retardation error described above, some of the E-field intensity of spectral components associated with left perspective image pixels in displayed SMIs is polarization-encoded onto the right visual-channel, when in principle it should be restricted to the left visual channel. Thus this embodiment of the SMI display subsystem produces E-field cross-talk components in only one visual channel of the system.

When produced SMIs are displayed from the SMI display subsystem of the first illustrative embodiment, shown in FIG. 2, and are viewed through a matched pair of linearly-polarizing eyeglasses as taught, for example, in copending Continuation application Ser. No. 08/126,077, filed Sep. 23, 1993, the problems associated with visual channel cross-talk, stereoscopic asymmetry and chromatic image distortion will necessarily manifest themselves to the visual system of human viewers, significantly degrading the stereoscopic viewing experience thereof. The reasons for such degradation in the stereoscopic viewing experience can be explained as follows.

When wearing the conventional linearly-polarizing viewing glasses of FIG. 2 during polarization decoding, the left eye of the viewer receives (i.e. views) the LP1-polarized E-field intensity associated with the spectral components of left perspective image pixels in the displayed SMI through the left-eye LP1-polarizing filter. The magnitude of the E-field intensity of such spectral components viewed by the left-eye of the viewer is given by the expression $I_O\text{Cos}^2[\Delta\phi_L(\lambda)]$ as illustrated in FIG. 2G. If there existed a source of phase-retardation error in the right perspective image pixel structures of the SMI display panel, then the left eye of the viewer would also receive (i.e. view) through the left-eye LP1-polarizing filter, LP1-polarized E-field intensity associated with the spectral components of displayed right perspective image pixels. As illustrated in FIG. 2H, the magnitude of the E-field intensity of such spectral components viewed by the left-eye of the viewer would be described by the expression $I_0\text{Sin}^2[\Delta\phi_R(\lambda)]$. However, since there are no phase-retarding elements in the right perspective image pixel structures of the SMI display system of FIG. 2 (i.e. $\Delta\phi_R(\lambda)=0$ for all $\lambda$ over the optical band), there is no source of phase-retardation error therein. Therefore, there is only one source of color intensity distortion in the left visual channel of the SMI display system of FIG. 2.

Figure 2J:
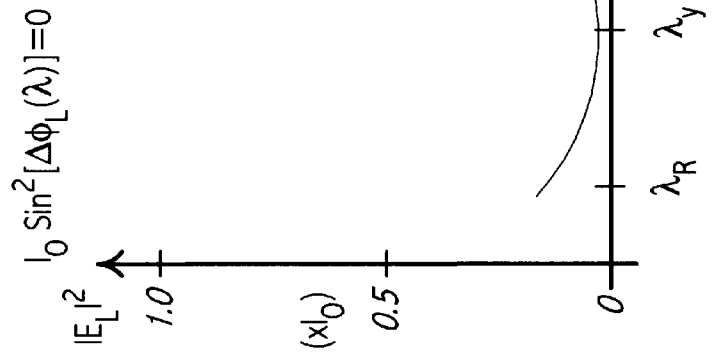
FIG. 2J is a schematic representation illustrating the existence of color intensity distortion in the right visual channel of the system of FIG. 2, perceptible by the right eye of a viewer wearing conventional linearly polarizing viewing glasses, as a result of the non-zero phase-error characteristics associated with left perspective image pixel structures (i.e. $\Delta\phi_L(\lambda)$) in the SMI display panel thereof.
Figure 2I:
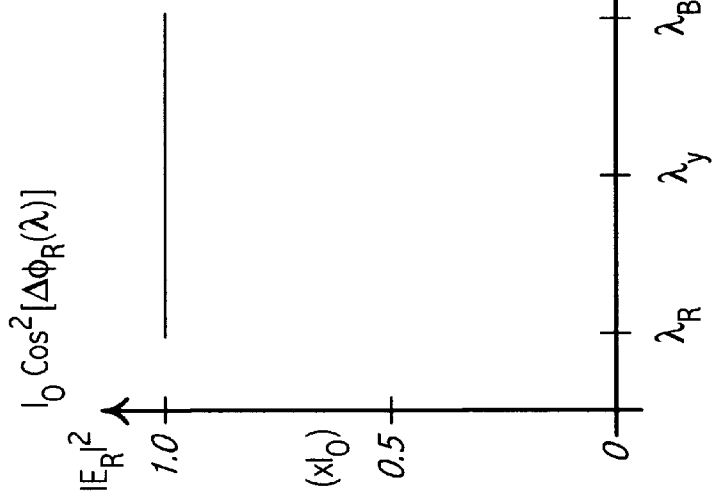
FIG. 2I is a schematic representation illustrating the absence of color intensity distortion in the right visual channel of the system of FIG. 2, imperceptible by the right eye of a viewer wearing conventional linear-polarizing viewing glasses, as a result of the zero phase-error characteristics associated with right perspective image pixel structures (i.e. $\Delta\phi_R(\lambda)=0$) in the SMI display panel thereof.

When wearing the conventional linearly-polarizing eyeglasses of FIG. 2 during polarization decoding, the right eye of the viewer receives (i.e. views) the P2-polarized E-field intensity associated with the spectral components of right perspective image pixels in the displayed SMI through the left-eye LP1-polarizing filter. The magnitude of the E-field intensity of such spectral components viewed by the right-eye of the viewer is given by the expression $I_0\text{Cos}^2[\Delta\phi_R(\lambda)]$. However, as there are no phase-retarding elements in the right perspective image pixel structures of the SMI display system of FIG. 2 (i.e. $\Delta\phi_R(\lambda)=0$ for all $\lambda$ over the optical band), there is no source of phase-retardation error therein, as illustrated in FIG. 2I, and the right perspective image pixel structures do not produce a 25 source of color intensity distortion into the right visual channel of the system. However, as there exists a source of phase-retardation error in the left perspective image pixel structures of the SMI display panel, the right eye of the viewer receives (i.e. views) through the right-eye LP1-polarizing filter, LP1-polarized E-field intensity associated with the spectral components of displayed left perspective image pixels. As illustrated in FIG. 2J, the magnitude of the E-field intensity of such cross-channel spectral components viewed by the left-eye of the viewer is described by the expression $I_0\text{Sin}^2[\Delta\phi_L(\lambda)]$. Consequently, there is only one source of color intensity distortion in the right visual channel of the SMI display system of FIG. 2.

Determining whether stereoscopic asymmetric distortion is introduced into the SMI display system of FIG. 2 when wearing the linearly-polarizing eyeglasses thereof, requires a two-step analytical process. The first step involves determining whether there exists a difference in the color intensity distortion characteristics $I_0\text{Cos}^2[\Delta\phi_L(\lambda)]$ and $I_0\text{Cos}^2[\Delta\phi_R(\lambda)]$ viewed by the left and right eyes of a viewer, respectively, while wearing conventional polarizing eyeglasses (not shown). The second step involves determining whether there exists a difference in the color intensity distortion characteristics $I_0\text{Sin}^2[\Delta\phi_L(\lambda)]$ and $I_0\text{Sin}^2[\Delta\phi_R(\lambda)]$ viewed by the left and right eyes of a viewer, respectively, wearing conventional polarizing eyeglasses. In the case of the first illustrative embodiment, this amounts to first comparing the color intensity distortion characteristics of FIGS. 2G and 2I, and then comparing the color intensity distortion characteristics of FIGS. 2H and 2J. When performing such an analysis, it is readily apparent that $I_0\text{Cos}^2[\Delta\phi_L(\lambda)]$ is different than $I_0\text{Cos}^2[\Delta\phi_R(\lambda)]$ and $I_0\text{Sin}^2[\Delta\phi_L(\lambda)]$ is different than $I_0\text{Sin}^2[\Delta\phi_R(\lambda)]$. Therefore, in terms of both left and right color intensity distortion characteristics and cross-channel color intensity characteristics, the left eye of a viewer wearing the conventional linearly-polarizing viewing glasses of FIG. 2 views a different amount of color intensity distortion than the right eye of the viewer, and therefore asymmetric-type stereoscopic distortion is necessarily introduced into the system.

Figure 3:
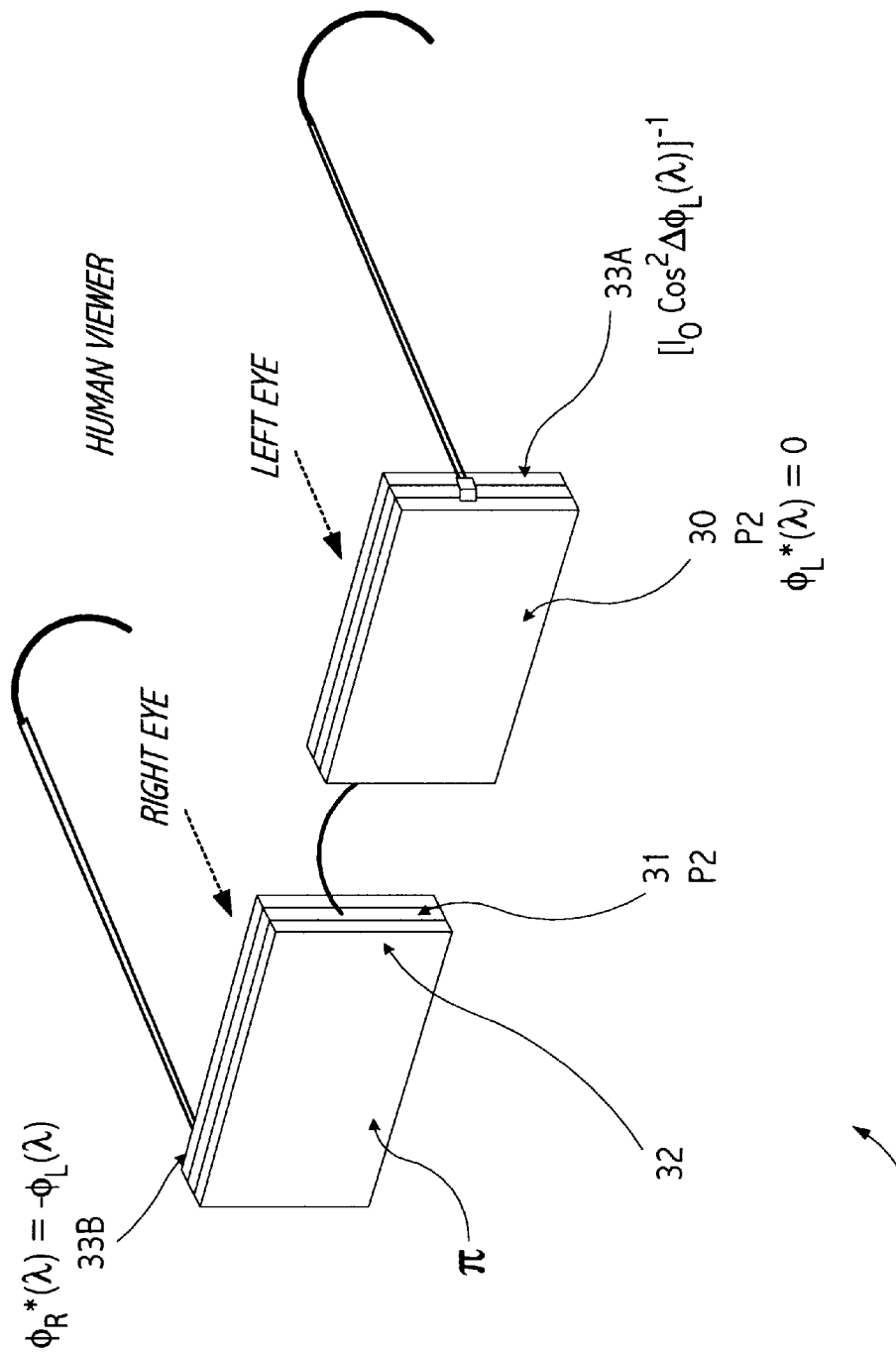
FIG. 3 is a perspective view of the first illustrative embodiment of the phase-error corrective stereoscopic viewing glasses of the present invention, adapted for use with the SMI display system shown in FIG. 2.

In accordance with the principles of the present invention, the above-described sources of stereoscopic viewing degradation are substantially eliminated when using the SMI viewing subsystem 4' shown in FIG. 3 to stereoscopically view micropolarized SMIs displayed from the SMI display structure of FIG. 2. Together, the SMI display structure of FIG. 2 and SMI viewing subsystem of FIG. 3 form the first illustrative embodiment of the stereoscopic 3-D viewing system of the present invention.

As illustrated in FIG. 3, the SMI viewing subsystem 4' of the first illustrative embodiment comprises: a pair of light polarizing filters 30 and 31 for the left and right eyes of the viewer, each imparting the LP2 linear polarization state to light rays transmitted therethrough, measured relative to the LP1 linear polarization state of light produced from within the SMI display structure; a phase-retardation error correcting filter 32 placed before the right polarizing filter 31 for correcting phase retardation errors introduced during the SMI display process; a color-intensity correction filter 33A, placed after the left polarizing filter 30 for correcting color intensity distortion in the left visual channel introduced during SMI display; and a color-intensity correction filter 33B, placed after the right polarizing filter 31 for correcting color intensity distortion in the right visual channel introduced during SMI display.

Figure 3A:
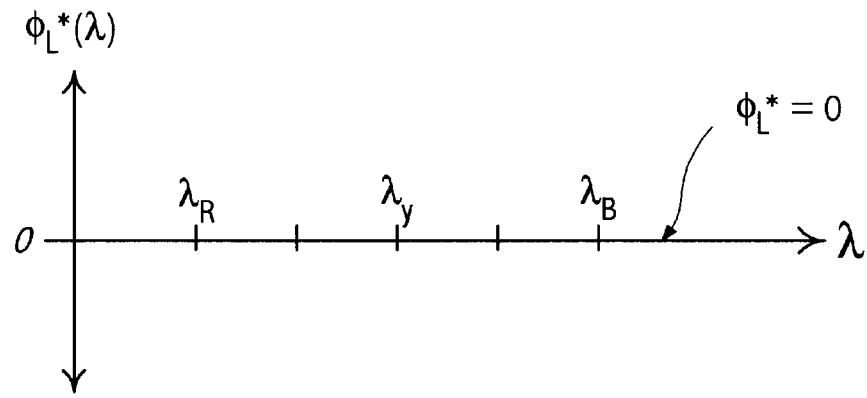
FIG. 3A is a graphical representation illustrating zero phase retardation imparted to each wavelength of illumination from displayed SMIs, by the phase-retarding panel in front of the left-eye polarizing filter in the phase corrective stereoscopic viewing glasses of FIG. 3.
Figure 3B:
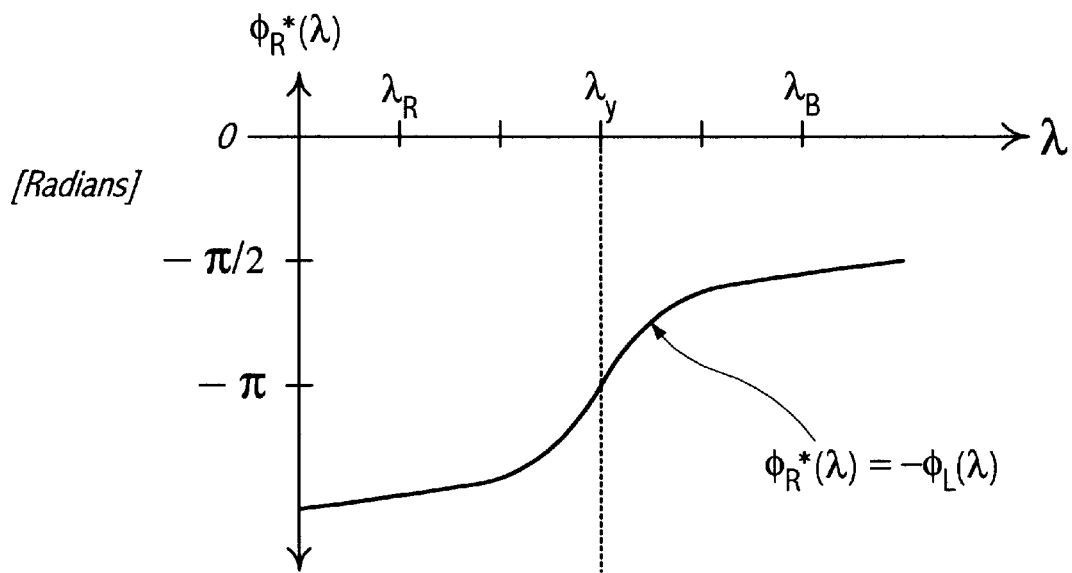
FIG. 3B is a graphical representation illustrating the actual amount of phase retardation imparted to each wavelength of illumination from displayed SMIs, by the phase-retardation error correction filter disposed before the right-eye polarizing filter in the phase corrective stereoscopic viewing glasses of FIG. 3.

In the stereoscopic viewing system of the first illustrative embodiment, the phase-error correction characteristics required before the left-eye polarizing filter 30 are given by the function $\phi_L^*(\lambda)=0$ for all values of $\lambda$ over the visible band, as shown in FIG. 3A. Consequently, there is no need for any phase-error correction element before the left-eye polarizing filter 30. The phase-error correction characteristics required for the right-eye phase-error correction filter 32 are given by the expression $\phi_R^*(\lambda)=-\phi_L(\lambda)$ as shown in FIG. 3B. The material used to realize phase-error correction filter 32 is identical to the material used to realized the π-radian retardation elements disposed before the left perspective image pixels of the SMI display system of FIG. 2. However, the phase-error correction filter 32 is spatially arranged with respect to the right-eye LP2 polarizing filter 31 so that the ordinary and extraordinary optical axes of the right-eye π-phase error correction filter 32 are disposed at 45° with respect to the LP2 linear polarization direction. The micro-retardation array of FIG. 2 and right-eye phase-error correction filter 32 can be made from polyvinyl alcohol material as taught in U.S. Pat. No. 5,327,285, incorporated herein by reference. These structures can also be made from polycarbonate films or liquid crystal polymer films, both well known in the art. With this construction, the phase retardation characteristics of the right-eye phase-error correction filter 32 imparts to each spectral component over the optical band, a phase retardation that is identically opposite to the phase retardation introduced by the phase-retarding elements associated with the left perspective image pixel structures of micropolarization panel of the system of FIG. 2, and thus cancels exactly any and all phase-retardation error introduced thereby.

Figure 3D:
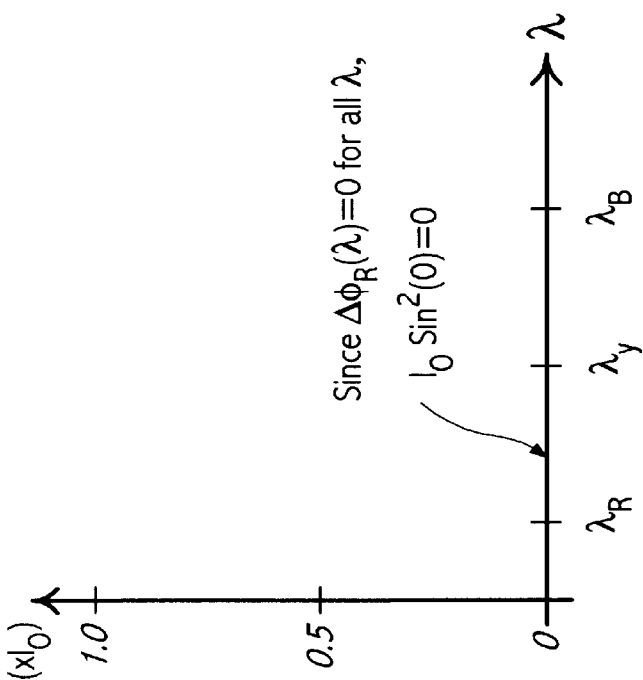
FIG. 3D is a schematic representation illustrating that the lack of phase-retarding elements in the optical path of right perspective image pixels displayed from the SMI display structure of FIG. 2 (i.e. $\phi_R(\lambda)=0$) avoids the need for a phase-error correcting filter before the left-eye polarizing filter in the phase-corrective stereoscopic viewing glasses of FIG. 3.
Figure 3C:
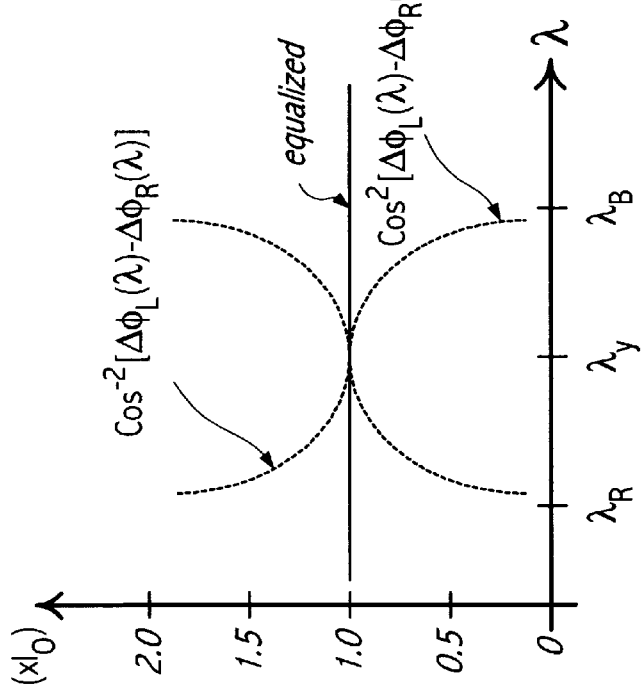
FIG. 3C. is a schematic representation illustrating how the color intensity compensation filter disposed before the left-eye polarizing filter in the phase-corrective stereoscopic viewing glasses of FIG. 3 equalizes (i.e. corrects) the color intensity distortion created by the non-zero phase-error characteristics associated with left perspective image pixel structures (i.e. $\Delta\phi_L(\lambda)$) in the SMI display panel of FIG. 2.
Figure 3F:
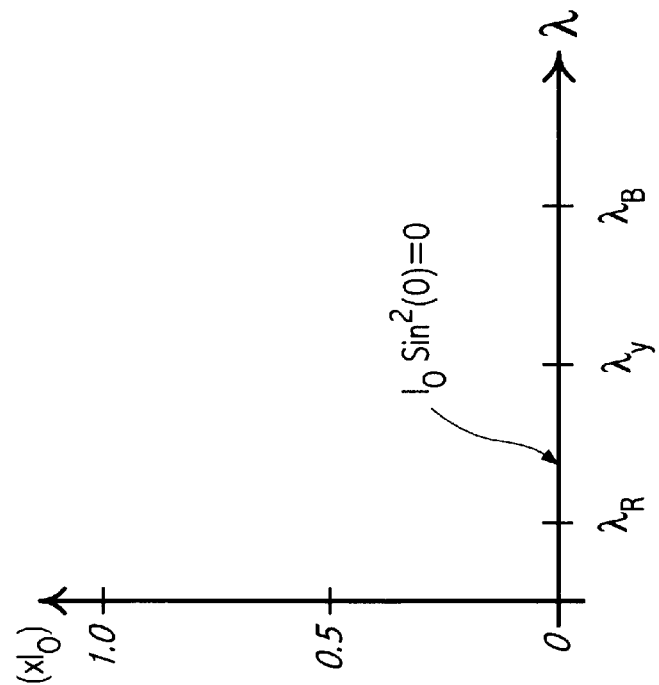
FIG. 3F is a schematic representation illustrating how the phase-error correcting filter (i.e. $-\Delta\phi_L(\lambda)$) disposed before the right-eye polarizing filter in the phase-corrective stereoscopic viewing glasses of FIG. 3 equalizes (i.e. corrects) the color intensity distortion created by the non-zero phase-error characteristics associated with left perspective image pixel structures (i.e. $\Delta\phi_L(\lambda)$) in the SMI display panel of FIG. 2.
Figure 3E:
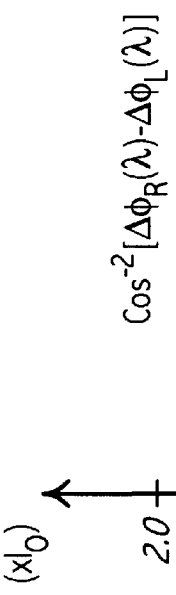
FIG. 3E is a schematic representation illustrating how the color intensity compensation filter disposed before the right-eye polarizing filter in the phase-corrective stereoscopic viewing glasses of FIG. 3 equalizes (i.e. corrects) the color intensity distortion created by the non-zero phase-error characteristics associated with right perspective image pixel structures (i.e. $\Delta\phi_R(\lambda)$) in the SMI display panel of FIG. 2.

The magnitude function for the color-intensity correction filter 33A placed after the left-eye polarizing filter 30 is given by $[I_0\text{Cos}^2(2\Delta\phi_L(\lambda))]^{-1}$ as shown in FIG. 3C. The magnitude function for the color-intensity correction filter 33B placed after the right-eye polarizing filter 31 is given by $[I_0 Cos^2(2\Delta\phi_R(\lambda))]^{-1}$ as shown in FIG. 3E. Color-intensity correcting filters with the above-described magnitude characteristics can be realized by CLC film by incorporating an appropriate mixture of adsorptive and/or reflection type pigments therewith in a manner known in the spectral filter art.

Collectively, light polarizing filters 30 and 31 and retardation-based phase-error correcting filter 32 cooperate to decode the polarization-encoded visual channels of the system while color-intensity correction filters 33A and 33B equalize the color intensity characteristics of the left and right perspective images decoded from the left and right visual channels of the system, respectively. Using the stereoscopic viewing device of the first illustrative embodiment described above, the problems attendant with the SMI display subsystem of the first illustrative embodiment (i.e. visual channel cross-talk, asymmetric stereoscopic distortion, and color-intensity image distortion) are eliminated, making possible high-quality stereoscopic viewing of 3-D objects possible. The manner in which such problems are solved using the SMI viewing device of FIG. 3 is illustrated in FIGS. 3C through 3F.

As shown in FIG. 3C, the color intensity compensation filter 33A disposed before (or after) the left-eye polarizing filter 30 in the stereoscopic viewing glasses of FIG. 3 equalizes (i.e. corrects) the color intensity distortion created by the non-zero phase-error characteristics (i.e. $\Delta\phi_L(\lambda)$ ) associated with left perspective image pixel structures in the SMI display panel of FIG. 2. As shown in FIG. 3D, a phase-error correcting filter is not necessary before the left-eye polarizing filter 30 as no color intensity distortion is created in the left eye of the viewer by the zero phase-error characteristics (i.e. $\phi(\lambda)=0$ and $\Delta\phi_R(\lambda)=0$ for all $\lambda$ ) associated with right perspective image pixel structures in the SMI display panel of FIG. 2. As shown in FIG. 3E, the color intensity compensation filter 33B disposed before (or after) the right-eye polarizing filter 31 in the stereoscopic viewing glasses of FIG. 3 equalizes (i.e. corrects) the color-intensity distortion created by the non-zero phase-error characteristics associated with phase-error correcting filter before the right-eye of the viewer in the viewing glasses of FIG. 3. As shown in FIG. 3F, the phase-error correcting filter 32 (i.e. $-\Delta\phi_L(\lambda)$ ) disposed before the right-eye polarizing filter 31 equalizes (i.e. corrects) the color intensity distortion created by the non-zero phase-error characteristics associated with left perspective image pixel structures (i.e. $\Delta\phi_L(\lambda)$) in the SMI display panel of FIG. 2.

THE STEREOSCOPIC VIEWING SYSTEM OF THE SECOND ILLUSTRATIVE EMBODIMENT COMPRISING A MICROPOLARIZATION PANEL HAVING {+π/2, −π/2} RADIAN PHASE RETARDING ARRAYS AND STEREOSCOPIC VIEWING EYEGLASSES WITH PHASE-RETARDATION ERROR CORRECTING TRANSMISSION CHARACTERISTICS

Figure 4:
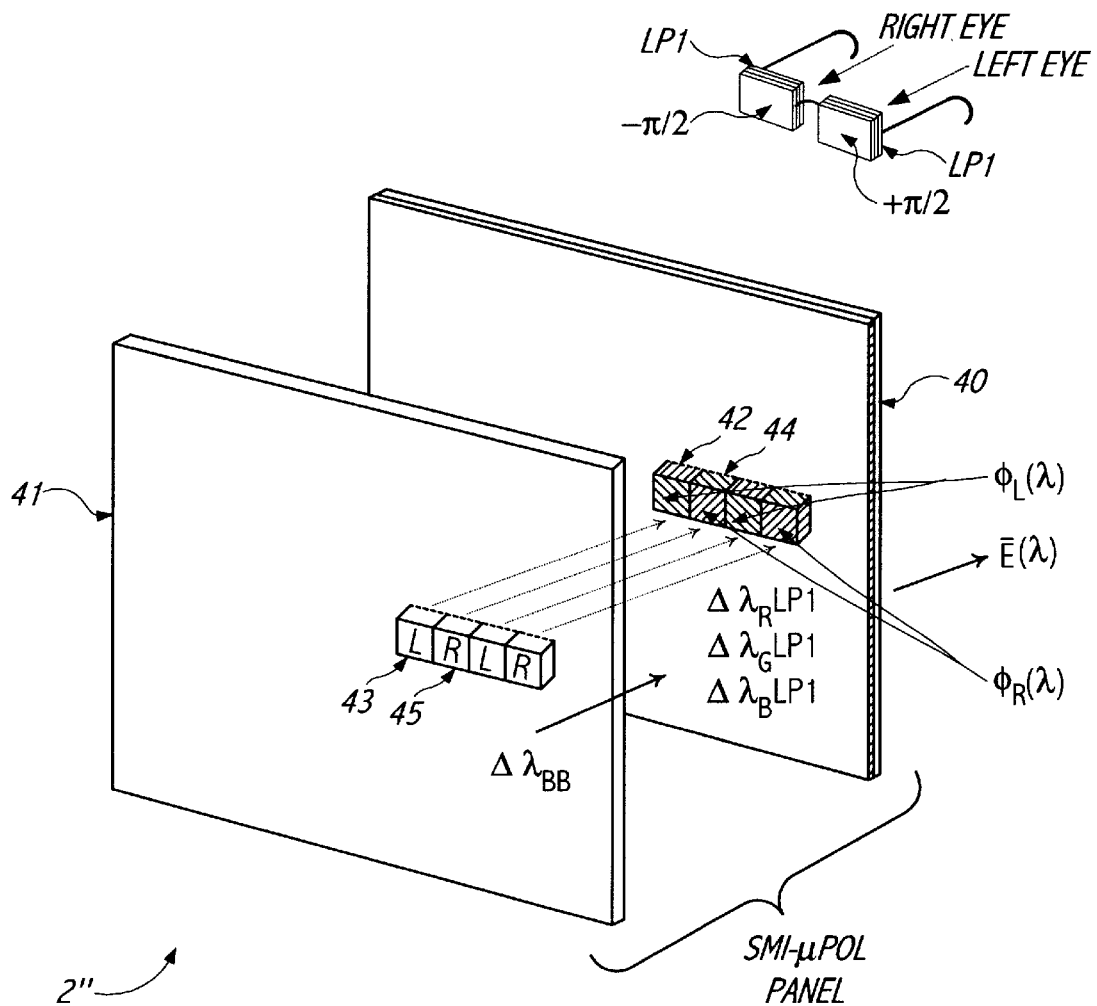
FIG. 4 is a partially-exploded schematic diagram of a second illustrative embodiment of the SMI display assembly of the present invention comprising a micropolarization panel affixed to a SMI display structure, and a pair of conventional circulary-polarizing viewing glasses for demultiplexing micropolarized SMIs displayed therefrom during stereoscopic viewing, wherein each left perspective image pixel of the SMI display structure is in spatial registration with a first-type phase-retarding cell in the micropolarization panel and each right perspective image pixel of the SMI display structure is in spatial registration with a second-type phase-retarding cell in the micropolarization panel, so that the right perspective image pixels of the SMI display panel are encoded with the RHP circular polarization state while the left perspective image pixels are encoded with the LHP circular polarization state.
Figure 4A:
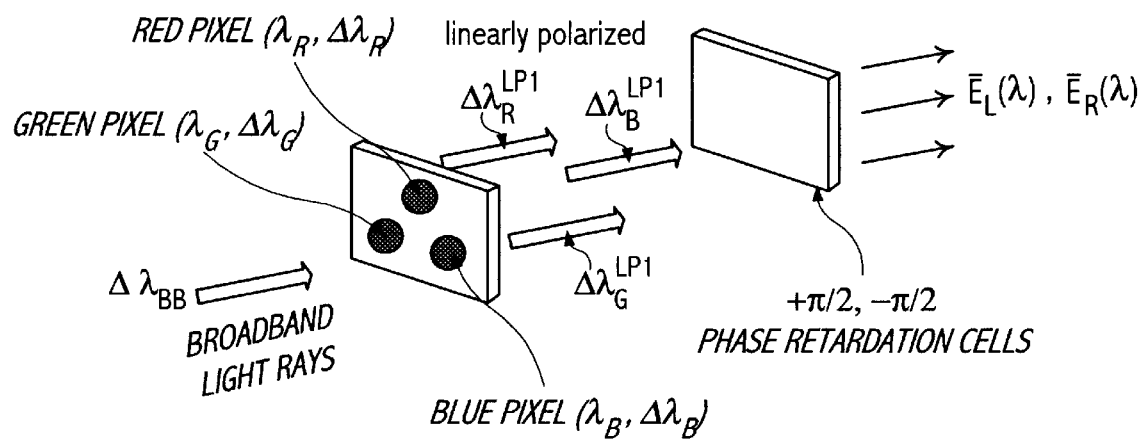
FIG. 4A is a schematic diagram illustrating the high-level structure of an image pixel (i.e. left or right perspective image pixel) in the SMI display assembly of FIG. 4, illustrating that RGB spectral components of each left and right perspective image pixel are phase retarded by an amount dependent on the wavelength of the spectral components being transmitted through the phase-retarding cell in registeration with the image pixel.
Figure 4B:
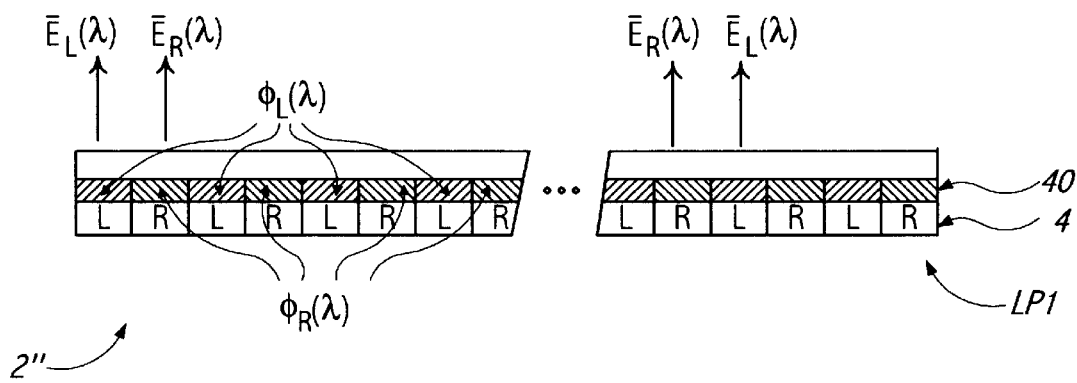
FIG. 4B is a partially-fragmented, cross-sectional view of the SMI display device of FIG. 4, showing in greater detail the SMI display structure and the micropolarization panel thereof.
Figure 4C:
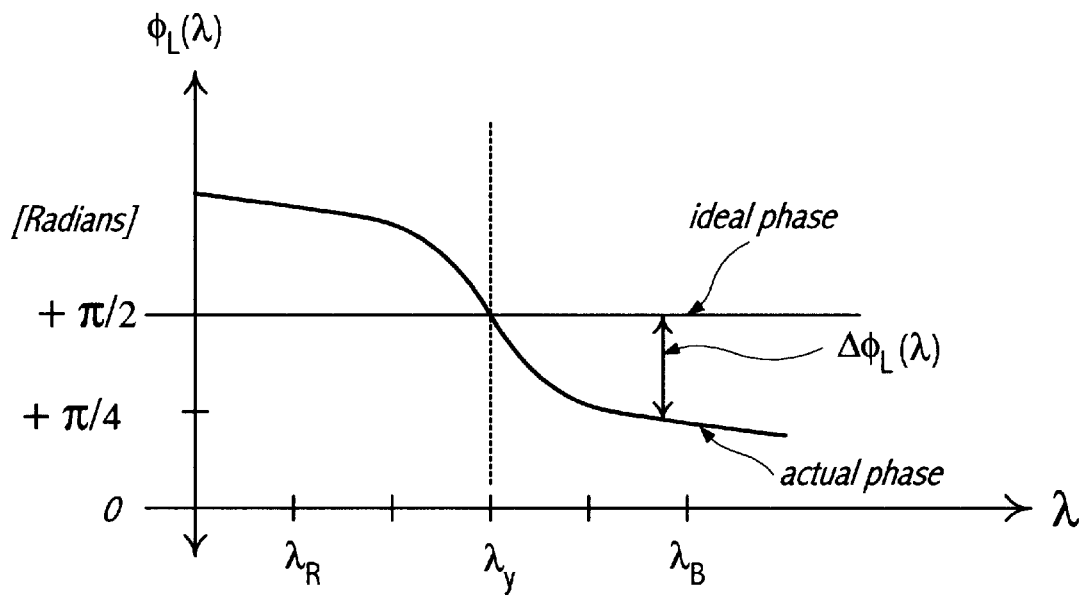
FIG. 4C is a graphical representation showing (i) the ideal amount of phase retardation imparted by the micropolarization panel of the exemplary SMI display device of FIG. 4 to each wavelength of illumination from each left pixel location along the SMI display surface (e.g. LCD panel) thereof, (ii) the actual amount of phase retardation imparted by the exemplary micropolarization panel to each wavelength of illumination from each left pixel location along the SMI display surface, and (iii) the amount of phase-retardation error imparted by the micropolarization panel to each wavelength of illumination from each left perspective image pixel location along the SMI display surface.
Figure 4D:
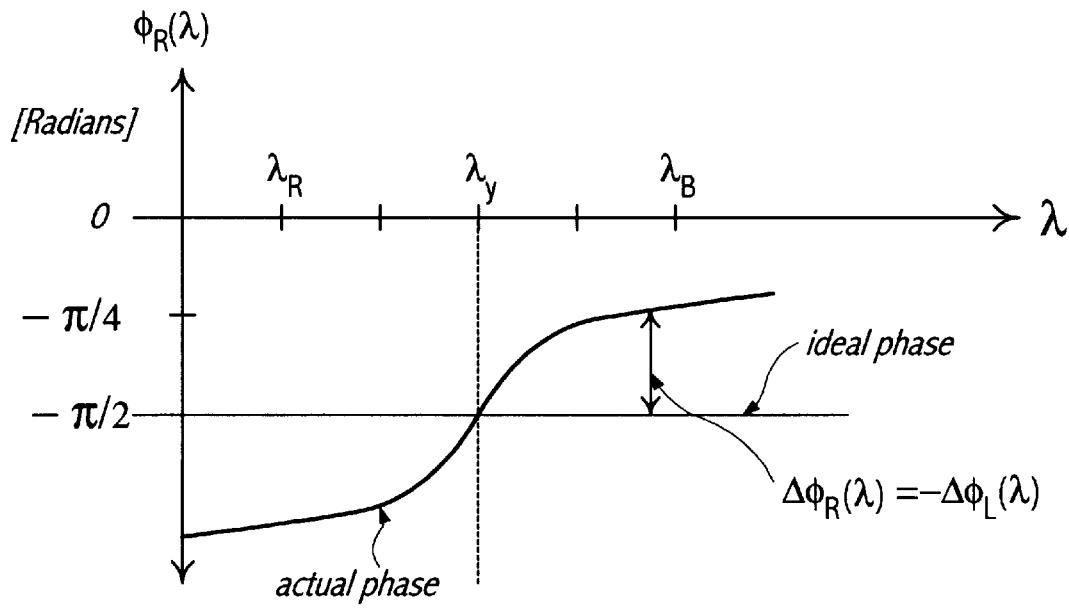
FIG. 4D is a graphical representation showing (i) the ideal amount of phase retardation imparted by the micropolarization panel of exemplary the SMI display device of FIG. 4 to each wavelength of illumination from each right perspective image pixel location along the SMI display surface (e.g. LCD panel) thereof, (ii) the actual amount of phase retardation imparted by the micropolarization panel to each wavelength of illumination from each right perspective image pixel location along the SMI display surface, and (iii) the amount of phase-retardation error imparted by the micropolarization panel to each wavelength of illumination from each right perspective image pixel location along the SMI display surface.
Figures 4G, 4H:
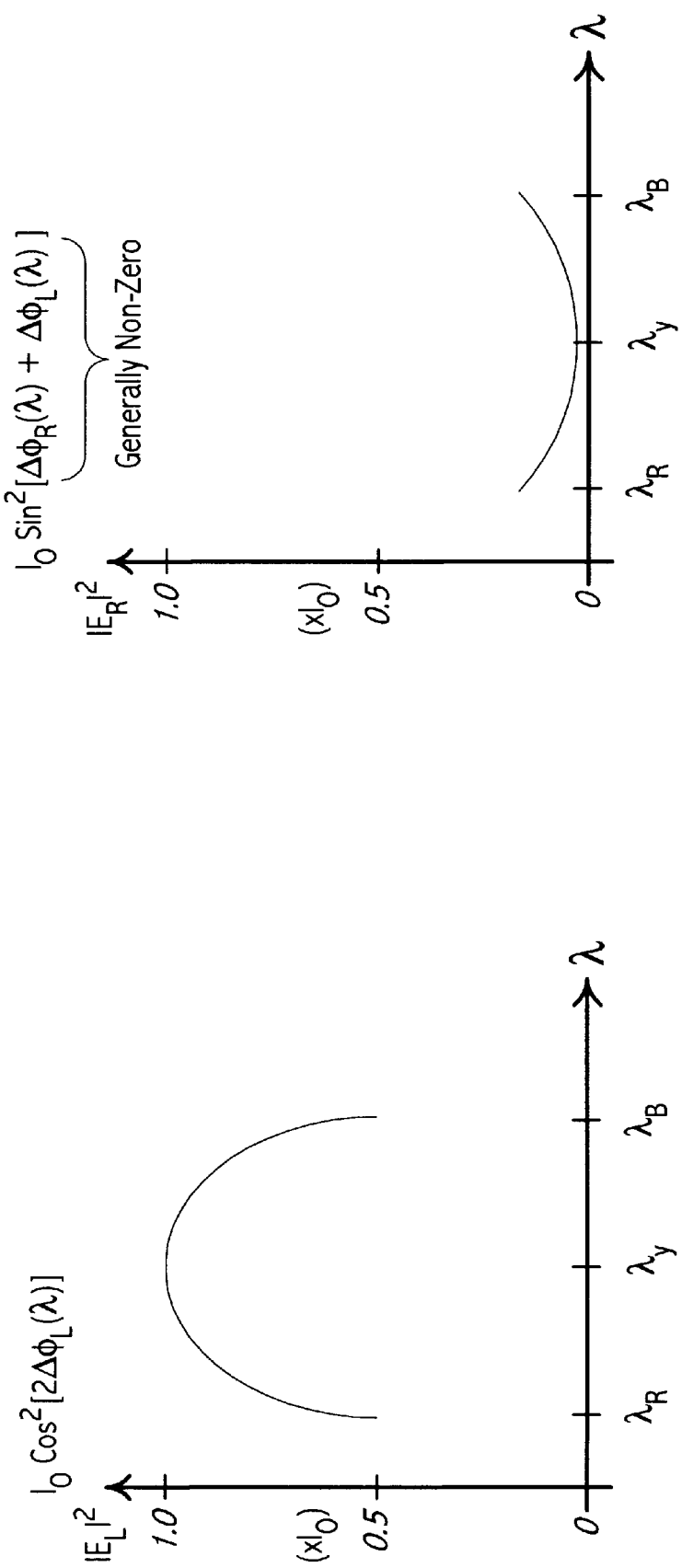
FIG. 4G is a schematic representation illustrating the presence of color intensity distortion in the left visual channel of the system of FIG. 4, perceptable by the left eye of a viewer wearing conventional circularly polarizing viewing glasses, as a result of the non-zero phase-error characteristics associated with left perspective image pixel structures (i.e. $\Delta\phi_L(\lambda)$) in the SMI display panel thereof.
FIG. 4H is a schematic representation illustrating the presence of color intensity distortion in the left visual channel of the system of FIG. 4, perceptable by the left eye of a viewer wearing conventional circularly polarizing viewing glasses, as a result of the non-zero phase-error characteristics associated with right perspective image pixel structures (i.e. $\Delta\phi_R(\lambda)$) in the SMI display panel thereof.

In the second illustrative embodiment of the stereoscopic viewing system hereof, the SMI display subsystem 2" comprises a phase-retarding micropolarization panel 40 laminated onto a SMI display structure 41, as shown in FIGS. 4 through 4B. As best illustrated in FIGS. 4 through 4H, the light rays emanating from the left perspective image pixel structures of the displayed SMI are designed to have a first circular polarization state (e.g. left-handed circular polarization (LHP) state), whereas the light rays emanating from the right perspective image pixel structures of the displayed SMI are designed to have a second circular polarization state (e.g. right-handed circular polarization (RHP) state), orthogonal to the LHP state. For purposes of illustration only, SMI display structure 41 is assumed to be from class 11 described above and thus inherently produces LP1 linearly polarized light from both left and right pixels of SMIs displayed therefrom. Each +π/2-radian phase retardation cell or element 42 in registration with a left perspective image pixel 43 of the displayed SMI introduces +π/2 radian phase retardation to the light rays thereof to produce the LHP state and thus functions as a quarter-wave retarder. Each phase retardation cell or element 44 in registration with a right perspective image pixel 45 of the displayed SMI introduces −π/2 radian phase retardation to the light rays thereof to produce the RHP state and thus functions as a quarter-wave retarder. As shown, this phase retardation panel construction can be used in connection with any one of numerous types of available SMI display structures to produce a subsystem for displaying micropolarized SMIs for 3-D stereoscopic viewing with the stereoscopic viewing glasses of the second illustrative embodiment shown in FIGS. 5 through 5D. Notably, linear polarization direction LP1 is the reference direction with respect to the physical arrangement of linear polarizing and phase retardation structures within the stereoscopic display system. The P2 linear polarization direction is oriented 90° counterclockwise from the LP1 polarization direction. In accordance with such reference conventions, the ordinary and extraordinary optical axes (i.e. $n_O$ and $n_\Theta$) of each +π/2-phase retardation element associated with a left perspective image pixel of the micropolarization panel is arranged at 45 degrees with respect to the LP1 polarization direction, whereas the ordinary and extraordinary optical axes (i.e. $n_O$ and $n_\Theta$) of each −π/2-radian phase retardation element or cell associated with a right perspective image pixel of the micropolarization panel are arranged at 45 degrees with respect to the LP2 polarization direction.

The function of the retardation-based micropolarization panel 2" is to polarization-encode with the LHP polarization state, all of the energy of each left perspective image pixel from a displayed SMI, while all of the energy of each right perspective image pixel from the displayed SMI is polarization-encoded with its orthogonal RHP polarization state. In this way, all of the photonic energy associated with the left perspective image pixels of the displayed SMI is polarization encoded along the left visual channel of the stereoscopic viewing system, while all of the photonic energy associated with the right perspective image pixels of the displayed SMI is polarization encoded along the right visual channel of the system. In practice, this is not possible when using the SMI disppplay system of the second illustrative embodiment, inasmuch as the phase-retarding characteristics of the retardation-based micropolarization panel thereof are strongly dependent on the wavelength of spectral components of displayed spatially-multiplexed imagery. Thus while ideally one would like each +π/2 phase retardation cell in the micropolarization panel of FIGS. 4 and 4B to impart exactly a +π/2 radians phase retardation to the electric field of incident wavefronts (i.e. light rays) from left perspective image pixels; and each −π/2 phase retardation cell in the micropolarization panel of FIGS. 4 and 4B to impart exactly a −π/2 radians phase retardation to the electric field of incident wavefronts (i.e. light rays) from left perspective image pixels, this desired result is not possible when using a birefringent (i.e. anisotropic) medium to realize the micropolarization panel of this subsystem. The consequences of this phenomena can be understood by reference to FIGS. 4A, 4E and 4F.

As shown in FIG. 4A, light rays (i.e. wavefronts) emanating from the SMI display structure contains a broad band of spectral components $\{\lambda_R, \ldots, \lambda_O, \ldots, \lambda_Y, \ldots, \lambda_J, \ldots, \lambda_B, \ldots, \lambda_V\}$ which emanate from each pixel in the SMI display structure. As shown, the E-field components associated with the band of spectral components emanating from each left perspective image pixel in the displayed SMI are transmitted through its registered $+\pi/2$ phase retardation cell. Similarly, the E-field components associated with the band of spectral components emanating from each right perspective image pixel in the SMI are transmitted through the same $-\pi/2$ phase retardation cell. The actual phase retardation characteristics of each $+\pi/2$ phase retardation cell in an exemplary microretardation array are shown in the plot of FIG. 4C, whereas the actual phase retardation characteristics of each $-\pi/2$ phase retardation cell in the exemplary microretardation array are shown in FIG. 4D. As the phase retardation characteristics of each $+\pi/2$ phase retardation cell are not constant over all wavelengths in the visible band of its associated pixel element, many, if not nearly all of the spectral components in each of the three spectral component groups of left perspective image pixels will be retarded a different amount of phase from the ideal $+\pi/2$ radian retardation. Also, as the phase retardation characteristics of each $-\pi/2$ phase retardation cell are not constant over all wavelengths in the visible band of its associated pixel element, many, if not nearly all of the spectral components in each of the three spectral component groups of right perspective image pixels will be retarded a different amount of phase from the ideal $+\pi/2$ radian retardation. If not corrected or compensated for, the phase retardation error across the operating band of the left and right pixel retardation cells, indicated as $\Delta\phi_L(\lambda)$ and $\Delta\phi_R(\lambda)$, respectively, will have a profound effect upon the operation of the micropolarization panel in both color and grey-scale SMI display applications.

The phase-error characteristics associated with the SMI display panel of FIG. 4 adversely influence the stereoscopic viewing process in a number of significant ways. An understanding of the problems presented by such phase-error characteristics can be best illustrated by analyzing (1) the E-field components produced from both the left and right pixel structures of the SMI display subsystem of FIG. 4, and then (2) the color intensity distortion perceived by both the left and right eyes of a viewer wearing conventional circularly-polarizing eyeglasses, and caused by the phase-error characteristics of the left and right pixel structures of the SMI display subsystem of FIG. 4.

As shown in FIG. 4E, the spectral components produced from right perspective image pixels in the SMI display structure are represented by their electric field vector representation, generally expressed as $E_R(\lambda)$.

As shown, the spectral components at each of the major spectral groups (e.g. $\Delta\lambda_R, \ldots, \Delta\lambda_O, \ldots, \Delta\lambda_G, \ldots, \Delta\lambda_J, \ldots, \Delta\lambda_V$) associated with the right perspective image pixels are not imparted with only the RHP polarization state, but rather a portion of the intensity of the E-field components of these spectral components is imparted (i.e. encoded) with the RHP polarization state as they emanate from the surface of the micropolarization panel while the balance of the intensity of the E-field components of these spectral components is imparted with the LHP polarization state. In other words, not all of the E-field intensity associated with the spectral components of displayed right perspective image pixels is encoded with the RHP polarization state, but rather a percentage of the E-field intensity is encoded with the LHP polarization state.

As shown in FIG. 4F, the spectral components produced from left perspective image pixels in the SMI display structure are represented on the complex plane by their electric field vector representation, generally expressed as $E_L(\lambda)$. As shown, the spectral components at each at each of the major spectral groups (e.g. $\Delta\lambda_R, \ldots, \Delta\lambda_O, \ldots, \Delta\lambda_G, \ldots, \Delta\lambda_J, \ldots, \Delta\lambda_V$) associated with left perspective image pixels are not imparted with only the LHP polarization state, but rather a portion of the intensity of the E-field components of these spectral components is imparted (i.e. encoded) with the LHP polarization state while the balance of the intensity of the E-field components of these spectral components is imparted with the RHP polarization state. In other words, not all of the E-field intensity associated with the spectral components of displayed left perspective image pixels is encoded with the LHP polarization state, but rather a percentage of the E-field intensity is encoded with the RHP polarization state. By virtue of the cross-polarizing phenomena described above, caused by the wavelength-dependent phase-retardation error described above, some of the E-field intensity of spectral components associated with left perspective image pixels in displayed SMIs is polarization-encoded onto the right visual-channel, while some of the E-field intensity of spectral components associated with right perspective image pixels in displayed SMIs is polarization-encoded onto the left visual-channel. As such, this particular embodiment of the SMI display subsystem produces E-field components in both the left and right visual channels of the system.

When produced SMIs are displayed from the SMI display subsystem of the second illustrative embodiment as shown in FIG. 4 and are viewed through a matched pair of circularly-polarizing eyeglasses as taught, for example, in copending Continuation application Ser. No. 08/126,077, filed Sep. 23, 1993, the problems associated with visual channel cross-talk, stereoscopic asymmetry and color-intensity distortion will necessarily manifest themselves to the visual system of human viewers, significantly degrading the stereoscopic viewing experience thereof. The reasons for such degradation in the stereoscopic viewing experience can be explained as follows.

When wearing the conventional circularly-polarizing viewing glasses of FIG. 4 during polarization decoding (i.e. stereoscopic viewing process), the left eye of the viewer receives (i.e. views) the LHP-polarized E-field intensity associated with the spectral components of left perspective image pixels in the displayed SMI through the left-eye LP1-polarizing filter. The magnitude of the E-field intensity of such spectral components viewed by the left-eye of the viewer is given by the expression $I_0\text{Cos}^2[2\Delta\phi_L(\lambda)]$ as illustrated in FIG. 4G. Since there are phase-retarding elements in the right perspective image pixel structures of the SMI display system of FIG. 4 (i.e. $\Delta\phi_R(\lambda)$), there is an additional source of color intensity distortion in the left visual channel. Thus, through the left-eye LP1-polarizing filter, the left eye of the viewer also receives (i.e. views) LHP-polarized E-field intensity associated with the spectral components of displayed right perspective image pixels. As illustrated in FIG. 4H, the magnitude of the E-field intensity of such cross-channel spectral components viewed by the left-eye of the viewer is described by the expression $I_0\text{Sin}^2[\Delta\phi_R(\lambda)+\Delta\phi_L(\lambda)]$, where the argument $\Delta\phi_R(\lambda)+\Delta\phi_L(\lambda)$ is generally non-zero over the visible band. Thus, there are two sources of color intensity distortion in the left visual channel of the SMI display system of FIG. 4.

Figure 4J:
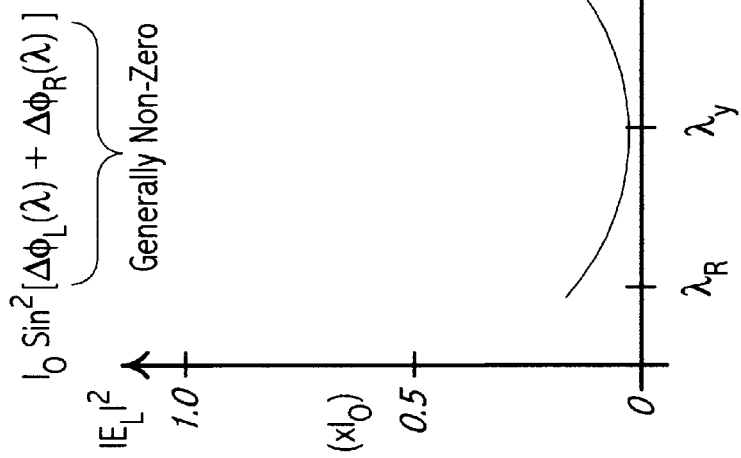
FIG. 4J is a schematic representation illustrating the existence of color intensity distortion in the right visual channel of the system of FIG. 4, perceptable by the right eye of a viewer wearing conventional circularly polarizing viewing glasssses, as a result of the non-zero phase-error characteristics associated with left perspective image pixel structures (i.e. $\Delta\phi_L(\lambda)$) in the SMI display panel thereof.
Figure 4I:
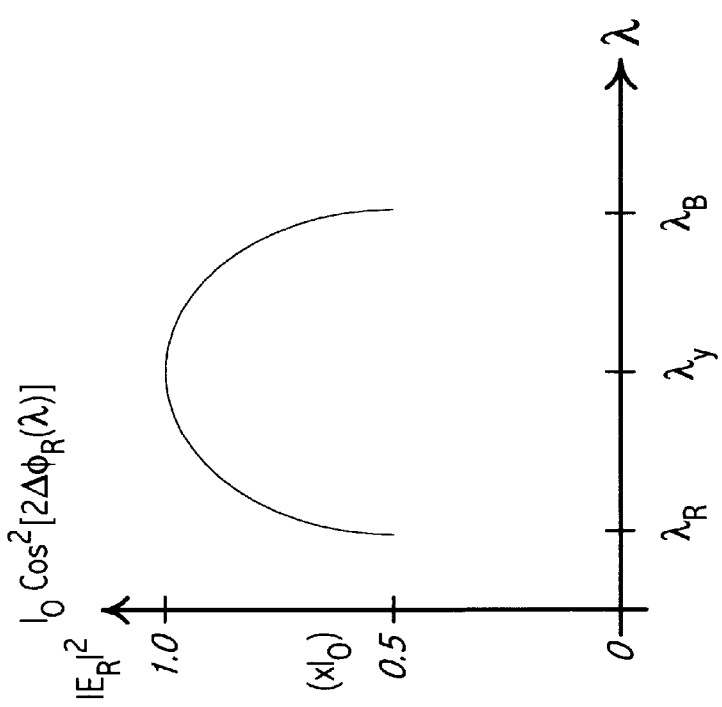
FIG. 4I is a schematic representation illustrating the presence of color intensity distortion in the right visual channel of the system of FIG. 4, perceptable by the right eye of a viewer wearing conventional circularly polarizing viewing glasses, as a result of the non-zero phase-error characteristics associated with right perspective image pixel structures (i.e. $\Delta\phi_R(\lambda)$) in the SMI display panel thereof.

When wearing the conventional circularly-polarizing viewing glasses of FIG. 4 during polarization decoding, the right eye of the viewer receives (i.e. views) the RHP-polarized E-field intensity associated with the spectral components of right perspective image pixels in the displayed SMI through the right-eye LP1-polarizing filter. The magnitude of the E-field intensity of such spectral components viewed by the right-eye of the viewer through such conventional eye-wear is given by the expression $I_0 Cos^2[2\Delta\phi_R(\lambda)]$ as illustrated in FIG. 4I. Since there are phase-retarding elements in the left perspective image pixel structures of the SMI display system of FIG. 4 (i.e. $\Delta\phi_L(\lambda)$ ), there is an additional source of color intensity distortion in the left visual channel. Thus, through the right-eye LP2-polarizing filter, the right eye of the viewer also receives (i.e. views) RHP-polarized E-field intensity associated with the spectral components of displayed left perspective image pixels. As illustrated in FIG. 4J, the magnitude of the E-field intensity of such cross-channel spectral components viewed by the right-eye of the viewer is described by the expression $I_0 Sin^2[\Delta\phi_L(\lambda)+\Delta\phi_R(\lambda)]$, where the argument $\Delta\phi_L(\lambda)+\Delta\phi_R(\lambda)$ is generally non-zero over the visible band. Thus, there are two sources of color intensity distortion in the right visual channel of the SMI display system of FIG. 4.

Determining whether stereoscopic asymmetric distortion is introduced into the SMI display system of FIG. 4 when wearing conventional polarizing eyeglasses, requires a two-step analytical process. The first step involves determining whether there exists a difference in the color intensity distortion characteristics $I_0 Cos^2[2\Delta\phi_L(\lambda)]$ and $I_0 Cos^2[2\Delta\phi_R(\lambda)]$ viewed by the left and right eyes of a viewer, respectively, wearing conventional circularly-polarizing eyeglasses. The second step involves determining whether there exists a difference in the color intensity distortion characteristics $I_0 Sin^2[\Delta\phi_R(\lambda)+\Delta\phi_L(\lambda)]$ and $I_0 Sin^2[\Delta\phi_L(\lambda)+\Delta\phi_R(\lambda)]$ viewed by the left and right eyes of a viewer, respectively, wearing conventional circularly-polarizing eyeglasses. In the case of the second illustrative embodiment, this amounts to first comparing the color intensity distortion characteristics of FIGS. 4G and 4I, and then comparing the color intensity distortion characteristics of FIGS. 4H and 4J. When performing such an analysis, it is readily apparent that $I_0 Cos^2[2\Delta\phi_L(\lambda)]$ is the same as $I_0 Cos^2[2\Delta\phi_R(\lambda)]$ and $I_0 Sin^2[\Delta\phi_R(\lambda)+\Delta\phi_L(\lambda)]$ is the same as $I_0 Sin^2[\Delta\phi_L(\lambda)+\Delta\phi_R(\lambda)]$. Therefore, the left eye of a viewer wearing conventional circularly-polarizing eyeglasses views the same amount of color intensity distortion that the right eye of the viewer does, and therefore asymmetric-type stereoscopic distortion is not necessarily introduced into the system of FIG. 4. However, there exists color intensity distortion and cross-talk in both the left and right visual channels of the system of FIG. 4, which serious degrades the steroscopic viewing experience.

Figure 5:
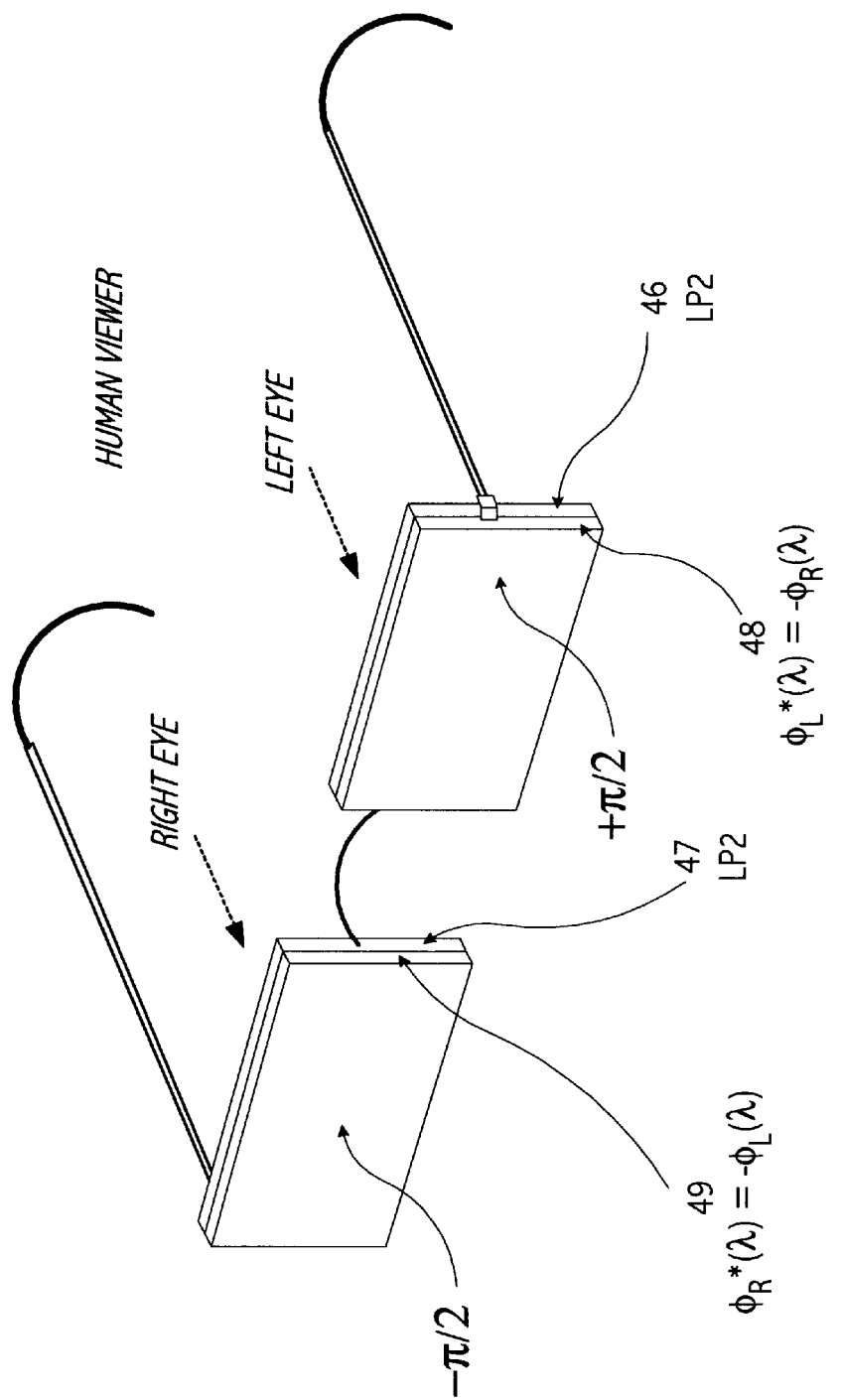
FIG. 5 is a perspective view of the second illustrative embodiment of the phase-corrective stereoscopic viewing glasses of the present invention, adapted for use with the SMI display system shown in FIGS. 4 through 4F.

In accordance with the principles of the present invention, the above-described sources of stereoscopic viewing degradation are substantially eliminated when using the SMI viewing subsystem 4" shown in FIG. 5 to stereoscopically view micropolarized SMIs displayed from the SMI display structure of FIG. 4. Together, the SMI display structure of FIG. 4 and SMI viewing subsystem of FIG. 4 form the second illustrative embodiment of the stereoscopic 3-D viewing system of the present invention.

Figure 5A:
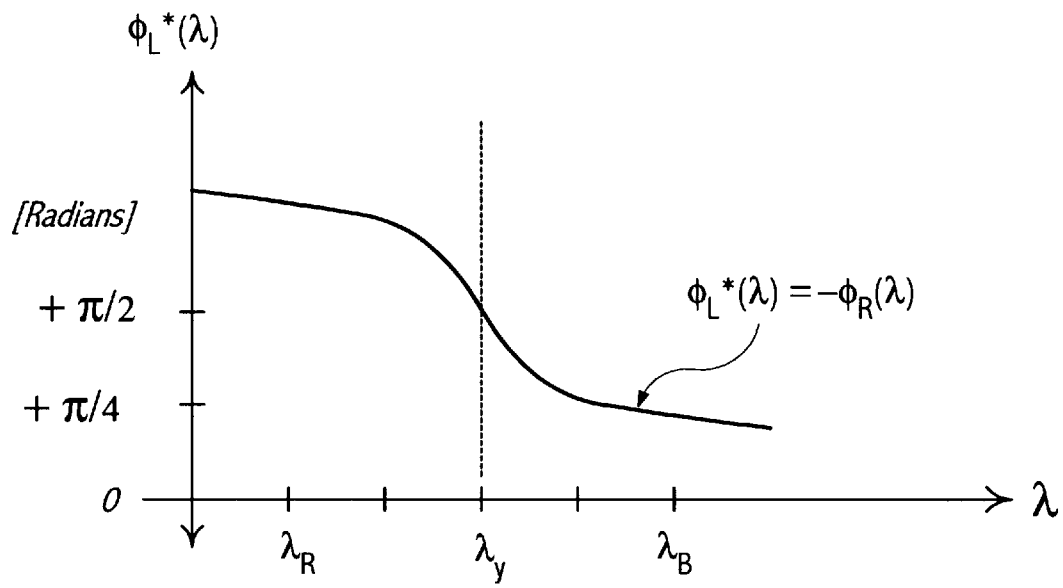
FIG. 5A is a graphical representation illustrating the actual amount of phase retardation imparted to each wavelength of illumination from displayed SMIs, by the phase-error correction panel before the left-eye polarizing filter in the phase-corrective stereoscopic viewing glasses of FIG. 5.
Figure 5B:
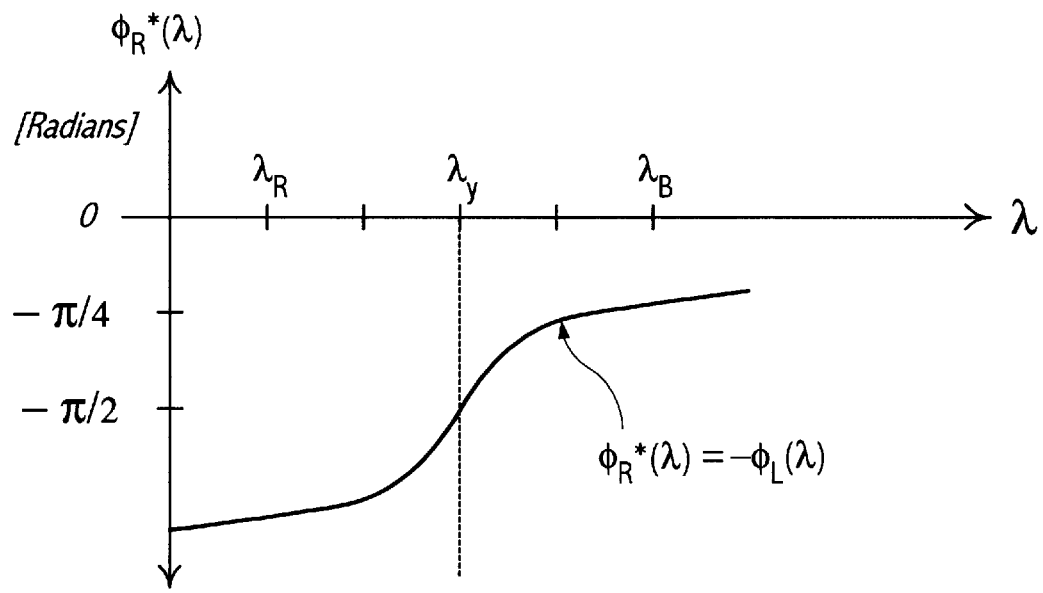
FIG. 5B is a graphical representation illustrating the actual amount of phase retardation imparted to each wavelength of illumination from displayed SMIs, by the phase-error correction panel before the right-eye polarizing filter in the phase-corrective stereoscopic viewing glasses of FIG. 5.

As illustrated in FIG. 5, the SMI viewing subsystem 4" of the second illustrative embodiment comprises: a pair of light polarizing filters 46 and 47 for the left and right eyes of the viewer, each imparting the P2 linear polarization state to light rays transmitted therethrough; and a pair of phase-error correcting filters 48 and 49 placed before the left and right polarizing filters 46 and 47, respectively, for phase retarding light rays passing therethrough, while correcting phase-retardation errors introduced during SMI display and imparting the LHP and RHP polarization states, respectively, thereto during SMI display. In the stereoscopic viewing system of the second illustrative embodiment, the phase-error correction characteristics for the right eye phase-error correction filter 49 is given by $\phi_R^*(\lambda)=\phi_R(\lambda)$ as shown in FIG. 5A, whereas the phase-error correction characteristics for the left eye phase-error correction filter 48 is given by $\phi_L(\lambda)=-\phi_L(\lambda)$ as shown in FIG. 5A. The material used to realize these phase-error correction filters is identical to the material used to realize the left and right retardation elements of the SMI display system of FIG. 4. However, particular arrangement must be accorded to the arrangment of the ordinary and extraordinary optical axes of the phase-error correcting filters and the linear polarization direction of the polarizing filters used to construct the phase-error corrective viewing glasses of FIG. 5. In particular, the $\pi/2$ phase-error correction filter 48 is spatially arranged with respect to the left-eye LP2 polarizing filter 46 so that the ordinary and extraordinary optical axes of the left-eye phase error correction filter 48 are disposed at 45° with respect to the LP2 linear polarization direction. Also, the $-\pi/2$ phase-error correction filter 49 is spatially arranged with respect to the right-eye LP2 polarizing filter 47 so that the ordinary and extraordinary optical axes of the right-eye phase error correction filter 49 are disposed at 45° with respect to the LP2 linear polarization direction. By this construction, the phase-error correction filters impart to all spectral components over the optical band, a phase retardation that is identically opposite to the phase retardation introduced by the respective retardation-based micropolarization arrays of the system of FIG. 4, and thus cancels any and all phase-error exactly. The phase-retarding array of FIG. 4 and phase-error correction filters 48 and 49 can be made from polyvinyl alcohol material as taught in U.S. Pat. No. 5,327,285, incorporated herein by reference. These structures can also be made from polycarbonate films or liquid crystal polymer films, both well known in the art.

Figure 5D:
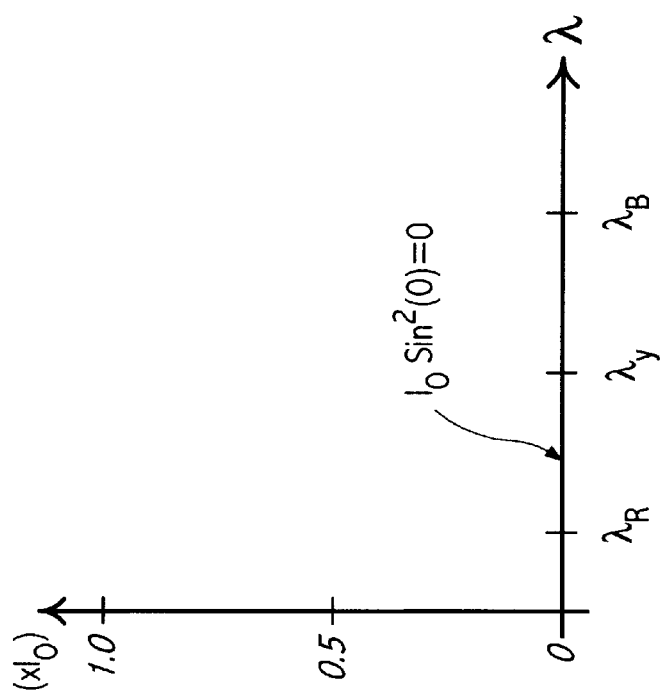
FIG. 5D is a schematic representation illustrating how the $\pi/2$ phase-error correcting filter (i.e. $-\Delta\phi_R(\lambda)$) disposed before the left-eye polarizing filter in the phase-corrective stereoscopic viewing glasses of FIG. 5 eliminates the color intensity associated with spectral cross-talk components created by the non-zero phase-error characteristics associated with the right perspective image pixel structures (i.e. $\Delta\phi_R(\lambda)$) in the SMI display panel of FIG. 4.
Figure 5C:
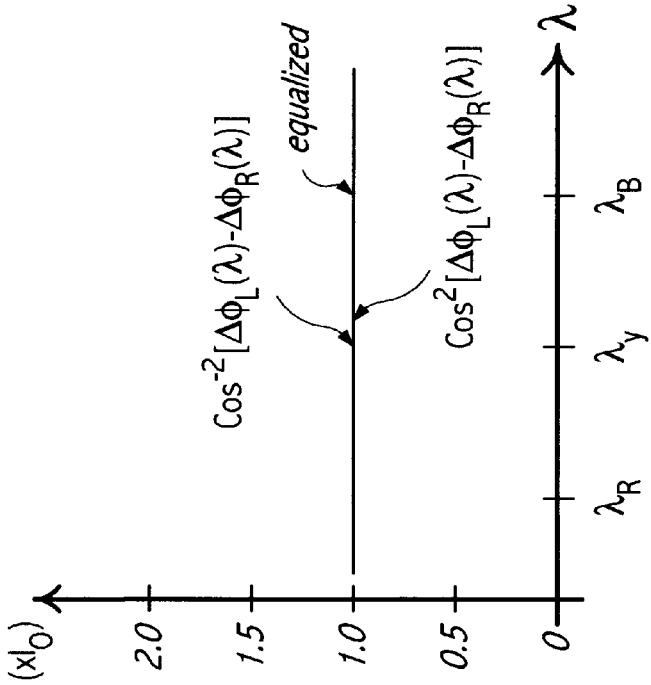
FIG. 5C is a schematic representation illustrating how the phase-error correcting filter before the left-eye polarizing filter of the phase-corrective stereoscopic viewing glasses of FIG. 5 automatically equalizes the color intensity distortion created by the non-zero phase-error characteristics (i.e. $\Delta\phi_L(\lambda)$) associated with the left perspective image pixel structures in the SMI display panel of FIG. 4 and the non-zero phase-error characteristics (i.e. $-\Delta\phi_R(\lambda)$) of the phase-error correcting filter before the left-eye polarizing filter.
Figure 5F:
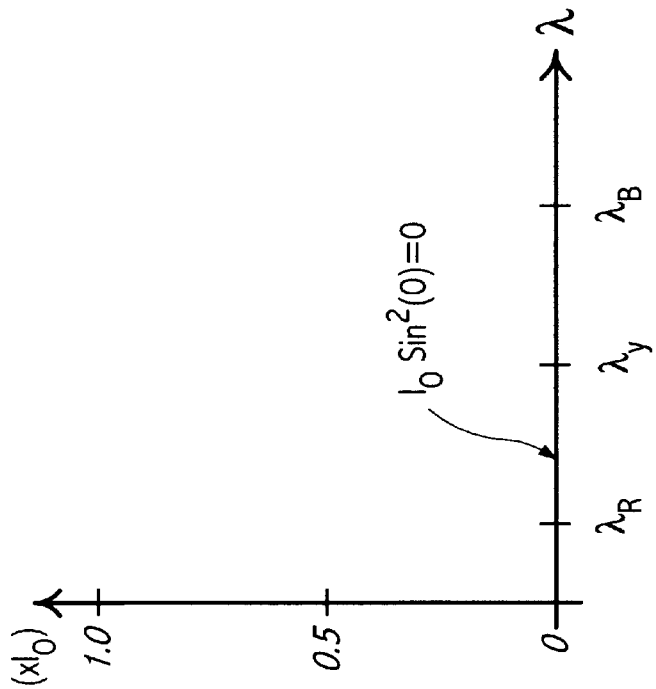
FIG. 5F is a schematic representation illustrating how the $-\pi/2$ phase-error correcting filter (i.e. $-\Delta_L\phi(\lambda)$) disposed before the right-eye polarizing filter in the phase-corrective stereoscopic viewing glasses of FIG. 5 eliminates the color intensity associated with spectral cross-talk components created by the non-zero phase-error characteristics associated with the left perspective image pixel structures (i.e. $\Delta\phi_L(\lambda)$) in the SMI display panel of FIG. 4.
Figure 5E:
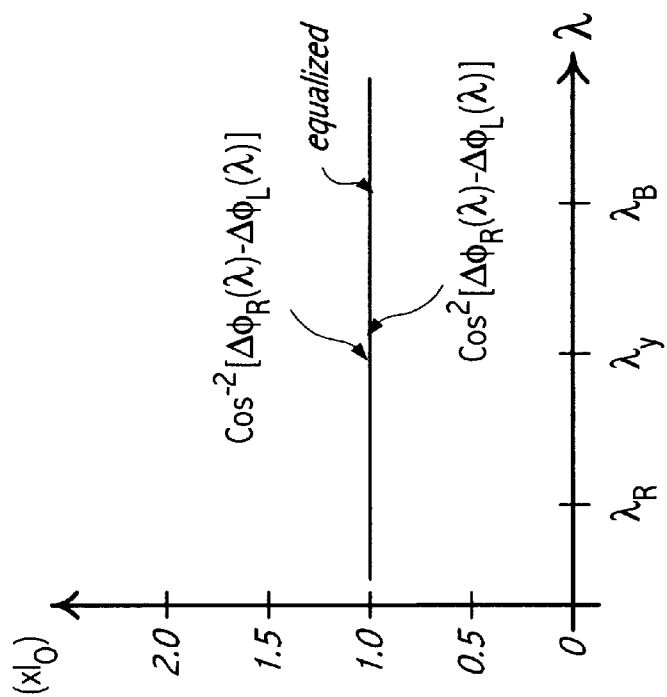
FIG. 5E is a schematic representation illustrating how the phase-error correcting filter before the right-eye polarizing filter of the phase-corrective stereoscopic viewing glasses of FIG. 5 automatically equalizes the color intensity distortion created by the non-zero phase-error characteristics (i.e. $\Delta\phi_R(\lambda)$) associated with the right perspective image pixel structures in the SMI display panel of FIG. 4 and the non-zero phase-error characteristics (i.e. $-\Delta\phi_L(\lambda)$) of the phase-error correcting filter before the right-eye polarizing filter.

The magnitude function for color-intensity correction after the left-eye polarizing filter 46 is given by the expression $[I_0 Cos^2[\Delta\phi_L(\lambda)-\Delta\phi_R(\lambda)]]^{-1}$ as shown in FIG. 5C, whereas the magnitude function for the color-intensity equalization after the right polarizing filter 47 is given by $[I_0 Cos^2[\Delta\phi_R(\lambda)-\Delta\phi_L(\lambda))]]^{-1}$ as shown in FIG. 5E. Notably, however, careful inspection of color intensity correction function for this particular embodiment reveal that the phase-error characteristic term $\Delta\phi_R(\lambda)$ is substantially equal to phase-error characteristic term $\Delta\phi_L(\lambda)$, as graphically illustrated in FIGS. 4C and 4D. In practice, this relation will hold true provided that the following conditions are satisfied: (1) the phase-retarding material used to fabricate the $\pi/2$ retardation elements before each left perspective image pixel in the SMI panel of FIG. 4 is the same material used to fabricate the phase-error correction panel before the right-eye LP2 polarizing filter of the SMI viewing glasses of FIG. 5; and (2) the phase-retarding material used to fabricate the $-\pi/2$ retardation elements before each right perspective image pixel in the SMI panel of FIG. 4 is the same material used to fabricate the phase-error correction panel before the left-eye LP2 polarizing filter of the SMI viewing glasses of FIG. 5. When so constructed, the stereoscopic viewing glasses of FIG. 5 will provide automatic color intensity equalization, in addition to visual channel cross-talk elimination.

During the SMI viewing process, light polarizing filters 46 and 47 and the retardation-based phase-error correcting filters 48 and 49 cooperate to decode the polarization-encoded visual channels of the system, while automatically "equalizating" the color intensity characteristics of left and right perspective images decoded from (i.e. viewed from) the left and right visual channels of the system. Using the stereoscopic viewing device of the second illustrative embodiment with the SMI display system shown in FIG. 4, the problems attendent therewith (i.e. visual channel crosstalk and chromatic image distortion) are effectively eliminated, making high-quality stereoscopic viewing of 3-D objects a reality. The manner in which such problems are solved using the SMI viewing device of FIG. 5 is illustrated in FIGS. 5C through 5F.

As shown in FIG. 5C, the phase-error characteristics of the $\pi/2$ phase-retarding elements over the left perspective image pixels of the displayed SMIs and the phase-error characteristics of the $-\pi/2$ phase-error correcting filter 48 disposed before the left-eye polarizing filter 46 cooperate to automatically equalize (i.e. correct) color intensity characteristics of left perspective image pixels viewed through the stereoscopic viewing glasses of FIG. 5. As shown in FIG. 5D, phase-error correcting filter 48 is disposed before the left-eye polarizing filter 46 equalizes (i.e. corrects) color intensity distortion created in the left eye of the viewer by the non-zero phase-error characteristics (i.e. $\Delta\phi_R(\lambda)=0$ for all $\lambda$) associated with right-eye pixel structures in the SMI display panel of FIG. 4.

As shown in FIG. 5E, the phase-error characteristics of the $-\pi/2$ phase-retarding elements over the right perspective image pixels of the displayed SMIs and the phase-error characteristics of the phase-error correcting filter 49 disposed before the $+\pi/2$ right-eye polarizing filter 46 cooperate to automatically equalize (i.e. correct) color intensity characteristics of right perspective image pixels viewed through the stereoscopic viewing glasses of FIG. 5. As shown in FIG. 5F, the phase-error correcting filter (i.e. $-\Delta\phi_R(\lambda)$) 49 disposed before the right-eye polarizing filter 47 equalizes (i.e. corrects) the color intensity distortion created by the non-zero phase-error characteristics associated with left-eye pixel structures (i.e. $\Delta\phi_L(\lambda)$) in the SMI display panel of FIG. 4.

THE STEREOSCOPIC VIEWING SYSTEM OF THE THIRD ILLUSTRATIVE EMBODIMENT COMPRISING A MICROPOLARIZATION PANEL WITH {π/2, π3/2} RADIAN PHASE RETARDING ARRAYS AND STEREOSCOPIC VIEWING EYEGLASSES WITH PHASE-RETARDATION ERROR CORRECTING TRANSMISSION CHARACTERISTICS

Figure 6:
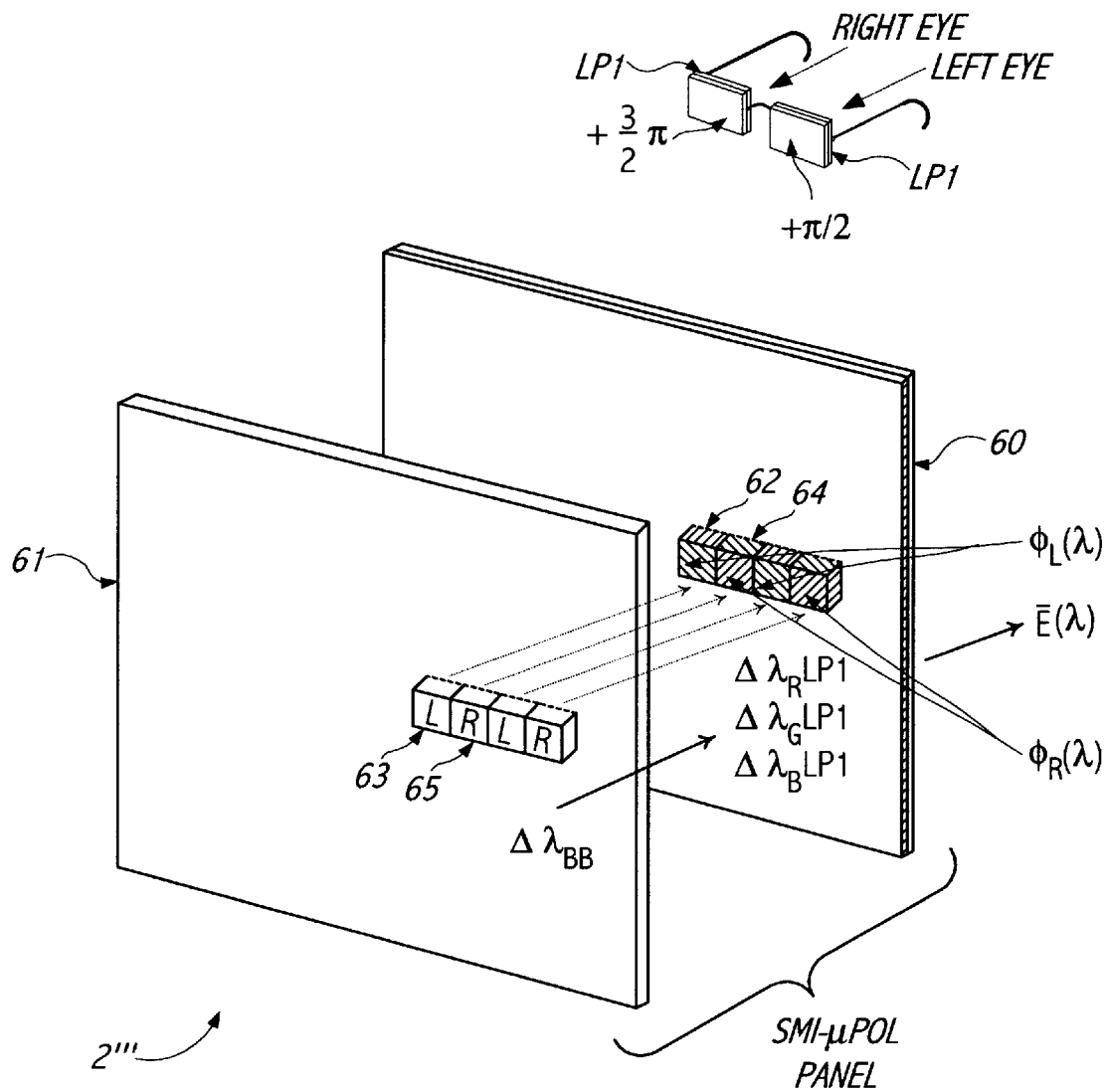
FIG. 6 is a partially-exploded schematic diagram of a third illustrative embodiment of the SMI display device of the present invention comprising a micropolarization panel affixed to a SMI display structure, and a pair of conventional circularly polarizing viewing glasses for demultiplexing micropolarized SMIs displayed therefrom during stereoscopic viewing, wherein each left perspective image pixel of the SMI display structure is in spatial registration with a first-type phase-retarding cell in the micropolarization panel and each right perspective image pixel of the SMI display structure is in spatial registration with a second-type phase-retarding cell in the micropolarization panel, so that the right perspective image pixels of the SMI display panel are encoded with the RHP circular polarization state while the left perspective image pixels are encoded with the LHP circular polarization state.
Figure 6A:
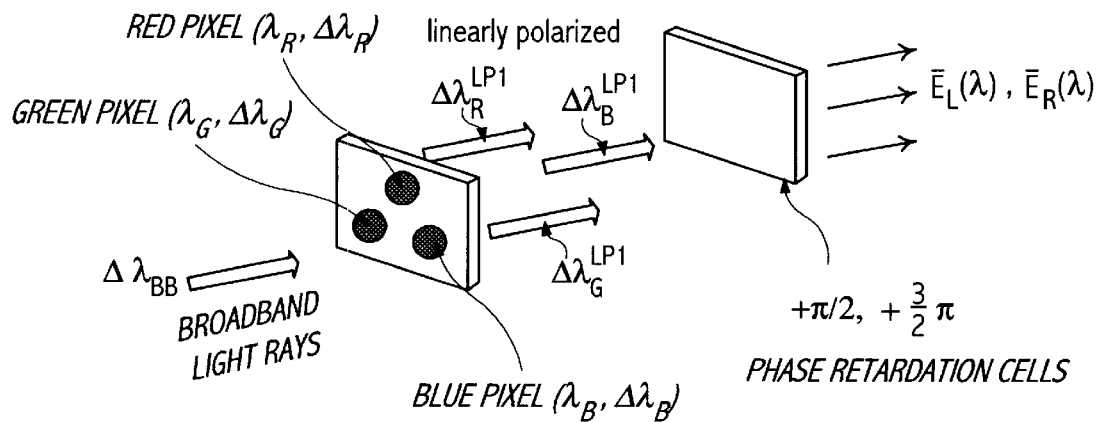
FIG. 6A is a schematic diagram illustrating the high-level structure of an image pixel in the SMI display device of FIG. 6, illustrating that RGB spectral components of the pixel are phase retarded by an amount dependent on the wavelength of the spectal components being transmitted through the phase-retarding cell in registration with the image pixel.
Figure 6B:
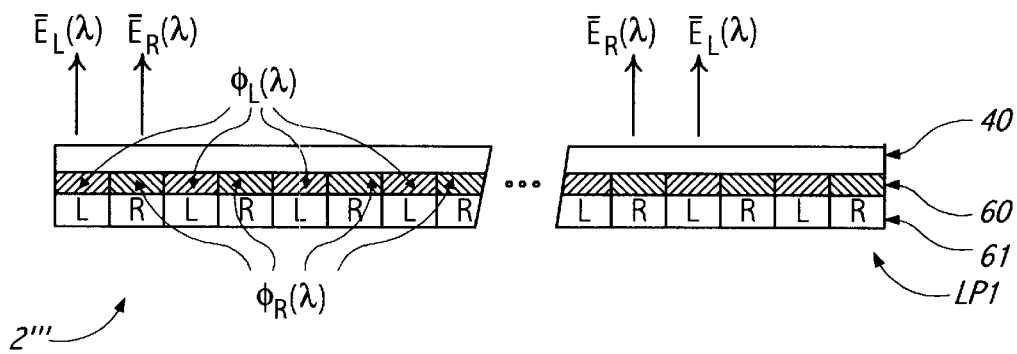
FIG. 6B is a partially-fragmented, cross-sectional view of the SMI display device of FIG. 6 showing in greater detail the substructure of the SMI display structure and the micropolarization panel thereof.
Figure 6C:
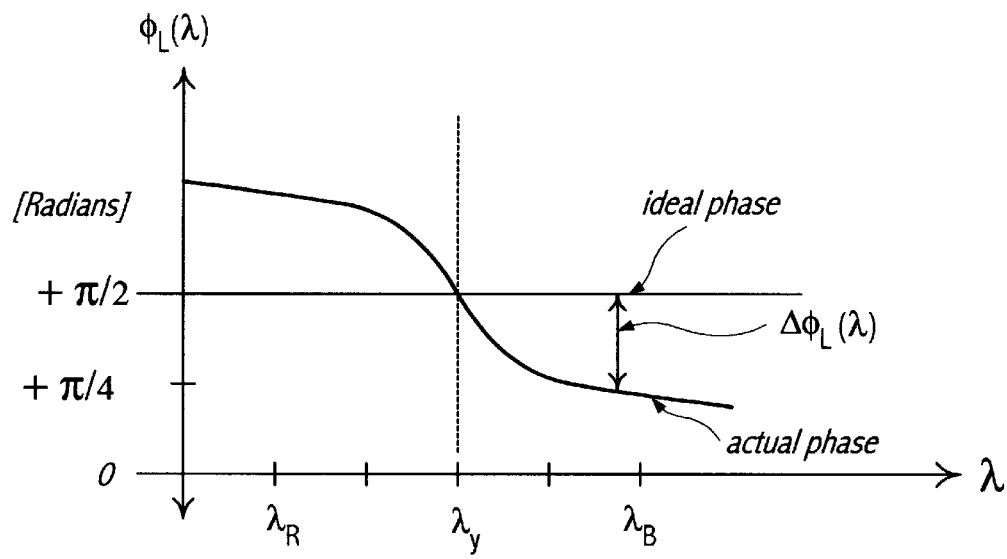
FIG. 6C is a graphical representation showing (i) the ideal amount of phase retardation imparted by the micropolarization panel of the SMI display device of FIG. 6 to each wavelength of illumination from each left perspective image pixel location along the SMI display surface (e.g. LCD panel) thereof, (ii) the actual amount of phase retardation imparted by the micropolarization panel to each wavelength of illumination from each left perspective image pixel location along the SMI display surface, and (iii) the actual amount of phase-retardation error imparted by the micropolarization panel to each wavelength of illumination from each left perspective image pixel location along the SMI display surface.
Figure 6D:
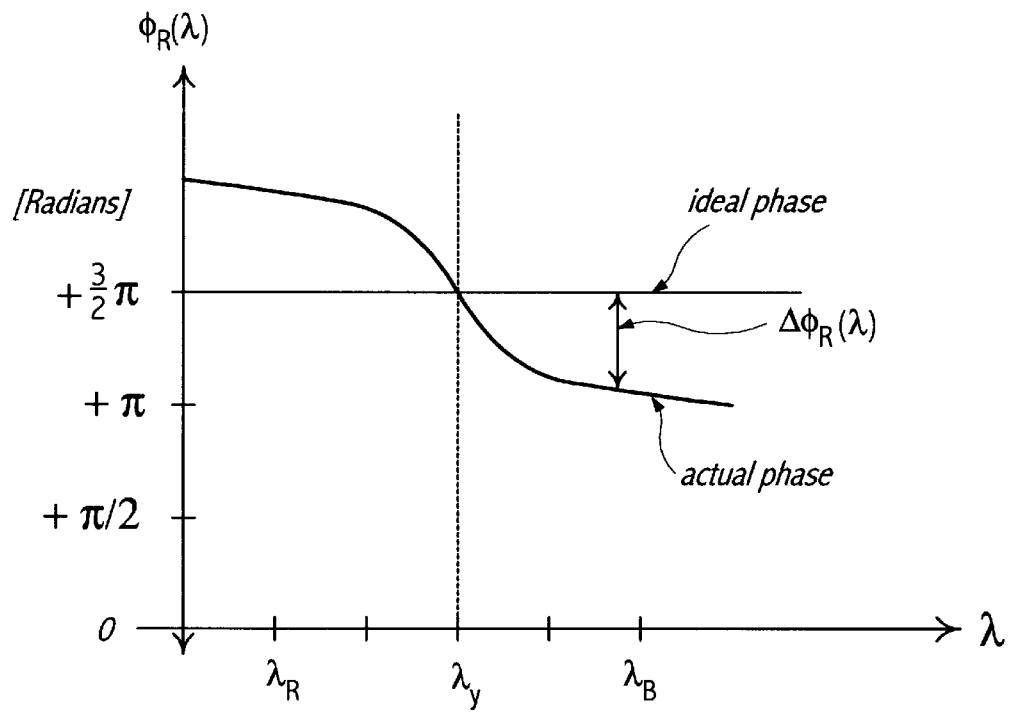
FIG. 6D is a graphical representation showing (i) the ideal amount of phase retardation imparted by the micropolarization panel of the SMI display device of FIG. 6 to each wavelength of illumination from each right perspective image pixel location along the SMI display surface (e.g. LCD panel) thereof, (ii) the actual amount of phase retardation imparted by the micropolarization panel to each wavelength of illumination from each right perspective image pixel location along the SMI display surface, and (iii) the amount of phase-retardation error imparted by the micropolarization panel to each wavelength of illumination from each right perspective image pixel location along the SMI display surface.

In the third illustrative embodiment of the stereoscopic viewing system hereof, the SMI display subsystem 2''' comprises a phase-retarding micropolarization panel 60 laminated over a SMI display structure 61, as shown in FIGS. 6 through 6B. As best illustrated in FIGS. 6 through 6H, the light rays emanating from the left image pixels of the displayed SMI are designed to have a first circular polarization state (e.g. left-handed circular polarization (LHP) state), whereas the light rays emanating from the right perspective image pixels of the displayed SMI are designed to have a second circular polarization state (e.g. right-handed circular polarization (RHP) state). Each phase retardation cell or element 62 in registration with a left perspective image pixel 63 of the SMI introduces π/2 radian phase retardation to the light rays thereof to impart the LHP state to light rays thereto and thus functions as quarter-wave retarder. Each phase retardation cell or element 64 in registration with a right perspective image pixel 65 of the SMI introduces 3/2π-radian phase retardation to the light rays thereof to impart the RHP state thereto and thus functions as a three-quarter wave retarder. As shown, this particular phase retardation panel construction can be used in connection with any one of numerous types of available SMI display structures to produce a subsystem for displaying micropolarized SMIs for stereoscopic viewing with the circularly-polarizing viewing glasses of the third illustrative embodiment of the present invention, shown in FIGS. 7 through 7D.

The function of the retardation-based micropolarization panel 2''' is to polarization-encode with the LHP polarization state, all of the energy of each left perspective image pixel from a displayed SMI, while all of the energy of each right perspective image pixel from the displayed SMI is polarization-encoded with its orthogonal RHP polarization state. In this way, all of the photonic energy associated with the left perspective image pixels of the displayed SMI is polarization encoded along the left visual channel of the stereoscopic viewing system, while all of the photonic energy associated with the right perspective image pixels of the displayed SMI is polarization encoded along the right visual channel of the system. In practice, this is not possible when using the SMI display system of the second illustrative embodiment, inasmuch as the phase-retarding characteristics of the retardation-based micropolarization panel thereof are strongly dependent on the wavelength of spectral components of displayed spatially-multiplexed imagery. Ideally, one would like each $+\pi/2$ phase retardation cell in the micropolarization panel of FIGS. 6 and 6B to impart exactly a $+\pi/2$ radian phase retardation to the electric field (i.e. E-field) of incident wavefronts (i.e. light rays) from the left perspective image pixels, and each $+3\pi/2$-radian phase retardation cell in the micropolarization panel of FIGS. 6 and 6B to impart exactly a $+3\pi/2$ radian phase retardation to the electric field (i.e. E-field) of incident wavefronts (i.e. light rays) from the left perspective image pixels. However, this desired result is not possible when using a birefringent (i.e. anisotropic) medium to realize the micropolarization panel of this subsystem. The consequences of this phenomena can be understood by reference to FIGS. 6A, 6E and 6F.

As shown in FIG. 6A, light rays (i.e. wavefronts) emanating from the SMI display structure contains a broad band of spectral components $\{\lambda_R, \ldots, \lambda_O, \ldots, \lambda_Y, \ldots, \lambda_J, \ldots, \lambda_B, \ldots, \lambda_V\}$ emanate from each pixel in the SMI display structure. As shown, the E-field components associated with the band of spectral components emanating from each left perspective image pixel in a displayed SMI are transmitted through its registered $+\pi/2$-radian phase retardation cell. Similarly, as shown in FIG. 4A, the E-field components associated with the band of spectral components emanating from each right perspective image pixel in the SMI are transmitted through its registered $+3/2\pi$-radian phase retardation cell. The actual phase retardation characteristics of each $+\pi/2$-radian phase retardation cell in an exemplary microretardation array are shown in the plot of FIG. 6C, whereas the actual phase retardation characteristics of each $+3/2\pi$-radian phase retardation cell in the exemplary microretardation array are shown in FIG. 6D. As the phase retardation characteristics of each $+\pi/2$-radian phase retardation cell are not constant over all wavelengths in the visible band of its associated pixel element, many, if not nearly all of the spectral components in each of the three spectral component groups of left perspective image pixels will be retarded a different amount of phase from the ideal $+\pi/2$ radian retardation. Also, as the phase retardation characteristics of each 3/2π phase retardation cell are not constant over all wavelengths in the visible band of its associated pixel element, many, if not nearly all of the spectral components in each of the three spectral component groups of right perspective image pixels will be retarded a different amount of phase from the ideal 3/2π radian retardation. If not corrected or compensated for, the phase retardation error across the operating band of the left and right pixel retardation cells, indicated as $\Delta\phi_L(\lambda)$ and $\Delta\phi_R(\lambda)$, respectively, will have a profound effect upon the operation of the micropolarization panel in both color and grey-scale SMI display applications.

The phase-error characteristics associated with the SMI display panel of FIG. 6 adversely influence the stereoscopic viewing process in a number of significant ways. An understanding of the problems presented by such phase-error characteristics can be best illustrated by analyzing (1) the E-field components produced from both the left and right pixel structures of the SMI display subsystem of FIG. 6, and (2) the color intensity distortion perceived by both the left and right eyes of a viewer wearing conventional circularizing polarizing eyeglasses, by virtue of the phase-error characteristics of the left and right pixel structures of the SMI display subsystem of FIG. 6.

Figures 6E, 6F:
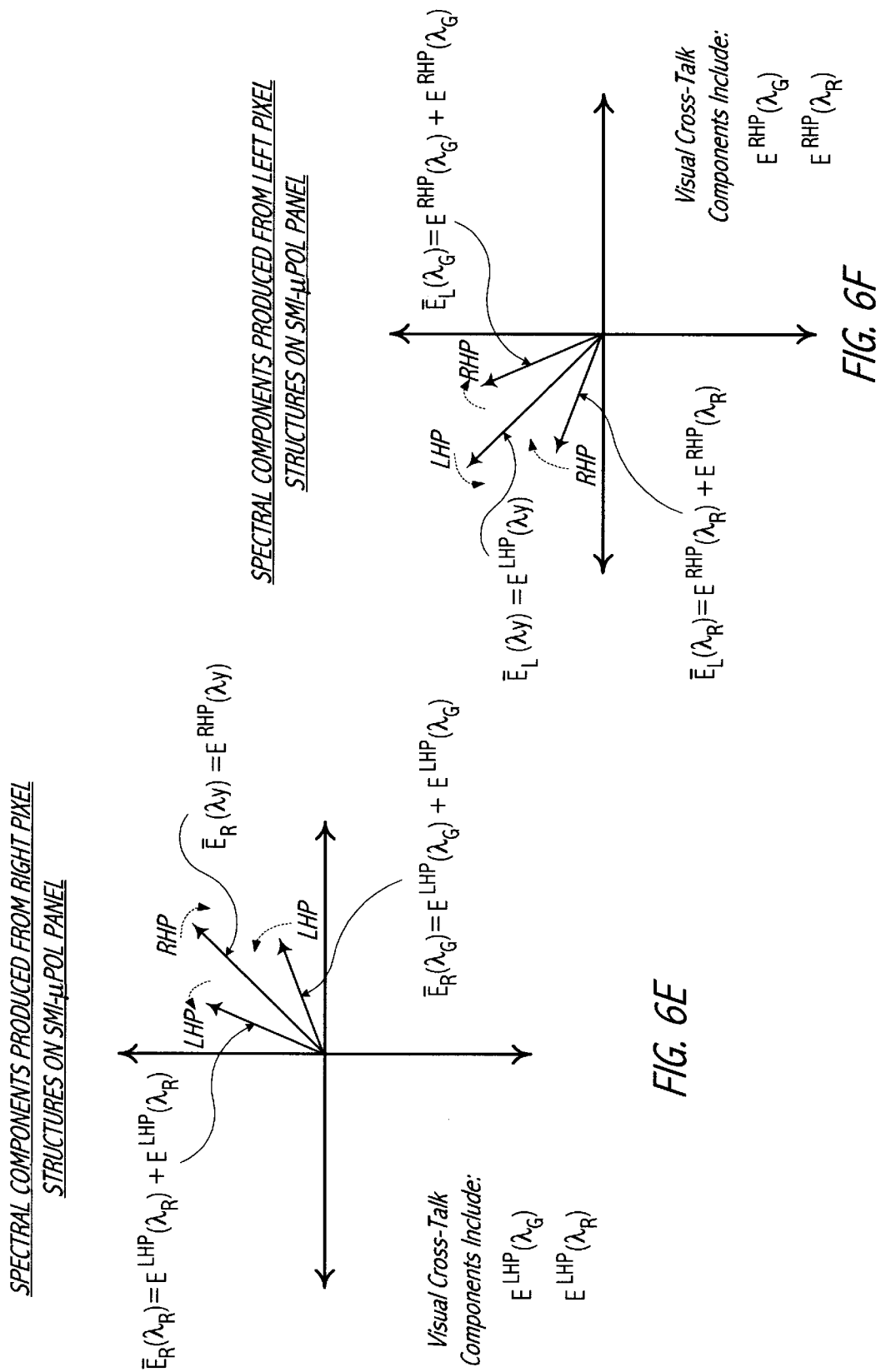
FIG. 6E is a schematic representation showing the electric field vectors repesentative of the various spectral components in the visible-band produced from the right perspective image pixel structures (i.e., phase retardation cells) along the SMI display device of FIG. 6, while being imparted with both circular polarization states LHP and RHP, thus causing phase-error dependent cross-talk to be introduced into the right visual-channel of the SMI display system.
FIG. 6F is a schematic representation showing the electric field vectors repesentative of the various spectral components in the visible-band produced from the left perspective image pixel structures (i.e., phase retardation cells) along the SMI display device of FIG. 4, while being imparted with both circular polarization states LHP and RHP, thus causing phase-error dependent cross-talk to be introduced into the left visual-channel of the SMI display system.
Figure 6H:
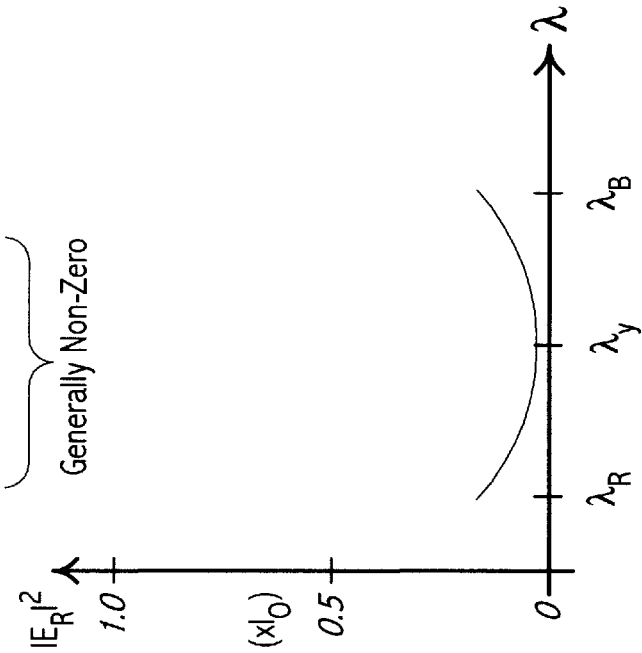
FIG. 6H is a schematic representation illustrating the presence of color intensity distortion in the left visual channel of the system of FIG. 6, perceptable by the left eye of a viewer wearing conventional circularly polarizing viewing glasses, as a result of the non-zero phase-error characteristics associated with right perspective image pixel structures (i.e. $\Delta\phi_R(\lambda)$) in the SMI display panel thereof.

As shown in FIG. 6E, the spectral components produced from right perspective image pixels in the SMI display structure are represented by their electric field vector representation, generally expressed as $E_R(\lambda)$. As shown, the spectral components at each of the major spectral groups (e.g. $\Delta\lambda_R, \ldots, \Delta\lambda_O, \ldots, \Delta\lambda_G, \ldots, \Delta\lambda_I, \ldots, \Delta\lambda_V$) associated with the right perspective image pixels are not imparted with only the RHP polarization state, but rather a portion of the intensity of the E-field components of these spectral components is imparted (i.e. encoded) with the RHP polarization state as they emanate from the surface of the micropolarization panel, while the balance of the intensity of the E-field components of these spectral components is imparted with the LHP polarization state. In other words, not all of the E-field intensity associated with the spectral components of displayed right perspective image pixels is encoded with the RHP polarization state, but rather a percentage of the E-field intensity is encoded with the LHP polarization state.

As shown in FIG. 6F, the spectral components produced from left perspective image pixels in the SMI display structure are represented by their electric field vector representation, generally expressed as $E_L(\lambda)$. As shown, the spectral components at each at each of the major spectral groups (e.g. $\Delta\lambda_R, \ldots, \Delta\phi_O, \ldots, \Delta\phi_G, \ldots, \Delta\lambda_I, \ldots, \Delta\lambda_V$) associated with left perspective image pixels are not imparted with only the LHP polarization state, but rather a portion of the intensity of the E-field components of these spectral components is imparted (i.e. encoded) with the LHP polarization state while the balance of the intensity of the E-field components of these spectral components is imparted with the RHP polarization state. In other words, not all of the E-field intensity associated with the spectral components of displayed left perspective image pixels is encoded with the LHP polarization state, but rather a percentage of the E-field intensity is encoded with the RHP polarization state. By virtue of the cross-polarizing phenomena described above, caused by wavelength-dependent phase-retardation error, some of the E-field intensity of spectral components associated with left perspective image pixels in displayed SMIs is polarization-encoded onto the right visual-channel of the system, while some of the E-field intensity of spectral components associated with right perspective image pixels in displayed SMIs is polarization-encoded onto the left visual-channel thereof. As such, this particular embodiment of the SMI display subsystem produces E-field cross-talk components in both left and right visual channels of the system.

When produced SMIs are displayed from the SMI display subsystem of the third illustrative embodiment shown in FIG. 6 and are viewed through conventional circularing-polarizing glasses as taught, for example, in copending Continuation application Ser. No. 08/126,077, filed Sep. 23, 1993, the problems associated with visual channel crosstalk, stereoscopic asymmetry and chromatic image distortion will necessarily manifest themselves to the visual system of human viewers, significantly degrading the stereoscopic viewing experience thereof. The reasons for such degradation in the stereoscopic viewing experience can be explained as follows.

Figure 6G:
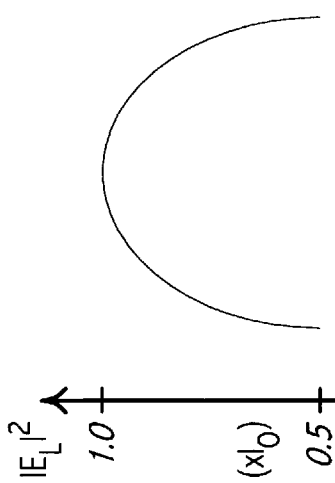
FIG. 6G is a schematic representation illustrating the presence of color intensity distortion in the left visual channel of the system of FIG. 6, perceptable by the left eye of a viewer wearing conventional circularly polarizing viewing glasses, as a result of the non-zero phase-error characteristics associated with left perspective image pixel structures (i.e. $\Delta\phi_L(\lambda)$) in the SMI display panel thereof.

When wearing conventional circularly-polarizing viewing glasses of FIG. 6 during polarization decoding, the left eye of the viewer receives (i.e. views) the LHP-polarized E-field intensity associated with the spectral components of left perspective image pixels in the displayed SMI through the left-eye LP1-polarizing filter. The magnitude of the E-field intensity of such spectral components viewed by the left-eye of the viewer is given by the expression $I_0\cos^2[2\Delta\phi_L(\lambda)]$ as illustrated in FIG. 6G. Since there are phase-retarding elements in the right perspective image pixel structures of the SMI display system of FIG. 6 (i.e. $\Delta\phi_R(\lambda)$), there is an additional source of color intensity distortion in the left visual channel. Thus, through the left-eye LP1-polarizing filter, the left eye of the viewer also receives (i.e. views) LHP-polarized E-field intensity associated with the spectral components of displayed right perspective image pixels. As illustrated in FIG. 6H, the magnitude of the E-field intensity of such cross-channel spectral components viewed by the left-eye of the viewer is described by the expression $I_0\sin^2[\Delta\phi_R(\lambda)+\Delta\phi_L(\lambda)]$, where the argument $\Delta\phi_R(\lambda)+\Delta\phi_L(\lambda)$ is genrally non-zero over the visible band. Thus, there are two sources of color intensity distortion in the left visual channel of the SMI display system of FIG. 6.

Figure 6J:
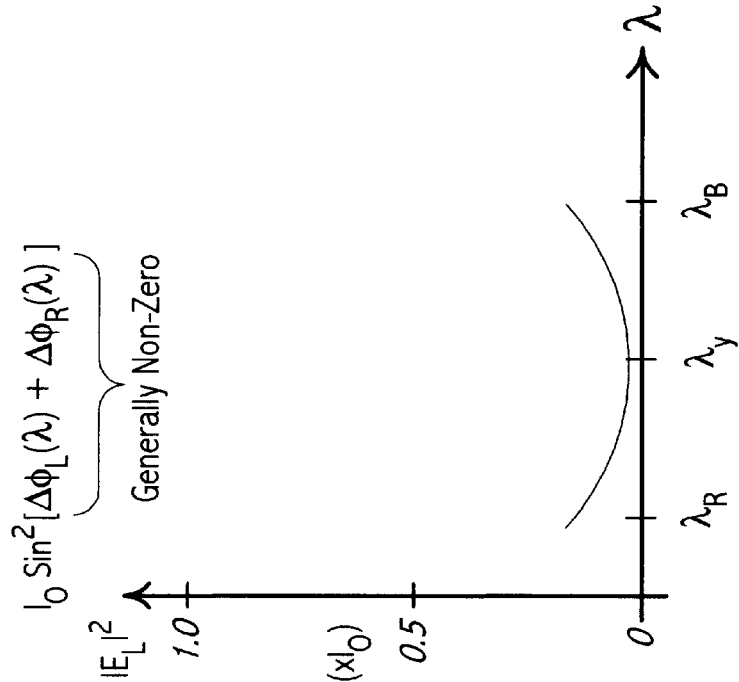
FIG. 6J is a schematic representation illustrating the existence of color intensity distortion in the right visual channel of the system of FIG. 6, perceptable by the right eye of a viewer wearing conventional polarizing eye-glassses, as a result of the non-zero phase-error characteristics associated with left perspective image pixel structures (i.e. $\Delta\phi_L(\lambda)$) in the SMI display panel thereof.
Figure 6I:
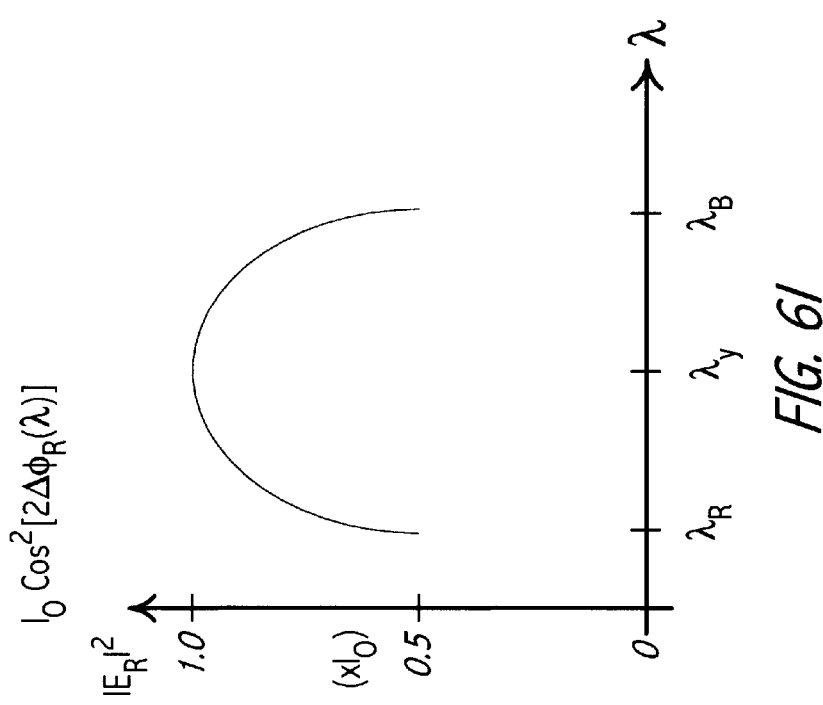
FIG. 6I is a schematic representation illustrating the presence of color intensity distortion in the right visual channel of the system of FIG. 6, perceptable by the right eye of a viewer wearing conventional polarizing eye-glasses, as a result of the non-zero phase-error characteristics associated with right perspective image pixel structures (i.e. $\Delta\phi_R(\lambda)$) in the SMI display panel of thereof.

When wearing conventional circularly-polarizing viewing glasses of FIG. 6 during polarization decoding, the right eye of the viewer receives (i.e. views) the RHP-polarized E-field intensity associated with the spectral components of right perspective image pixels in the displayed SMI through the right-eye LP1-polarizing filter. The magnitude of the E-field intensity of such spectral components viewed by the right-eye of the viewer is given by the expression $I_0\cos^2[2\Delta\phi_R(\lambda)]$ as illustrated in FIG. 6I. Since there are phase-retarding elements in the left perspective image pixel structures of the SMI display system of FIG. 6 (i.e. $\Delta\phi_L(\lambda)$), there is an additional source of color intensity distortion in the left visual channel. Thus, through the right-eye LP1-polarizing filter, the right eye of the viewer also receives (i.e. views) RHP-polarized E-field intensity associated with the spectral components of displayed left perspective image pixels. As illustrated in FIG. 6J, the magnitude of the E-field intensity of such cross-channel spectral components viewed by the right-eye of the viewer is described by the expression $I_0\sin^2[\Delta\phi_L(\lambda)+\Delta\phi_R(\lambda)]$, where the argument $\Delta\phi_L(\lambda)+\Delta\phi_R(\lambda)$ is genrally non-zero over the visible band. Thus, there are two sources of color intensity distortion in the right visual channel of the SMI display system of FIG. 6.

Determining whether stereoscopic asymmetric distortion is introduced into the SMI display system of FIG. 6 when wearing conventional polarizing viewing glasses, requires a twp-step analytical process. The first step involves determining whether there exists a difference in the color intensity distortion characteristics $I_0\text{Cos}^2[2\Delta\phi_L(\lambda)]$ and $I_0\text{Cos}^2[2\Delta\phi_R(\lambda)]$ viewed by the left and right eyes of a viewer, respectively, wearing the conventional circularly-polarizing viewing glasses of FIG. 6. The second step involves determining whether there exists a difference in the color intensity distortion characteristics $I_0\text{Sin}^2[\Delta\phi_R(\lambda)+\Delta\phi_L(\lambda)]$ and $I_0\text{Sin}^2[\Delta\phi_L(\lambda)+\Delta\phi_R(\lambda)]$ viewed by the left and right eyes of a viewer, respectively, wearing conventional circularly-polarizing viewing glasses. In the case of the third illustrative embodiment, this amounts to first comparing the color intensity distortion characteristics of FIGS. 6G and 6I, and then comparing the color intensity distortion characteristics of FIGS. 6H and 6J. When performing such an analysis, it is readily apparent that $I_0\text{Cos}^2[2\Delta\phi_L(\lambda)]$ is the same as $I_0\text{Cos}^2[2\Delta\phi_R(\lambda)]$ and $I_0\text{Sin}^2[\Delta\phi_R(\lambda)+\Delta\phi_L(\lambda)]$ is the same as $I_0\text{Sin}^2[\Delta\phi_L(\lambda)+\Delta\phi_R(\lambda)]$. Therefore, the left eye of a viewer wearing conventional polarizing eyeglasses views the same amount of color intensity distortion that the right eye of the viewer does, and therefore asymmetric-type stereoscopic distortion is not introduced into the system of FIG. 6. However, as in the system of FIG. 4, there exists color intensity distortion and cross-talk in both the left and right visual channels of the system of FIG. 6, which serious degrades the steroscopic viewing experience.

Figure 7:
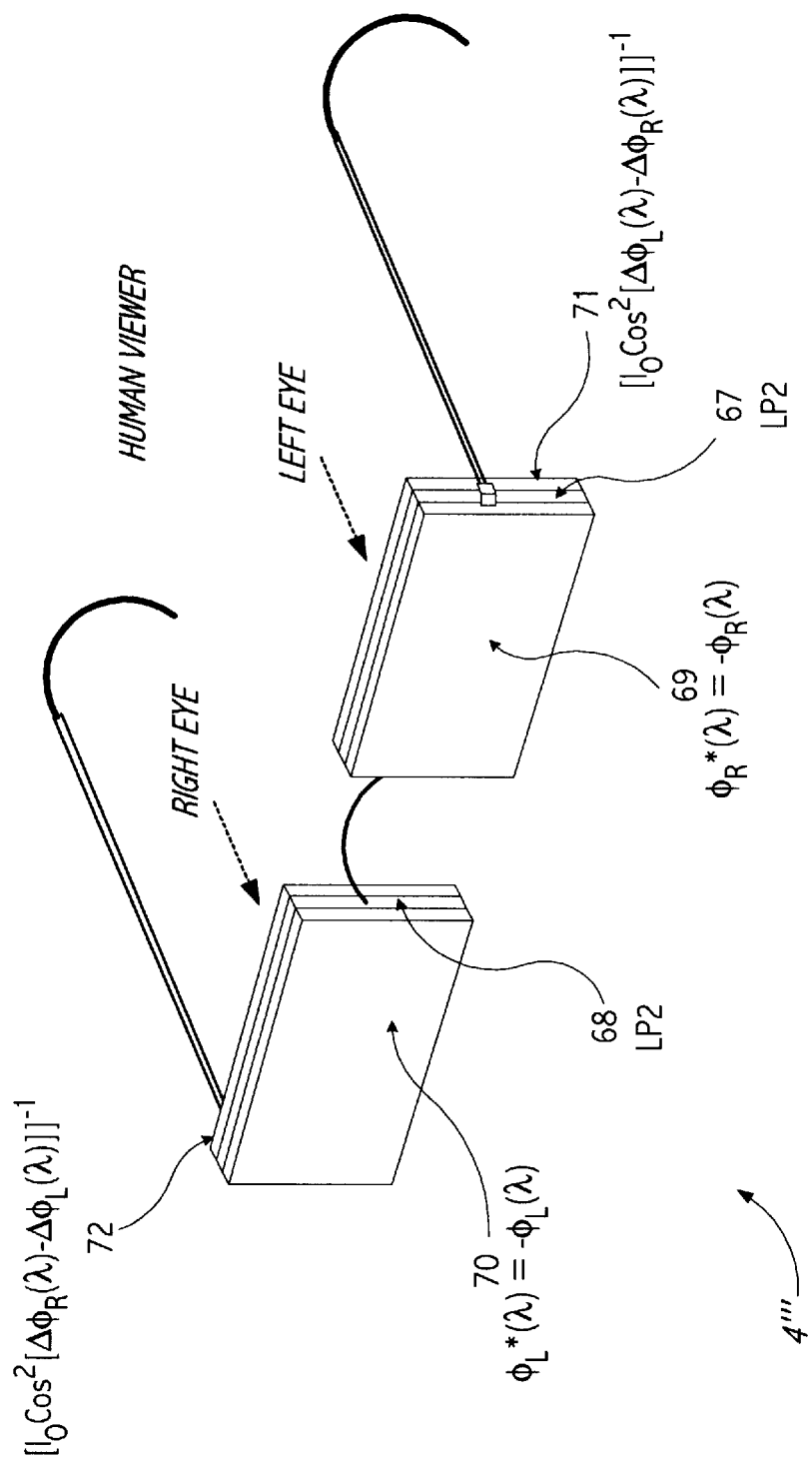
FIG. 7 is a perspective view of the third illustrative embodiment of the phase-corrective stereoscopic viewing glasses of the present invention, adapted for use with the SMI display system shown in FIGS. 6 through 6F.

In accordance with the principles of the present invention, the above-described sources of stereoscopic viewing degradation are substantially eliminated when using the SMI viewing subsystem 4''' shown in FIG. 7 to stereoscopically view micropolarized SMIs displayed from the SMI display structure of FIG. 6. Together, the SMI display structure of FIG. 6 and SMI viewing subsystem of FIG. 7 form the third illustrative embodiment of the stereoscopic 3-D viewing system of the present invention.

Figure 7A:
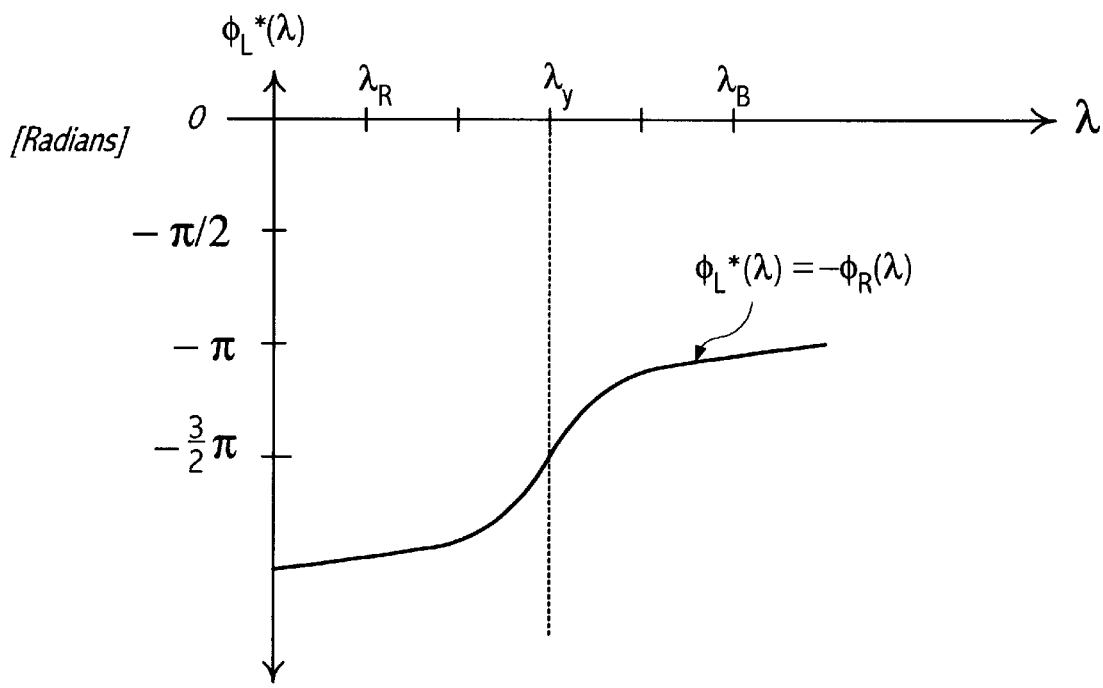
FIG. 7A is a graphical representation illustrating the actual amount of phase retardation imparted to each wavelength of illumination from displayed SMIs, by the phase-retarding panel in front of the left perspective image polarizing filter in the phase-corrective stereoscopic viewing glasses of FIG. 7.
Figure 7B:
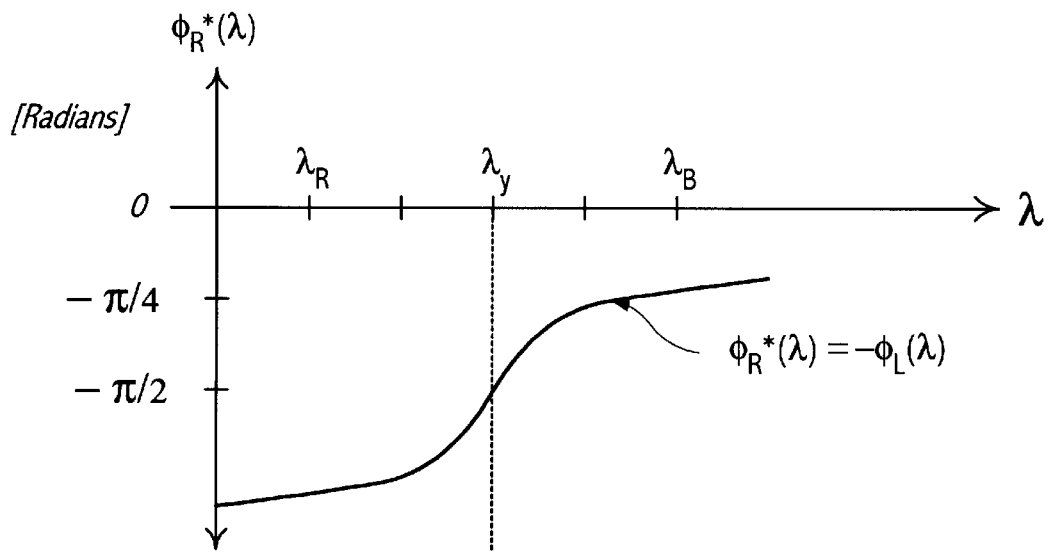
FIG. 7B is a graphical representation illustrating the actual amount of phase retardation imparted to each wavelength of illumination from displayed SMIs, by the phase-retarding panel in front of the right perspective image polarizing filter in the phase-corrective stereoscopic viewing glasses of FIG. 7.

As illustrated in FIG. 7, the SMI viewing subsystem 4''' of the third illustrative embodiment comprises: a pair of light polarizing filters 67 and 68 for the left and right eyes of the viewer, each imparting the LP2 polarization state to light rays transmitted therethrough; a pair of phase-error correcting filters 69 and 70 placed before the left and right polarizing filters 67 and 68, respectively, for phase retarding light rays passing therethrough, while correcting phase-retardation errors introduced during SMI display and imparting the LHP and RHP polarization states, respectively, thereto during SMI display; and a pair of color-intensity correction filters 71 and 72, respectively, placed after the left and right polarizing filters 67 and 68, respectively, for correcting color intensity distortion during SMI display. In the stereoscopic viewing system of the third illustrative embodiment, the phase-error correction characteristics for the right eye phase-error correction filter 70 is given by $\phi_R^*(\lambda)=-\phi_L(\lambda)$ as shown in FIG. 7B, whereas the phase-error correction characteristics for the left eye phase-error correction filter 69 is given by $\phi_L^*(\lambda)=-\phi_R(\lambda)$ as shown in FIG. 7A. The material used to realize these phase-error correction filters is identical to the material used to realize the left and right phase retardation elements in the SMI display system of FIG. 4. However, particular attention must be accorded to the arrangment of the ordinary and extraordinary optical axes of the phase-error correcting filters and the linear polarization direction of the polarizing filters used to construct the phase-error corrective viewing glasses of FIG. 5. In particular, the $-3\pi/2$ phase-error correction filter 69 is spatially arranged with respect to the left-eye P2 polarizing filter 67 so that the ordinary and extraordinary optical axes of the left-eye phase error correction filter are disposed at 45° with respect to the LP2 linear polarization direction. Also, the $-\lambda/2$ phase-error correction filter 70 is spatially arranged with respect to the right-eye LP2 polarizing filter 68 so that the ordinary and extraordinary optical axes of the right-eye phase error correction filter are disposed at 45° with respect to the P2 linear polarization direction. By this construction, the phase-error correction filters impart to all spectral components over the optical band, a phase retardation that is identically opposite to the phase retardation introduced by the respective retardation-based micropolarization arrays of the system of FIG. 6, and thus cancels any and all phase-error exactly. The micro-retardation array of FIG. 6 and phase-error correction filters 69 and 70 can be made from polyvinyl alcohol material as taught in U.S. Pat. No. 5,327,285, incorporated herein by reference. These structures can also be made from polycarbonate films or liquid crystal polymer films, both well known in the art.

Figure 7F:
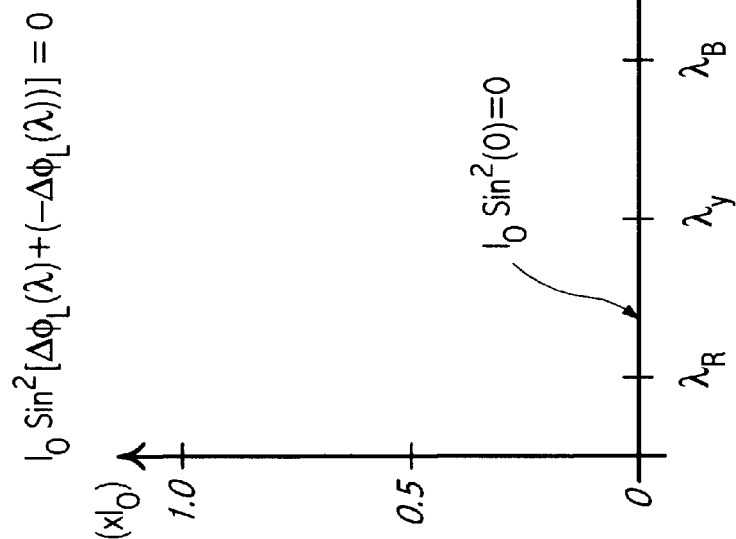
FIG. 7F is a schematic representation illustrating how the phase-error correcting filter (i.e. $-\Delta\phi_L(\lambda)$) disposed before the right-eye polarizing filter in the phase-corrective stereoscopic viewing glasses of FIG. 7 equalizes the color intensity distortion created by the non-zero phase-error characteristics associated with left perspective image pixel structures (i.e. $\Delta\phi_L(\lambda)$) in the SMI display panel of FIG. 6.
Figure 7E:
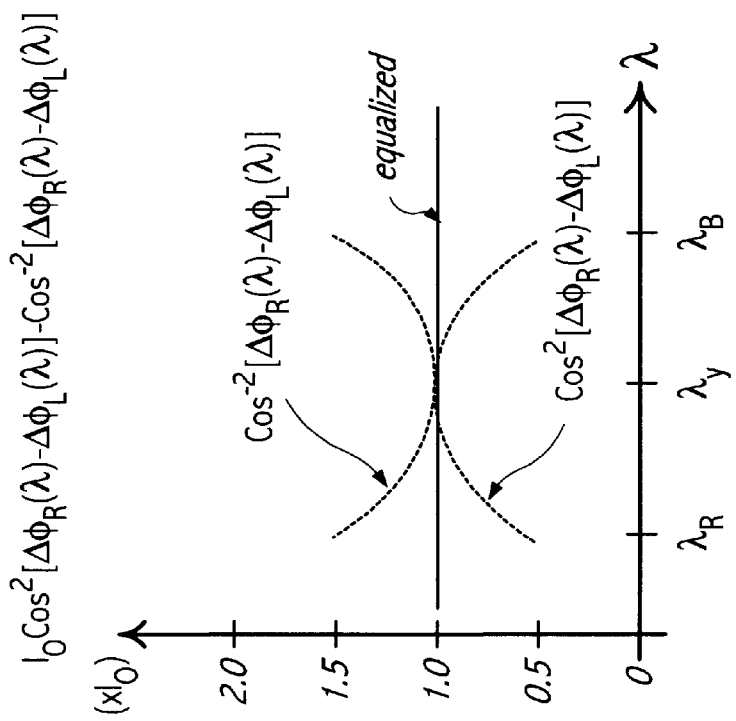
FIG. 7E is a schematic representation illustrating how the color intensity compensation filter disposed before the right-eye polarizing filter in the phase-corrective stereoscopic viewing glasses of FIG. 7 equalizes the color intensity distortion created by the non-zero phase-error characteristics associated with right perspective image pixel structures (i.e. $\Delta_R\phi(\lambda)$) in the SMI display panel of FIG. 6, and the non-zero phase-error characteristics (i.e. $-\Delta\phi_L(\lambda)$) of the phase-error correcting filter before the right-eye polarizing filter.

The magnitude function for the color-intensity correction filter 71 placed after the left polarizing filter 67 is given by $[I_0\text{Cos}^2[\Delta\phi_L(\lambda)-\Delta\phi_R(\lambda)]]^{-1}$ as shown in FIG. 7C, whereas the magnitude function of the color-intensity correction filter 72 after the right polarizing filter 68 is given by $[I_0\text{Cos}^2[\Delta\phi_R(\lambda)-\Delta\phi_L(\lambda)]]^{-1}$ as shown in FIG. 7E. Each of these color-intensity correcting filters can be realized with the above-described magnitude characteristics using by CLC film having an appropriate mixture of adsorptive and/or reflection type pigments incorporated therewithin in a manner known in the spectral filter art.

During the SMI viewing process, light polarizing filters 67 and 68 and retardation-based phase-error correcting filters 69 and 70 cooperate to decode the polarization-encoded visual channels of the system while colorintensity correction filters 71 and 72 equalize the color intensity characteristics of left and right perspective images decoded from the left and right visual channels of the system. Using the stereoscopic viewing device of the first illustrative embodiment with the SMI display system of the first illustrative embodiment, the problems attendant therewith (i.e. visual channel cross-talk, assymetric image distoration, and color intensity distortion) are eliminated, making possible high-quality stereoscopic viewing of 3-D objects possible. The manner in which such problems are solved using the SMI viewing device of FIG. 7 is schematically illustrated in FIGS. 7C through 7F.

As shown in FIG. 7C, the color intensity compensation filter 71 disposed before (or after) the left-eye polarizing filter 67 in the stereoscopic viewing glasses of FIG. 7 equalizes (i.e. corrects) the color intensity distortion created by the non-zero phase-error characteristics (i.e. $\Delta\phi_L(\lambda)$ ) associated with left-eye pixel structures in the SMI display panel of FIG. 6. As shown in FIG. 7D, phase-error correcting filter 48 disposed before the left-eye polarizing filter 68 equalizes (i.e. corrects) color intensity distortion created in the left eye of the viewer by the non-zero phase-error characteristics (i.e. $\Delta\phi_R(\lambda)=0$ for all $\lambda$ ) associated with right-eye pixel structures in the SMI display panel of FIG. 6.

As shown in FIG. 7E, the color intensity compensation filter 72 disposed before (or after) the right-eye polarizing filter 68 in the stereoscopic viewing glasses of FIG. 7 equalizes (i.e. corrects) the color intensity distortion created by the non-zero phase-error characteristics associated with phase-error correcting filter before the right-eye of the viewer in the viewing glasses of FIG. 7. As shown in FIG. 7F, the phase-error correcting filter 70 (i.e. $-\Delta\phi_L(\lambda)$) disposed before the right-eye polarizing filter 68 equalizes (i.e. corrects) the color intensity distortion created by the non-zero phase-error characteristics associated with left-eye pixel structures (i.e. $\Delta\phi_L(\lambda)$ ) in the SMI display panel of FIG. 6.

Having desecribed several illustrative embodiments of the SMI viewing sytem of the present invention, a number of modifications and variations thereto readily come to mind.

Rather than realizing the color-intensity correction functions $[I_0 Cos^2[\Delta\phi_L(\lambda)-\Delta\phi_R(\lambda)-\Delta\phi_R(\lambda)]]^{-1}$ and $[I_0 Cos^2[\Delta\phi_R(\lambda)-\Delta\phi_L(\lambda)]]^{-1}$ during the SMI viewing process as taught hereinabove, such corrective filtering functions can be realized prior to or during the SMI production process. In such alternative embodiments, optical filtering techniques can be used to pre-correct left and right perspective images according to these color intensity correction functions during image capture by an electro-optical camera system of the type generally taught in copending application Ser. No. 08/126,077. Also, pixel-based image processing techniques can be used to pre-correct left and right perspective images according to these functions within a computer-graphics based system of the type generally taught in copending application Ser. No. 07/976,518.

It has been mentioned that the stereoscopic viewing system of the present invention can be used in various applications and the embodiments discribed or suggested herein are merely illustrative of the possible uses to which the invention may be put. For example, the stereoscopic viewing system can be incorporated as a subsystem into various types of portable computer-based systems including, but not limited to: portable notebook, laptop and palmtop computer systems; LCD image projection systems; personal digital assistants (PDAs) and personal communicators; and other systems in which stereoscopic 3-D viewing capablities are either desired or required. Such computer based systems can have both direct and projection modes of viewing as taught in the following copending application Ser. Nos. 08/322,219 filed Oct. 13, 1994, and 08/230,779 filed Apr. 21, 1994, supra, incorporated by reference.

In FIG. 8, an illustrative embodiment of the stereoscopic viewing system of the present invention is shown in the form of a multi-media kiosk 75. As illustrated, the multi-media kiosk has a LCD-based SMI display structure 76 for displaying micropolarized SMIs of 3-D objects and/or scenery, and also a phase-error correcting viewing visor 77 physically supported therefrom. In the illustrative embodiment, the viewing visor has a visor support structure 77A secured to the kiosk housing 78 for supporting a pair of phase-corrective polarizing visors (i.e. panels) 79A and 79B parallel to and away from the SMI display panel at a preselected distance. The function of these phase-corrective polarizing panels is to decode (i.e. polarize) the light rays associated with the polarization-encoded perspective image pairs of the displayed SMI so that the left eye of the viewer only sees the left perspective image of the demultiplexed SMI, while the right eye of the viewer only sees the right perspective image thereof. The function of the kiosk housing is to support the SMI display and micropolarizing panel 76, stereo-audio speakers 80A and 80B and speech-input microphone 81, and enclose the SMI generating subsystem, audio-signal producing apparatus, and various computer subsystems from plain view. Any one of the three above-described stereoscopic viewing systems of the present invention can be embodied within the multi-media kiosk described above. Embodying such a stereoscopic viewing system is easy; the SMI display/micropolarizing structure thereof is supported within the kiosk housing, while the corresponding phase-error corrective and polarizing optics thereof for left and right eyes of the viewer are supported from the visor support structure. In each embodiment of the multi-media kiosk, viewers are permitted to stereoscopically view 3-D objects with high resolution, stereo-separation and color fidelity, while interacting with the system by way of touchscreen menu-selection or other suitable data-input mechanism.

In FIG. 9, another illustrative embodiment of the stereoscopic viewing subsystem of the present invention is shown in the form of a computer graphics workstation 83. As shown, the workstation has an LCD-based SMI display panel 84 for displaying micropolarized SMIs of 3-D objects, and a pair of phase-error corrective contact lenses 85A and 85B of the soft-type. Through such lenses, the left and right eyes of a viewer are permitted to stereoscopically view 3-D objects with high resolution, stereo-separation and color fidelity. As it is difficult to fix the orientation of a contact lens over the cornea of a viewer, it is preferred that the second and third embodiments of the stereoscopic viewing system hereof are used in this particular application, as the circularizing polarizers of such viewing subsystems ensure that the viewing lenses will operate properly regardless of their rotational orientation over the eyes of their wearer. The materials used to realize the various filter subcomponents of such phase-corrective polarizing lenses should satisfy the biocompatible criteria established by the U.S. Food and Drug Administration.

In FIG. 10, yet another alternative embodiment of the stereoscopic viewing system of the present invention is shown realized in the form a stereoscopic 3-D projection display system. As shown, the system comprises an LCD-based SMI projector 87 for projecting micropolarized SMIs of 3-D objects onto a polarization-preserving viewing screen 88 using a light projecting source 89, LCD panel 90, micropolarization panel 91 and projection optics 92. A pair of phase-error corrective viewing glasses 93 according to the present invention are used to stereoscopically view the 3-D objects with high resolution, stereo-separation and color fidelity.

The system of FIG. 10 can be readily modified to provide a stereoscopic 3-D projection system for cinemagraphic applications. In such embodiments of the present invention, the LCD-based SMI projector is replaced with a film-based SMI projector in which SMIs are optically recorded in the frames of optical film. Within the film-based SMI projector, the SMIs are projected through a retardation-based micropolarization panel disposed in close proximity with the optical film which is moved by the micropolarization panel and image projection optics using a conventional film transport and take-up mechanism well known in the art. Micropolarized SMIs are projected onto a polarization-state preserving viewing screen and viewed through the phase-error correcting viewing device of the present invention.

The stereoscopic image projection system of FIG. 10 as well as the cinemagraphic system described above can be readily adapted to embody any one of the stereoscopic viewing systems described hereinabove. Notably, in such image projection applications, the exemplary embodiments thereof illustrated in FIGS. 4 through 7F would be preferred, as the circularly-polarized viewing devices of the present invention provide the viewer with complete freedom of movement in three-dimensional space (e.g. head rolling) without limiting or compromising the stereoscopic viewing experience.

The stereoscopic 3-D viewing system of the present invention can also be embodied within VR workstations and playstations alike to allow users thereof to interact with synthetic 3-D objects in stereoscopic 3-D viewing environment characterized by ultra-high stereo-channel separation, image resolution and color fidelity.

While electrically-passive phase-retarding elements have been used in the realization of both the SMI display and stereoscopic viewing subsystems described hereinabove, it is understood that the present invention can be practiced using electrically-active phase-retarding structures in either or both of such subsystems.

The present invention has been described in great detail with reference to the above illustrative embodiments. It is understood, however, modifications to the illustrative embodiments will readily occur to persons with ordinary skill in the art. All such modifications and variations are deemed to be within the scope and spirit of the present invention as defined by the accompanying Claims to Invention.

What is claimed is:

1. A display system for visually presenting a micropolarized spatially multiplexed image of a 3-D object for use in stereoscopic viewing thereof substantially free of visual-channel cross-talk and asymmetric image distortion, said display system having first and second perspective channels and comprising:

(A) a display device for displaying a micropolarized spatially-multiplexed image, said display device including (1) an image formation surface for forming a composite pixel pattern representative of a spatially multiplexed image composed of first and second spatially modulated perspective images of said object, said first spatially modulated perspective image consisting of a first pixel pattern representative of a first perspective image of said object spatially modulated according to a first spatial modulation pattern, said second spatially modulated perspective image consisting of a second pixel pattern representative of a second perspective image of said object spatially modulated according to a second spatial modulation pattern, said second spatial modulation pattern being the complement pattern of said first spatial modulation pattern, and (2) a micropolarization structure affixed to said image formation surface, and including first and second optically transparent patterns permanently formed therein, said first optically transparent pattern spatially corresponding to and being spatially aligned with said first pixel pattern formed on said image formation surface, said first optically transparent pattern retarding the phase of light by a first desired phase retarding amount at a first band of wavelengths over the visible band so as to impart a first polarization state $P_1$ to light of said first band of wavelengths emanating from said first pixel pattern and passing through said first optically transparent pattern, and said first optically transparent pattern retarding the phase of light at a second band of wavelengths over the visible band by a phase-retarding amount different than said first desired phase retarding amount by a phase-retardation error so as to impart a first polarization state $P_1$ to a first portion of the light in said second band of wavelengths emanating from said first pixel pattern and passing through said first perspective optically transparent pattern, and a second polarization state $P_2$ to a portion of the light in said second band of wavelengths emanating from said first pixel pattern and passing through said first optically transparent pattern, thereby introducing cross-talk and asymmetric image distortion into the first-perspective channel of said system; and, said second optically transparent pattern spatially corresponding to and being spatially aligned with said second pixel pattern formed on said image formation surface so as to impart a second polarization state $P_2$ to light emanating from said second pixel pattern and passing through said second optically transparent pattern, said second polarization state $P_2$ being different than said first polarization state $P_1$, wherein the polarized light emanating from said first and second optically transparent patterns forms said micropolarized spatially multiplexed image for use in stereoscopic viewing said 3-D object; and (B) a viewing device for viewing said micropolarized spatially-multiplexed image, said viewing device including (1) a first optically transparent element positionable before the left eye of a viewer permitting the left eye of the viewer to view said first pixel pattern while substantially preventing the left eye of the viewer from viewing said second pixel pattern, (2) a second optically transparent element positionable before the right eye of the viewer permitting the right eye of the viewer to view said second pixel pattern while substantially preventing the right eye of the viewer from viewing said first pixel pattern, and (3) phase-restoration error correction means associated with said first optically transparent element, for optically correcting said phase-retardation error associated with said first optically transparent pattern of said micropolarization panel and thereby substantially eliminating said cross-talk and asymmetric image distortion in the first-perspective channel of said system, whereby the viewer is capable of stereoscopically viewing said 3-D object substantially free of visual channel cross-talk and asymmetric image distortion;

wherein said optical viewing device is realized as a device selected from the group consisting of a pair of eye-glasses, a pair of contact lenses, and a head-mounted visor, and a kiosk-mounted visor; and wherein said second optically transparent element further comprises a phase retardation error correcting filter optically coupled with said second polarization layer, and wherein the phase retardation characteristics of said phase retardation correcting filter correct said phase retardation error introduced by said first optically transparent pattern.

2. The display system of claim 1, wherein both said micropolarization structure and said viewing device have an electrically-passive construction.

3. The display system of claim 1, wherein said first optically transparent pattern comprises a first retardation pattern which imparts said first polarization state to light emanating from said first pixel pattern and passing through said first retardation pattern, and wherein said second optically transparent pattern comprises a second retardation pattern which imparts said second polarization state to light emanating from said second pixel pattern and passing through said second retardation pattern.

4. The display system of claim 3, wherein said first retardation pattern comprises a first quarter wave retardation pattern which imparts a clockwise circular polarization state to light emanating from said first pixel pattern and passing through said first retardation pattern, and wherein said second retardation pattern comprises a second quarter wave retardation pattern which imparts a counter-clockwise circular polarization state to light emanating from said second pixel pattern and passing through said second retardation pattern.

5. The display system of claim 1, wherein said display device further comprises a polarization layer, and said first optically transparent pattern comprises a first retardation pattern, wherein said first retardation pattern imparts said first polarization state to light emanating from said first pixel pattern and passing through said first retardation pattern, and wherein said second optically transparent pattern imparts said second polarization state to light emanating from said second pixel pattern and passing through said second optically transparent pattern.

6. The display system of claim 5, wherein said first retardation pattern imparts half-wave retardation to light emanating from said first pixel pattern and passing through said first retardation pattern, and said second optically transparent pattern imparts zero retardation to light emanating from said second pixel pattern and passing through said second optically transparent pattern.

7. The display system of claim 5, wherein said polarization layer comprises a linear polarization state.

8. The display system of claim 5, wherein said first polarization state is a first linear polarization state, and wherein said second polarization state is a second linear polarization state, which is different from said first linear polarization state P1.

9. The display system of claim 5, wherein said polarization layer comprises a circular polarization state.

10. The display system of claim 5, wherein said first polarization state is a clockwise circular polarization state, and wherein said second polarization state is a counter-clockwise circular polarization state.

11. The display system of claim 3, wherein said first retardation pattern comprises a first quarter wave retardation pattern which imparts a clockwise circular polarization state to light emanating from said first pixel pattern and passing through said first retardation pattern.

12. The display system of claim 1, wherein said viewing device further comprises: a frame for supporting said first and second optically transparent elements so that said first optically transparent element is positionable adjacent to the left eye of a viewer, and said second optically transparent element is positionable adjacent to the right eye of the viewer.

13. The display system of claim 1, wherein said display device comprises a liquid crystal display device.

14. The display system of claim 13, wherein said liquid crystal display device functions as a display surface suitable for direct stereoscopic viewing of said 3-D object with high image quality and resolution.

15. The display system of claim 13, wherein said liquid crystal display device further comprises a projection lens for projecting said polarized spatially multiplexed image onto a remote display surface, for stereoscopic viewing of said 3-D object with high image quality and resolution.

16. The display system of claim 1, wherein said frame is supported with respect to the head of the viewer.

17. A display system for visually presenting a micropolarized spatially multiplexed image of a 3-D object for use in stereoscopic viewing thereof substantially free of visual-channel cross-talk and asymmetric image distortion, said display system having first and second perspective channels and comprising:

(A) a display device for displaying a micropolarized spatially-multiplexed image, said display device including
(1) an image formation surface for forming a composite pixel pattern representative of a spatially multiplexed image composed of first and second spatially modulated perspective images of said object, said first spatially modulated perspective image consisting of a first pixel pattern representative of a first perspective image of said object spatially modulated according to a first spatial modulation pattern, said second spatially modulated perspective image consisting of a second pixel pattern representative of a second perspective image of said object spatially modulated according to a second spatial modulation pattern, said second spatial modulation pattern being the complement pattern of said first spatial modulation pattern, and
(2) a micropolarization structure affixed to said image formation surface, and including
first and second optically transparent patterns permanently formed therein,
said first optically transparent pattern spatially corresponding to and being spatially aligned with said first pixel pattern formed on said image formation surface,
said first optically transparent pattern retarding the phase of light by a first desired phase retarding amount at a first band of wavelengths over the visible band so as to impart a first polarization state $P_1$ to light of said first band of wavelengths emanating from said first pixel pattern and passing through said first optically transparent pattern, and
said first optically transparent pattern retarding the phase of light at a second band of wavelengths over the visible band by a phase-retarding amount different than said first desired phase retarding amount by a phase-retardation error so as to impart
a first polarization state $P_1$ to a first portion of the light in said second band of wavelengths emanating from said first pixel pattern and passing through said first perspective optically transparent pattern, and
a second polarization state $P_2$ to a portion of the light in said second band of wavelengths emanating from said first pixel pattern and passing through said first optically transparent pattern, thereby introducing cross-talk and asymmetric image distortion into the first-perspective channel of said system; and
said second optically transparent pattern spatially corresponding to and being spatially aligned with said second pixel pattern formed on said image formation surface so as to impart a second polarization state $P_2$ to light emanating from said second pixel pattern and passing through said second optically transparent pattern, said second polarization state $P_2$ being different than said first polarization state $P_1$,
wherein the polarized light emanating from said first and second optically transparent patterns forms said micropolarized spatially multiplexed image for use in stereoscopic viewing said 3-D object; and
(B) a viewing device for viewing said micropolarized spatially-multiplexed image, said viewing device including (1) a first optically transparent element positionable before the left eye of a viewer permitting the left eye of the viewer to view said first pixel pattern while substantially preventing the left eye of the viewer from viewing said second pixel pattern, (2) a second optically transparent element positionable before the right eye of the viewer permitting the right eye of the viewer to view said second pixel pattern while substantially preventing the right eye of the viewer from viewing said first pixel pattern, and (3) phase-restoration error correction means associated with said first optically transparent element, for optically correcting said phase-retardation error associated with said first optically transparent pattern of said micropolarization panel and thereby substantially eliminating said cross-talk and asymmetric image distortion in the first-perspective channel of said system, whereby the viewer is capable of stereoscopically viewing said 3-D object substantially free of visual channel cross-talk and asymmetric image distortion;

wherein said optical viewing device is realized as a device selected from the group consisting of a pair of eye-glasses, a pair of contact lenses, and a head-mounted visor, and a kiosk-mounted visor; and wherein said first optically transparent element further comprises a first phase retardation error correcting filter and said second optically transparent element further comprises a second phase retardation error correcting filter, and wherein the phase retardation characteristics of said first phase retardation correcting filter correct the phase retardation error introduced by said second optically transparent pattern, and the phase retardation characteristics of said second phase retardation correcting filter correct said phase retardation error introduced by said first optically transparent pattern.

18. The display system of claim 17, wherein both said micropolarization structure and said viewing device have an electrically-passive construction.

19. The display system of claim 17, wherein said first optically transparent pattern comprises a first retardation pattern which imparts said first polarization state to light emanating from said first pixel pattern and passing through said first retardation pattern, and wherein said second optically transparent pattern comprises a second retardation pattern which imparts said second polarization state to light emanating from said second pixel pattern and passing through said second retardation pattern.

20. The display system of claim 19, wherein said first retardation pattern comprises a first quarter wave retardation pattern which imparts a clockwise circular polarization state to light emanating from said first pixel pattern and passing through said first retardation pattern, and wherein said second retardation pattern comprises a second quarter wave retardation pattern which imparts a counter-clockwise circular polarization state to light emanating from said second pixel pattern and passing through said second retardation pattern.

21. The display system of claim 17, wherein said display device further comprises a polarization layer, and said first optically transparent pattern comprises a first retardation pattern, wherein said first retardation pattern imparts said first polarization state to light emanating from said first pixel pattern and passing through said first retardation pattern, and wherein said second optically transparent pattern imparts said second polarization state to light emanating from said second pixel pattern and passing through said second optically transparent pattern.

22. The display system of claim 21, wherein said first retardation pattern imparts half-wave retardation to light emanating from said first pixel pattern and passing through said first retardation pattern, and said second optically transparent pattern imparts zero retardation to light emanating from said second pixel pattern and passing through said second optically transparent pattern.

23. The display system of claim 21, wherein said polarization layer comprises a linear polarization state.

24. The display system of claim 21, wherein said first polarization state is a first linear polarization state, and wherein said second polarization state is a second linear polarization state, which is different from said first linear polarization state P1.

25. The display system of claim 21, wherein said polarization layer comprises a circular polarization state.

26. The display system of claim 21, wherein said first polarization state is a clockwise circular polarization state, and wherein said second polarization state is a counter-clockwise circular polarization state.

27. The display system of claim 19, wherein said first retardation pattern comprises a first quarter wave retardation pattern which imparts a clockwise circular polarization state to light emanating from said first pixel pattern and passing through said first retardation pattern.

28. The display system of claim 17, wherein said viewing device further comprises: a frame for supporting said first and second optically transparent elements so that said first optically transparent element is positionable adjacent to the left eye of a viewer, and said second optically transparent element is positionable adjacent to the right eye of the viewer.

29. The display system of claim 17, wherein said display device comprises a liquid crystal display device.

30. The display system of claim 29, wherein said liquid crystal display device functions as a display surface suitable for direct stereoscopic viewing of said 3-D object with high image quality and resolution.

31. The display system of claim 29, wherein said liquid crystal display device further comprises a projection lens for projecting said polarized spatially multiplexed image onto a remote display surface, for stereoscopic viewing of said 3-D object with high image quality and resolution.

32. The display system of claim 17, wherein said frame is supported with respect to the head of the viewer.

* * * * *